(12) United States Patent
Shams et al.

(10) Patent No.: US 12,007,562 B2
(45) Date of Patent: *Jun. 11, 2024

(54) OPTICAL SYSTEMS FOR HEAD-WORN COMPUTERS

(71) Applicant: Mentor Acquisition One, LLC, Plantation, FL (US)

(72) Inventors: Nima L. Shams, San Jose, CA (US); John N. Border, Eaton, NH (US); John D. Haddick, Mill Valley, CA (US)

(73) Assignee: Mentor Acquisition One, LLC, Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/073,424

(22) Filed: Dec. 1, 2022

(65) Prior Publication Data

US 2023/0296894 A1 Sep. 21, 2023

Related U.S. Application Data

(63) Continuation of application No. 17/485,083, filed on Sep. 24, 2021, now Pat. No. 11,592,669, which is a
(Continued)

(51) Int. Cl.
*G02B 27/01* (2006.01)
*G02B 27/00* (2006.01)
(Continued)

(52) U.S. Cl.
CPC ....... *G02B 27/017* (2013.01); *G02B 27/0093* (2013.01); *G06F 1/163* (2013.01);
(Continued)

(58) Field of Classification Search
CPC .............. G02B 27/017; G02B 27/0093; G02B 2027/0114; G02B 2027/0118;
(Continued)

(56) References Cited

U.S. PATENT DOCUMENTS

| 1,897,833 A | 2/1933 | Benway |
|---|---|---|
| 4,788,535 A | 11/1988 | Chikara |

(Continued)

FOREIGN PATENT DOCUMENTS

| CA | 2316473 A1 | 1/2001 |
|---|---|---|
| CA | 2362895 A1 | 12/2002 |

(Continued)

OTHER PUBLICATIONS

US 8,743,465, 01/2012, Totani, Takahiro (withdrawn)
(Continued)

*Primary Examiner* — Sarah Lhymn
(74) *Attorney, Agent, or Firm* — Morrison & Foerster LLP

(57) ABSTRACT

Aspects of the present disclosure relate to optical systems with ergonomic presentation of content for use in head-worn computing systems. A method for controlling a head-worn computer when viewing virtual images, including image content, that encourages an ergonomic head position to reduce neck pain, includes determining an angle of the head-worn computer relative to horizontal, determining an angle of a line of sight to the center of the virtual image as presented to a user's eye, determining a deviation between the determined angle of the line of sight and a predetermined ergonomic angle, and shifting the image content of the virtual image vertically as displayed to the user's eye so that a portion of the image content is not viewable, wherein the amount of shifting is in reverse correspondence to the magnitude of the determined deviation.

20 Claims, 62 Drawing Sheets

Related U.S. Application Data continuation of application No. 16/719,815, filed on Dec. 18, 2019, now Pat. No. 11,156,834, which is a continuation of application No. 15/058,383, filed on Mar. 2, 2016, now Pat. No. 10,591,728.

(51) Int. Cl.
| | |
|---|---|
| *G06F 1/16* | (2006.01) |
| *G06F 3/01* | (2006.01) |
| *G06F 3/0346* | (2013.01) |
| *G06T 3/02* | (2024.01) |
| *G06T 3/4015* | (2024.01) |
| *G06T 7/73* | (2017.01) |

(52) U.S. Cl.
CPC .............. *G06F 3/011* (2013.01); *G06F 3/012* (2013.01); *G06F 3/013* (2013.01); *G06F 3/0346* (2013.01); *G06T 3/02* (2024.01); *G06T 3/4015* (2013.01); *G06T 7/73* (2017.01); *G02B 2027/0114* (2013.01); *G02B 2027/0118* (2013.01); *G02B 2027/013* (2013.01); *G02B 2027/0174* (2013.01); *G06T 2207/30201* (2013.01)

(58) Field of Classification Search
CPC ...... G02B 2027/013; G02B 2027/0174; G06F 1/163; G06F 3/011; G06F 3/012; G06F 3/013; G06F 3/0346; G06T 3/0006; G06T 3/4015; G06T 7/73; G06T 2207/30201
See application file for complete search history.

(56) References Cited

U.S. PATENT DOCUMENTS

| | | |
|---|---|---|
| 4,852,988 A | 8/1989 | Velez |
| D327,674 S | 7/1992 | Kuo |
| 5,394,203 A | 2/1995 | Murphy |
| 5,579,026 A | 11/1996 | Tabata |
| D376,790 S | 12/1996 | Taylor |
| 5,596,451 A | 1/1997 | Handschy |
| 5,717,422 A | 2/1998 | Fergason |
| 5,808,800 A | 9/1998 | Handschy |
| 5,818,381 A | 10/1998 | Williams |
| 5,991,085 A | 11/1999 | Rallison |
| 6,028,608 A | 2/2000 | Jenkins |
| 6,195,136 B1 | 2/2001 | Handschy |
| 6,198,395 B1 | 3/2001 | Sussman |
| 6,359,723 B1 | 3/2002 | Handschy |
| 6,369,952 B1 | 4/2002 | Rallison |
| 6,392,656 B1 | 5/2002 | Someya |
| 6,433,760 B1 | 8/2002 | Vaissie |
| 6,491,391 B1 | 12/2002 | Blum et al. |
| D470,144 S | 2/2003 | Li |
| 6,535,182 B2 | 3/2003 | Stanton |
| D473,871 S | 4/2003 | Santos |
| 6,549,231 B1 | 4/2003 | Matsui |
| 6,675,030 B2 | 1/2004 | Ciurczak |
| 6,847,336 B1 | 1/2005 | Lemelson |
| 6,943,754 B2 | 9/2005 | Aughey |
| 6,972,771 B2 | 12/2005 | Nakano |
| 6,977,776 B2 | 12/2005 | Volkenandt et al. |
| 6,987,787 B1 | 1/2006 | Mick |
| 7,088,234 B2 | 8/2006 | Naito |
| 7,199,934 B2 | 4/2007 | Yamasaki |
| 7,206,134 B2 | 4/2007 | Weissman |
| 7,347,551 B2 | 3/2008 | Fergason et al. |
| 7,488,294 B2 | 2/2009 | Torch |
| 7,626,569 B2 * | 12/2009 | Lanier .................... G06F 3/012 348/42 |
| 7,735,230 B2 | 6/2010 | Barany |
| 7,758,185 B2 | 7/2010 | Lewis |
| 7,812,842 B2 | 10/2010 | Gordon |
| 7,830,370 B2 | 11/2010 | Yamazaki |
| 7,855,743 B2 | 12/2010 | Sako |
| 7,928,926 B2 | 4/2011 | Yamamoto |
| 8,004,765 B2 | 8/2011 | Amitai |
| 8,014,666 B2 | 9/2011 | Neiman |
| 8,018,579 B1 | 9/2011 | Krah |
| 8,166,421 B2 | 4/2012 | Magal |
| 8,228,315 B1 | 7/2012 | Starner |
| 8,235,529 B1 | 8/2012 | Raffle |
| 8,353,594 B2 | 1/2013 | Lewis |
| 8,378,924 B2 | 2/2013 | Jacobsen |
| 8,427,396 B1 | 4/2013 | Kim |
| 8,473,241 B2 | 6/2013 | Foxlin |
| 8,494,215 B2 | 7/2013 | Kimchi |
| 8,564,883 B2 | 10/2013 | Totani |
| 8,570,273 B1 | 10/2013 | Smith |
| 8,576,276 B2 | 11/2013 | Bar-zeev |
| 8,576,491 B2 | 11/2013 | Takagi |
| 8,587,869 B2 | 11/2013 | Totani |
| 8,594,467 B2 | 11/2013 | Lu |
| 8,611,015 B2 | 12/2013 | Wheeler |
| 8,638,498 B2 | 1/2014 | Bohn et al. |
| 8,662,686 B2 | 3/2014 | Takagi |
| 8,670,183 B2 | 3/2014 | Clavin |
| 8,681,073 B1 | 3/2014 | Robbins |
| 8,696,113 B2 | 4/2014 | Lewis |
| 8,698,157 B2 | 4/2014 | Hanamura |
| 8,711,487 B2 | 4/2014 | Takeda |
| 8,733,927 B1 | 5/2014 | Lewis |
| 8,733,928 B1 | 5/2014 | Lewis |
| 8,743,052 B1 | 6/2014 | Keller |
| 8,745,058 B1 | 6/2014 | Garcia-barrio |
| 8,750,541 B1 | 6/2014 | Dong |
| 8,752,963 B2 | 6/2014 | Mcculloch |
| 8,787,006 B2 | 7/2014 | Golko |
| 8,803,867 B2 | 8/2014 | Oikawa |
| 8,823,071 B2 | 9/2014 | Oyamada |
| 8,832,557 B2 | 9/2014 | Fadell |
| 8,837,880 B2 | 9/2014 | Takeda |
| 8,922,530 B2 | 12/2014 | Pance |
| 8,929,589 B2 | 1/2015 | Publicover et al. |
| 8,947,323 B1 | 2/2015 | Raffle |
| 8,948,935 B1 | 2/2015 | Peeters |
| 8,970,495 B1 | 3/2015 | Biffle |
| 9,010,929 B2 | 4/2015 | Lewis |
| 9,129,157 B2 | 9/2015 | Chao |
| 9,213,403 B1 | 12/2015 | Raffle |
| 9,229,233 B2 | 1/2016 | Osterhout |
| 9,229,234 B2 | 1/2016 | Osterhout |
| 9,230,501 B1 | 1/2016 | Starner |
| 9,235,051 B2 | 1/2016 | Salter |
| 9,235,064 B2 | 1/2016 | Lewis |
| 9,239,473 B2 | 1/2016 | Lewis |
| 9,244,293 B2 | 1/2016 | Lewis |
| 9,274,338 B2 | 3/2016 | Robbins et al. |
| 9,286,728 B2 | 3/2016 | Osterhout |
| 9,292,973 B2 | 3/2016 | Bar-zeev et al. |
| 9,294,660 B2 | 3/2016 | O'Neill |
| 9,323,325 B2 | 4/2016 | Perez et al. |
| 9,423,612 B2 | 8/2016 | Border |
| 9,529,192 B2 | 12/2016 | Border |
| 9,658,473 B2 | 5/2017 | Lewis |
| 9,720,505 B2 | 8/2017 | Gribetz et al. |
| 9,746,686 B2 | 8/2017 | Haddick |
| 9,784,973 B2 | 10/2017 | Osterhout |
| 9,841,602 B2 | 12/2017 | Osterhout |
| 9,852,545 B2 | 12/2017 | Osterhout |
| 10,013,053 B2 | 7/2018 | Cederlund et al. |
| 10,025,379 B2 | 7/2018 | Drake et al. |
| 10,062,182 B2 | 8/2018 | Haddick |
| 10,151,937 B2 | 12/2018 | Lewis |
| 10,185,147 B2 | 1/2019 | Lewis |
| 10,591,728 B2 | 3/2020 | Shams |
| 11,156,834 B2 | 10/2021 | Shams et al. |
| 11,592,669 B2 | 2/2023 | Shams et al. |
| 2001/0050817 A1 | 12/2001 | Travers |
| 2002/0021498 A1 | 2/2002 | Ohtaka |
| 2002/0044152 A1 | 4/2002 | Abbott |
| 2002/0057280 A1 | 5/2002 | Anabuki |
| 2002/0126396 A1 | 9/2002 | Dolgoff |

(56) References Cited

U.S. PATENT DOCUMENTS

| | | |
|---|---|---|
| 2002/0181115 A1 | 12/2002 | Massof |
| 2003/0030597 A1 | 2/2003 | Geist |
| 2003/0125055 A1 | 7/2003 | Kim |
| 2004/0008177 A1 | 1/2004 | Ahn |
| 2004/0030448 A1 | 2/2004 | Solomon |
| 2004/0101178 A1 | 5/2004 | Fedorovskaya |
| 2005/0052613 A1 | 3/2005 | Kidouchim |
| 2006/0022993 A1 | 2/2006 | Hammond |
| 2006/0023158 A1 | 2/2006 | Howell et al. |
| 2006/0072820 A1 | 4/2006 | Porjo |
| 2006/0183986 A1 | 8/2006 | Rice |
| 2006/0256110 A1 | 11/2006 | Okuno |
| 2007/0030243 A1 | 2/2007 | Ishii |
| 2007/0035563 A1 | 2/2007 | Biocca |
| 2007/0109284 A1 | 5/2007 | Yamazaki |
| 2008/0036653 A1 | 2/2008 | Huston |
| 2008/0071559 A1 | 3/2008 | Arrasvuori |
| 2008/0219025 A1 | 9/2008 | Spitzer |
| 2009/0279180 A1 | 11/2009 | Amitai |
| 2009/0307828 A1 | 12/2009 | Ludlow |
| 2010/0056274 A1 | 3/2010 | Uusitalo |
| 2010/0130140 A1 | 5/2010 | Waku |
| 2010/0141555 A1 | 6/2010 | Rorberg |
| 2010/0225473 A1 | 9/2010 | Leuthardt |
| 2010/0245387 A1 | 9/2010 | Bachelder |
| 2011/0007081 A1 | 1/2011 | Gordon |
| 2011/0089325 A1 | 4/2011 | Ottney |
| 2011/0102234 A1 | 5/2011 | Adams |
| 2011/0118870 A1 | 5/2011 | Sugihara |
| 2011/0130958 A1 | 6/2011 | Stahl |
| 2011/0131495 A1 | 6/2011 | Bull |
| 2011/0164047 A1 | 7/2011 | Pance |
| 2011/0164163 A1 | 7/2011 | Bilbrey |
| 2011/0170061 A1 | 7/2011 | Gordon |
| 2011/0175925 A1 | 7/2011 | Kane |
| 2011/0196610 A1 | 8/2011 | Waldman |
| 2011/0199171 A1 | 8/2011 | Prest |
| 2011/0199202 A1 | 8/2011 | De Mers |
| 2011/0201213 A1 | 8/2011 | Dabov |
| 2011/0202823 A1 | 8/2011 | Berger |
| 2011/0211056 A1 | 9/2011 | Publicover et al. |
| 2011/0213664 A1 | 9/2011 | Osterhout |
| 2011/0221672 A1 | 9/2011 | Osterhout |
| 2011/0221896 A1 | 9/2011 | Haddick |
| 2011/0249230 A1 | 10/2011 | Blum |
| 2012/0021806 A1 | 1/2012 | Maltz |
| 2012/0032874 A1 | 2/2012 | Mukawa |
| 2012/0033080 A1 | 2/2012 | Watanabe |
| 2012/0038641 A1 | 2/2012 | Levantovsky |
| 2012/0050138 A1 | 3/2012 | Sato et al. |
| 2012/0050493 A1 | 3/2012 | Ernst |
| 2012/0062850 A1 | 3/2012 | Travis |
| 2012/0075168 A1 | 3/2012 | Osterhout |
| 2012/0088543 A1 | 4/2012 | Lindner |
| 2012/0092329 A1 | 4/2012 | Koo |
| 2012/0113514 A1 | 5/2012 | Rodman |
| 2012/0127284 A1 | 5/2012 | Bar-zeev |
| 2012/0188245 A1 | 7/2012 | Hyatt |
| 2012/0212398 A1 | 8/2012 | Border |
| 2012/0212593 A1 | 8/2012 | Na |
| 2012/0223885 A1 | 9/2012 | Perez |
| 2012/0242698 A1 | 9/2012 | Haddick |
| 2012/0250152 A1 | 10/2012 | Larson |
| 2012/0264510 A1 | 10/2012 | Wigdor |
| 2012/0293548 A1 | 11/2012 | Perez |
| 2012/0294478 A1 | 11/2012 | Publicover |
| 2012/0306850 A1 | 12/2012 | Balan |
| 2012/0327116 A1 | 12/2012 | Liu |
| 2013/0009366 A1 | 1/2013 | Hannegan |
| 2013/0027337 A1 | 1/2013 | Chen |
| 2013/0044042 A1 | 2/2013 | Olsson |
| 2013/0044130 A1 | 2/2013 | Geisner |
| 2013/0063496 A1 | 3/2013 | Basler |
| 2013/0069924 A1 | 3/2013 | Robinson |
| 2013/0077049 A1 | 3/2013 | Bohn |
| 2013/0077147 A1 | 3/2013 | Efimov |
| 2013/0083009 A1 | 4/2013 | Geisner |
| 2013/0083055 A1 | 4/2013 | Piemonte |
| 2013/0100259 A1 | 4/2013 | Ramaswamy |
| 2013/0120841 A1 | 5/2013 | Shpunt |
| 2013/0135198 A1 | 5/2013 | Hodge |
| 2013/0154913 A1 | 6/2013 | Genc |
| 2013/0154918 A1 | 6/2013 | Vaught |
| 2013/0162632 A1 | 6/2013 | Varga |
| 2013/0163980 A1 | 6/2013 | Lazaridis |
| 2013/0194389 A1 | 8/2013 | Vaught |
| 2013/0196757 A1 | 8/2013 | Latta |
| 2013/0207970 A1 | 8/2013 | Shpunt |
| 2013/0215235 A1 | 8/2013 | Russell |
| 2013/0230215 A1 | 9/2013 | Gurman |
| 2013/0241948 A1 | 9/2013 | Kimura |
| 2013/0257622 A1 | 10/2013 | Davalos |
| 2013/0265227 A1 | 10/2013 | Julian |
| 2013/0300652 A1 | 11/2013 | Raffle |
| 2013/0314555 A1 | 11/2013 | Vartanian |
| 2013/0321265 A1 | 12/2013 | Bychkov |
| 2013/0321271 A1 | 12/2013 | Bychkov |
| 2013/0335301 A1 | 12/2013 | Wong |
| 2013/0335435 A1 | 12/2013 | Ambrus |
| 2013/0336629 A1 | 12/2013 | Mulholland |
| 2013/0342591 A1 | 12/2013 | Sagan |
| 2014/0028704 A1 | 1/2014 | Wu |
| 2014/0043682 A1 | 2/2014 | Hussey |
| 2014/0062854 A1 | 3/2014 | Cho |
| 2014/0063473 A1 | 3/2014 | Pasolini |
| 2014/0078282 A1 | 3/2014 | Aoki |
| 2014/0125668 A1 | 5/2014 | Steed |
| 2014/0129328 A1 | 5/2014 | Mathew |
| 2014/0146394 A1 | 5/2014 | Tout |
| 2014/0147829 A1 | 5/2014 | Jerauld |
| 2014/0152530 A1 | 6/2014 | Venkatesha |
| 2014/0152558 A1 | 6/2014 | Salter |
| 2014/0152676 A1 | 6/2014 | Rohn |
| 2014/0159995 A1 | 6/2014 | Adams |
| 2014/0160055 A1 | 6/2014 | Margolis |
| 2014/0160137 A1 | 6/2014 | Martin |
| 2014/0160157 A1 | 6/2014 | Poulos |
| 2014/0160170 A1 | 6/2014 | Lyons |
| 2014/0168735 A1 | 6/2014 | Yuan |
| 2014/0176591 A1 | 6/2014 | Klein |
| 2014/0176603 A1 | 6/2014 | Kumar |
| 2014/0177023 A1 | 6/2014 | Gao |
| 2014/0195918 A1 | 7/2014 | Friedlander |
| 2014/0204759 A1 | 7/2014 | Guo |
| 2014/0213280 A1 | 7/2014 | Sandel |
| 2014/0225814 A1 | 8/2014 | English |
| 2014/0240313 A1 | 8/2014 | Varga |
| 2014/0247286 A1 | 9/2014 | Chi |
| 2014/0253588 A1 | 9/2014 | Mandala |
| 2014/0253605 A1 | 9/2014 | Border |
| 2014/0267419 A1 | 9/2014 | Ballard |
| 2014/0267594 A1 | 9/2014 | Furumura et al. |
| 2014/0372957 A1 | 12/2014 | Keane |
| 2014/0375680 A1 | 12/2014 | Ackerman |
| 2014/0375683 A1 | 12/2014 | Salter |
| 2014/0378810 A1 | 12/2014 | Davis |
| 2015/0022542 A1 | 1/2015 | Baba |
| 2015/0029222 A1 | 1/2015 | Hofmann |
| 2015/0134143 A1 | 5/2015 | Willenborg |
| 2015/0146004 A1 | 5/2015 | Kritt |
| 2015/0153572 A1 | 6/2015 | Miao |
| 2015/0161822 A1 | 6/2015 | Basu |
| 2015/0168731 A1 | 6/2015 | Robbins |
| 2015/0169038 A1 | 6/2015 | Kim |
| 2015/0172545 A1 | 6/2015 | Szabo |
| 2015/0177514 A1 | 6/2015 | Maimone |
| 2015/0193098 A1 | 7/2015 | Kauffmann |
| 2015/0205126 A1 | 7/2015 | Schowengerdt |
| 2015/0205494 A1 | 7/2015 | Scott |
| 2015/0226966 A1 | 8/2015 | Osterhout |
| 2015/0226967 A1 | 8/2015 | Osterhout |
| 2015/0228099 A1 | 8/2015 | Osterhout |
| 2015/0228119 A1 | 8/2015 | Osterhout |
| 2015/0228120 A1 | 8/2015 | Osterhout |

(56) References Cited

U.S. PATENT DOCUMENTS

| | | |
|---|---|---|
| 2015/0235429 A1 | 8/2015 | Miller |
| 2015/0253573 A1 | 9/2015 | Sako |
| 2015/0254882 A1 | 9/2015 | Englert |
| 2015/0260986 A1 | 9/2015 | Nortrup |
| 2015/0277113 A1 | 10/2015 | Border |
| 2015/0277118 A1 | 10/2015 | Border |
| 2015/0277122 A1 | 10/2015 | Border |
| 2015/0277549 A1 | 10/2015 | Border |
| 2015/0279010 A1 | 10/2015 | Cianfrone |
| 2015/0279104 A1 | 10/2015 | Border |
| 2015/0279107 A1 | 10/2015 | Border |
| 2015/0279108 A1 | 10/2015 | Border |
| 2015/0302646 A1 | 10/2015 | Osterhout |
| 2015/0302647 A1 | 10/2015 | Osterhout |
| 2015/0302773 A1 | 10/2015 | Stone |
| 2015/0304368 A1 | 10/2015 | Vaccari |
| 2015/0316766 A1 | 11/2015 | Weaver |
| 2015/0331240 A1 | 11/2015 | Poulos |
| 2015/0331241 A1 | 11/2015 | Haddick |
| 2015/0332032 A1 | 11/2015 | Alameh |
| 2015/0338915 A1 | 11/2015 | Publicover |
| 2016/0000316 A1 | 1/2016 | Copland |
| 2016/0026873 A1 | 1/2016 | Wexler |
| 2016/0045810 A1 | 2/2016 | Minkovitch |
| 2016/0048019 A1 | 2/2016 | Haddick |
| 2016/0048023 A1 | 2/2016 | Haddick |
| 2016/0048160 A1 | 2/2016 | Haddick |
| 2016/0049008 A1 | 2/2016 | Haddick |
| 2016/0054566 A1 | 2/2016 | Osterhout |
| 2016/0077342 A1 | 3/2016 | Osterhout |
| 2016/0089272 A1 | 3/2016 | Li |
| 2016/0117972 A1 | 4/2016 | Yoshiyama |
| 2016/0131912 A1 | 5/2016 | Border |
| 2016/0140826 A1 | 5/2016 | Sahiholnasab |
| 2016/0147063 A1 | 5/2016 | Border |
| 2016/0147064 A1 | 5/2016 | Border |
| 2016/0147065 A1 | 5/2016 | Border |
| 2016/0189426 A1 | 6/2016 | Thomas |
| 2016/0202946 A1 | 7/2016 | Osterhout |
| 2016/0239985 A1 | 8/2016 | Haddick |
| 2016/0240008 A1 | 8/2016 | Haddick |
| 2016/0306173 A1 | 10/2016 | Tsukahara |
| 2016/0360160 A1 | 12/2016 | Eizenberg |
| 2017/0025091 A1 | 1/2017 | Haddick |
| 2017/0092235 A1* | 3/2017 | Osman ............... G09G 5/38 |
| 2017/0099433 A1 | 4/2017 | Cleveland |
| 2017/0148216 A1 | 5/2017 | Birman |
| 2017/0186230 A1 | 6/2017 | Ivers |
| 2017/0200296 A1 | 7/2017 | Jones |
| 2017/0246070 A1 | 8/2017 | Osterhout |
| 2017/0248788 A1 | 8/2017 | Osterhout |
| 2017/0248792 A1 | 8/2017 | Border |
| 2017/0249860 A1 | 8/2017 | Osterhout |
| 2017/0249861 A1 | 8/2017 | Border |
| 2017/0249862 A1 | 8/2017 | Border |
| 2017/0307880 A1 | 10/2017 | Shrubsole |
| 2017/0322422 A1 | 11/2017 | Stone |
| 2017/0329141 A1 | 11/2017 | Border |
| 2017/0329142 A1 | 11/2017 | Ye |
| 2018/0004008 A1 | 1/2018 | Froissard |
| 2018/0059421 A1 | 3/2018 | Osterhout |
| 2018/0318704 A1 | 11/2018 | Ikenoue et al. |
| 2022/0011576 A1 | 1/2022 | Shams et al. |

FOREIGN PATENT DOCUMENTS

| | | |
|---|---|---|
| CA | 2388766 A1 | 12/2003 |
| EA | 2333652 A1 | 6/2011 |
| EP | 368898 A1 | 5/1990 |
| EP | 777867 A1 | 6/1997 |
| EP | 2486450 A1 | 8/2012 |
| EP | 2502410 A1 | 9/2012 |
| JP | 2011085829 A | 4/2011 |
| WO | 8809942 A1 | 12/1988 |
| WO | 9600401 A1 | 1/1996 |
| WO | 9606378 A1 | 2/1996 |
| WO | 2010062481 A1 | 6/2010 |
| WO | 2011060525 A1 | 5/2011 |
| WO | 2011143655 A1 | 11/2011 |
| WO | 2012058175 A1 | 5/2012 |
| WO | 2013050650 A1 | 4/2013 |
| WO | 2013103825 A1 | 7/2013 |
| WO | 2013110846 A1 | 8/2013 |
| WO | 2013170073 A1 | 11/2013 |
| WO | 2014155072 A2 | 10/2014 |
| WO | 2014168499 A1 | 10/2014 |
| WO | 2017143128 A1 | 8/2017 |
| WO | 2017151494 A1 | 9/2017 |

OTHER PUBLICATIONS

US 8,792,178, 01/2012, Totani, Takahiro (withdrawn)
Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.
Bimber, Oliver et al. (2005). "Spatial Augmented Reality: Merging Real and Virtual Worlds," A. K. Peters, Ltd., Wellesley, MA.
Final Office Action mailed Mar. 10, 2021, for U.S. Appl. No. 16/719,815, filed Dec. 18, 2019, twenty four pages.
Final Office Action mailed Nov. 23, 2018, for U.S. Appl. No. 15/058,383, filed Mar. 2, 2016, 35 pages.
Final Office Action mailed Sep. 7, 2017, for U.S. Appl. No. 15/058,383, filed Mar. 2, 2016, 34 pages.
Gonzalez et al. "Digital Image Processing Second Edition," http://users.dcc.uchile.cl/~jsaavedr/libros/dip_gw.pdf, 2002, pp. 1-190.
Hopkins et al. "In-VIVO NIR Diffuse-Reflectance Tissue Spectroscopy of Human Subjects," http://citeseerx.ist.psu.edu/viewdoc/download?doi+10.1.1.596.955&rep=rep1&type=pdf, 1999, 1-11.
Hu, P., et al., (Jun. 2013). "ViRi: view it right", In Proceeding of the 11th annual international conference on Mobile systems, applications, and services (pp. 277-290).
Huang, Jia-Bin, "Image Completion Using Planar Structure Guidance", ACM Transactions on Graphics, vol. 33, No. 4, Article 129, Jul. 2014, pp. 1-10.
Jacob, R. "Eye Tracking in Advanced Interface Design", Virtual Environments and Advanced Interface Design, Oxford University Press, Inc. (Jun. 1995).
Janin, Adam L. et al. (1993). "Calibration of Head-Mounted Displays for Augmented Reality Applications", Research and Technology Boeing Computer Services MS 7L-48 P.O. Box 24346 Seattle, WA 98124-0346 Virtual Reality Annual International Symposium, 1993., 1993 IEEE, 10 Pages.
Logbar Inc., "Ring: Shortcut Everything", https://www.kickstarter.com/projects/1761670738/ring-shortcut-everything, Dec. 2014, 22 pages.
Non-Final Office Action mailed Feb. 9, 2017, for U.S. Appl. No. 15/058,383, filed Mar. 2, 2016, 32 pages.
Non-Final Office Action mailed Jul. 22, 2022, for U.S. Appl. No. 17/485,083, filed Sep. 24, 2021, eight pages.
Non-Final Office Action mailed Mar. 26, 2018, for U.S. Appl. No. 15/058,383, filed Mar. 2, 2016, 37 pages.
Non-Final Office Action mailed Oct. 20, 2020, for U.S. Appl. No. 16/719,815, filed Dec. 18, 2019, twenty six pages.
Notice of Allowance mailed Jun. 29, 2021, for U.S. Appl. No. 16/719,815, filed Dec. 18, 2019, eight pages.
Notice of Allowance mailed Nov. 2, 2022, for U.S. Appl. No. 17/485,083, filed Sep. 24, 2021, nine pages.
Notice of Allowance mailed Oct. 30, 2019, for U.S. Appl. No. 15/058,383, filed Mar. 2, 2016, nine pages.
PCT/US2017/019665, "International Application Serial No. PCT/US2017/019665, International Preliminary Report on Patentability and Written Opinion mailed Sep. 13, 2018", Osterhout Group, Inc., 6 Pages.
PCT/US2017/019665, Application Serial No. PCT/US2017/019665, International Search Report and the Written Opinion mailed May 19, 2017, eight pages.

(56) References Cited

OTHER PUBLICATIONS

Petty et al. "Screening Controlled Substances Using the Near-Infrared Fourier Transform Raman Technique," http://www.nicoletcz.cz/userfiles/file/vjecy/AN51242_Screening%20Controlled%20Substances.pdf, 1996, 2008.

Rolland, J. et al., "High-resolution inset head- mounted display", Optical Society of America, vol. 37, No. 19, Applied Optics, (Jul. 1, 1998).

Schedwill, "Bidirectional OLED Microdisplay", Fraunhofer Research Institution for Organics, Materials and Electronic Device COMEDD, Apr. 11, 2014, 2 pages.

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Vogel, et al., "Data glasses controlled by eye movements", Information and communication, Fraunhofer-Gesellschaft, Sep. 22, 2013, 2 pages.

Yoshida, A. et al., "Design and Applications of a High Resolution Insert Head Mounted Display", (Jun. 1994).

"Continental Head-Up Display Augmented Reality HUD", http://continental-head-up-display.com/ (2014) (last visited: Jan. 31, 2017). pp. 1-10.

"Genius Ring Mice," http://www.geniusnet.com/Genius/wSite/productCompare/compare.jsp, Dec. 23, 2014, one page.

\* cited by examiner

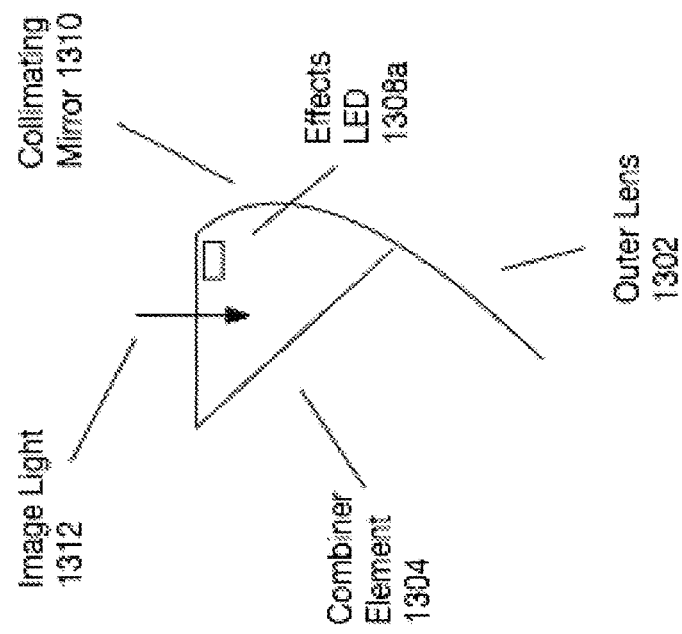

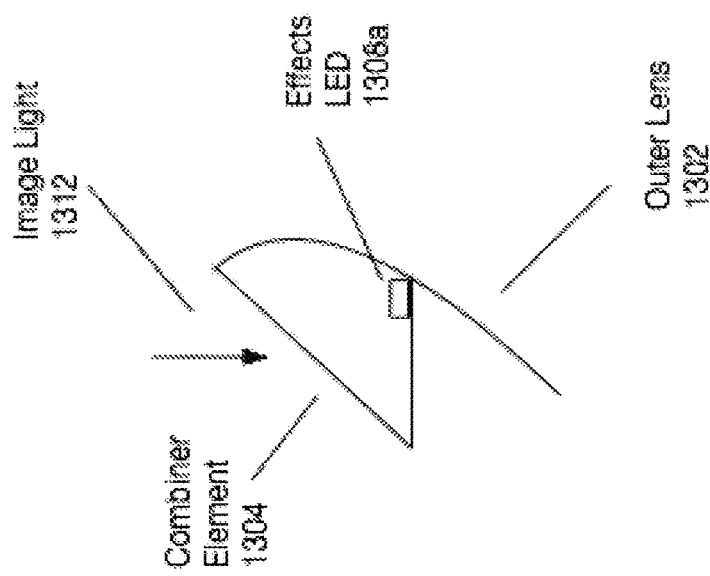

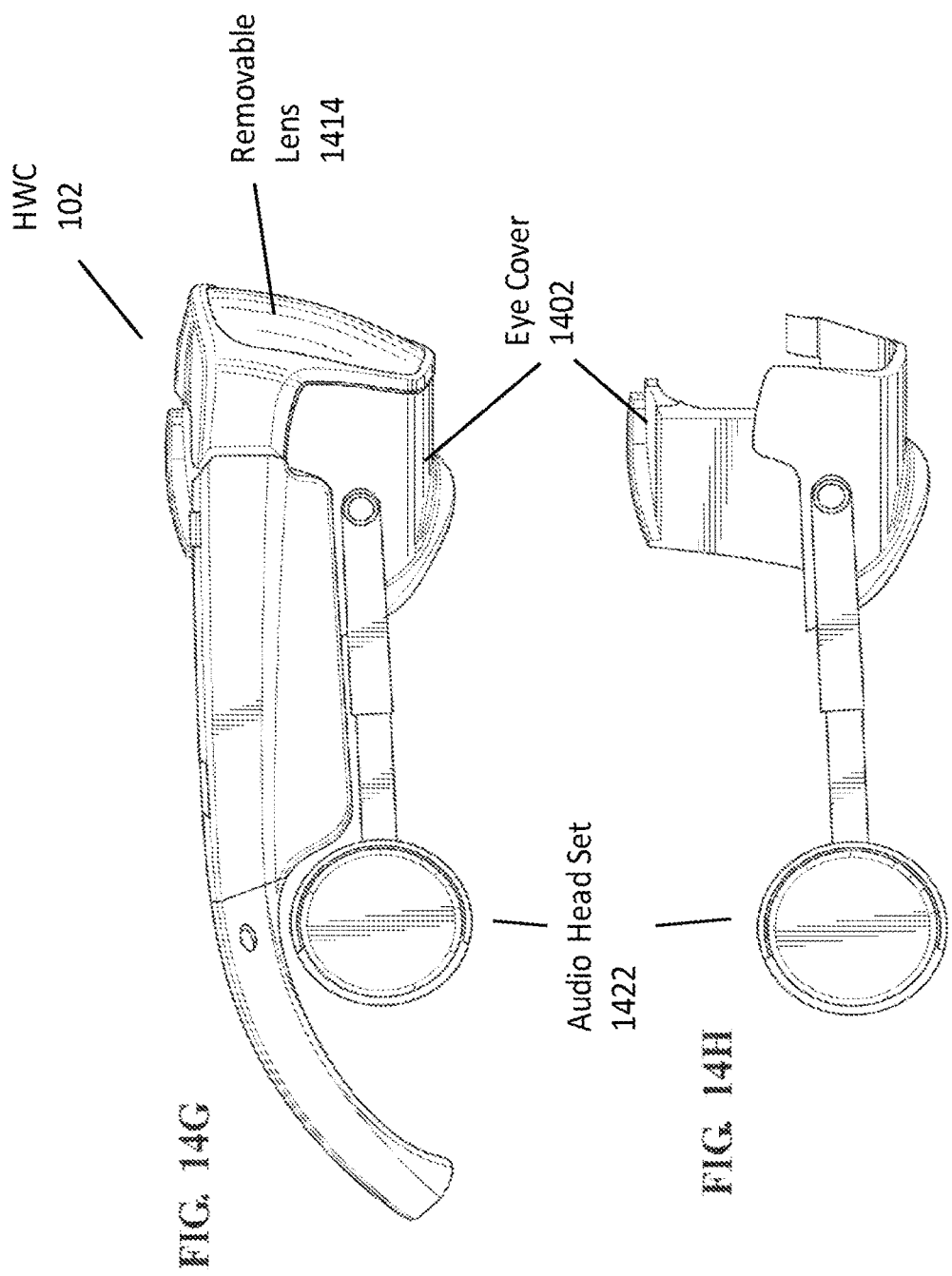

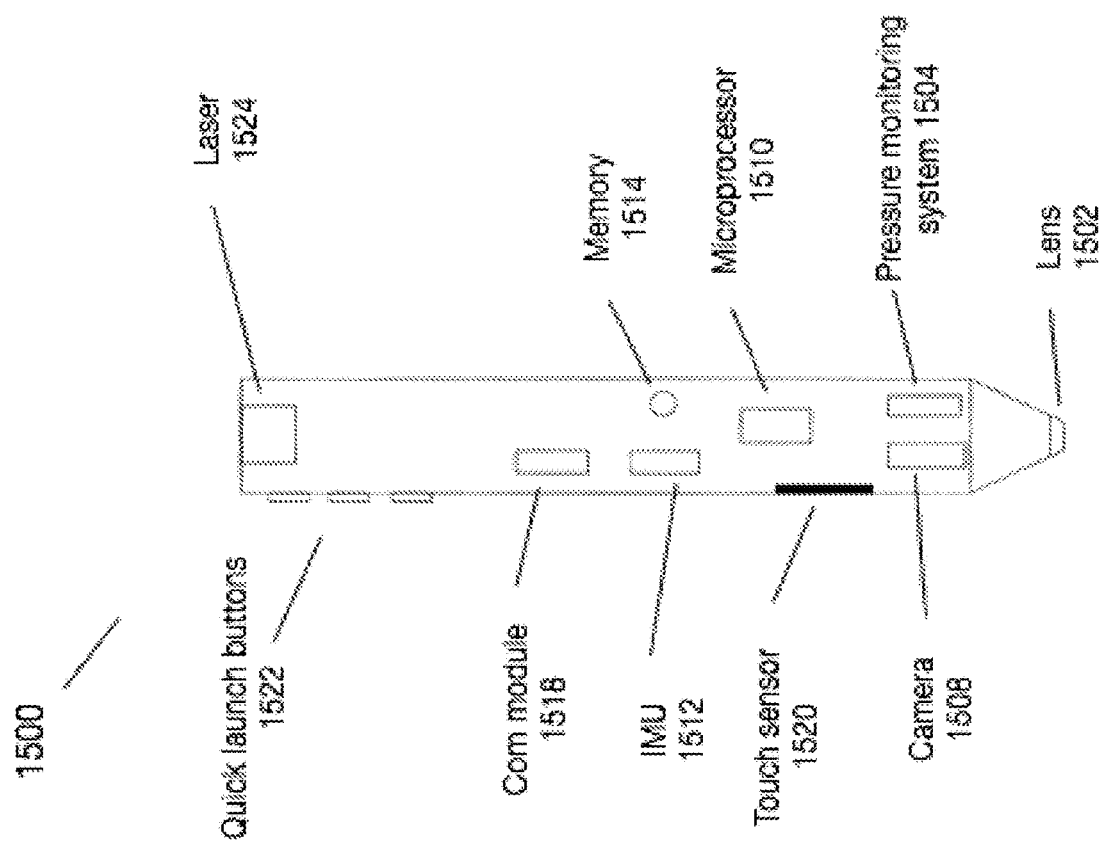

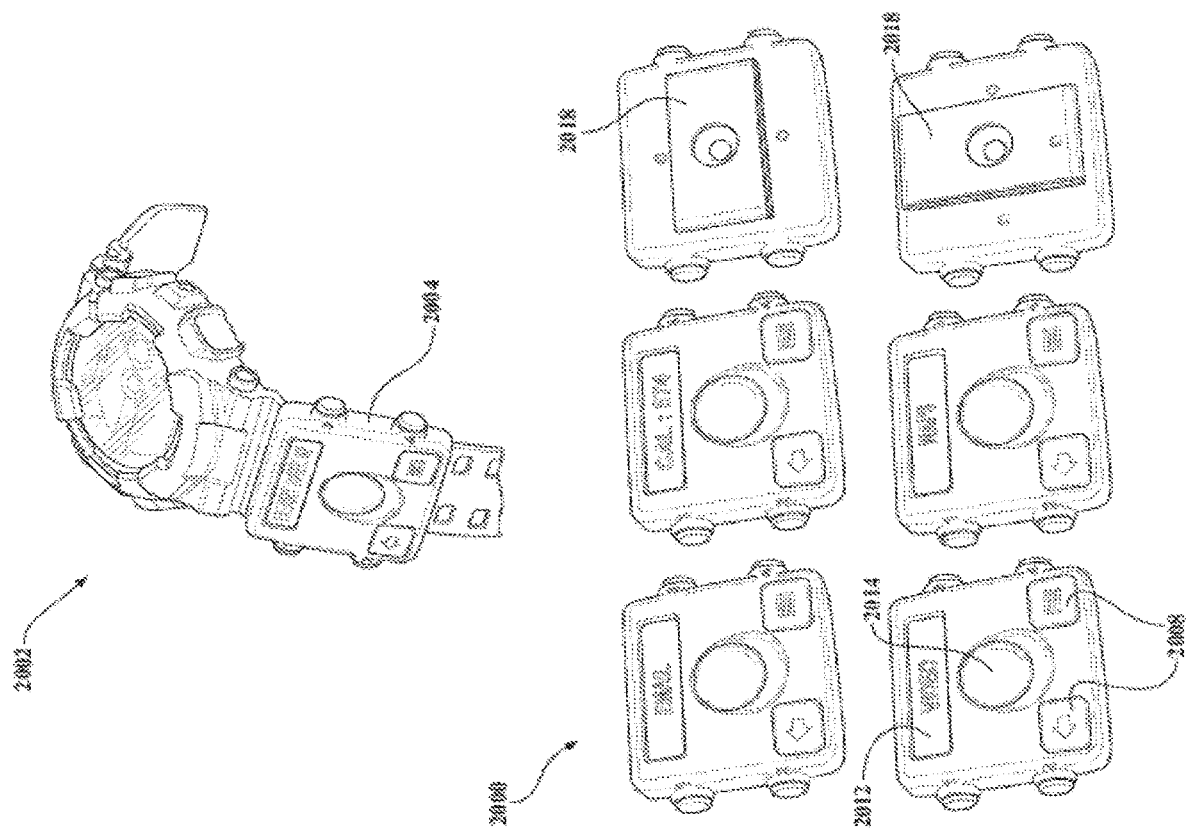

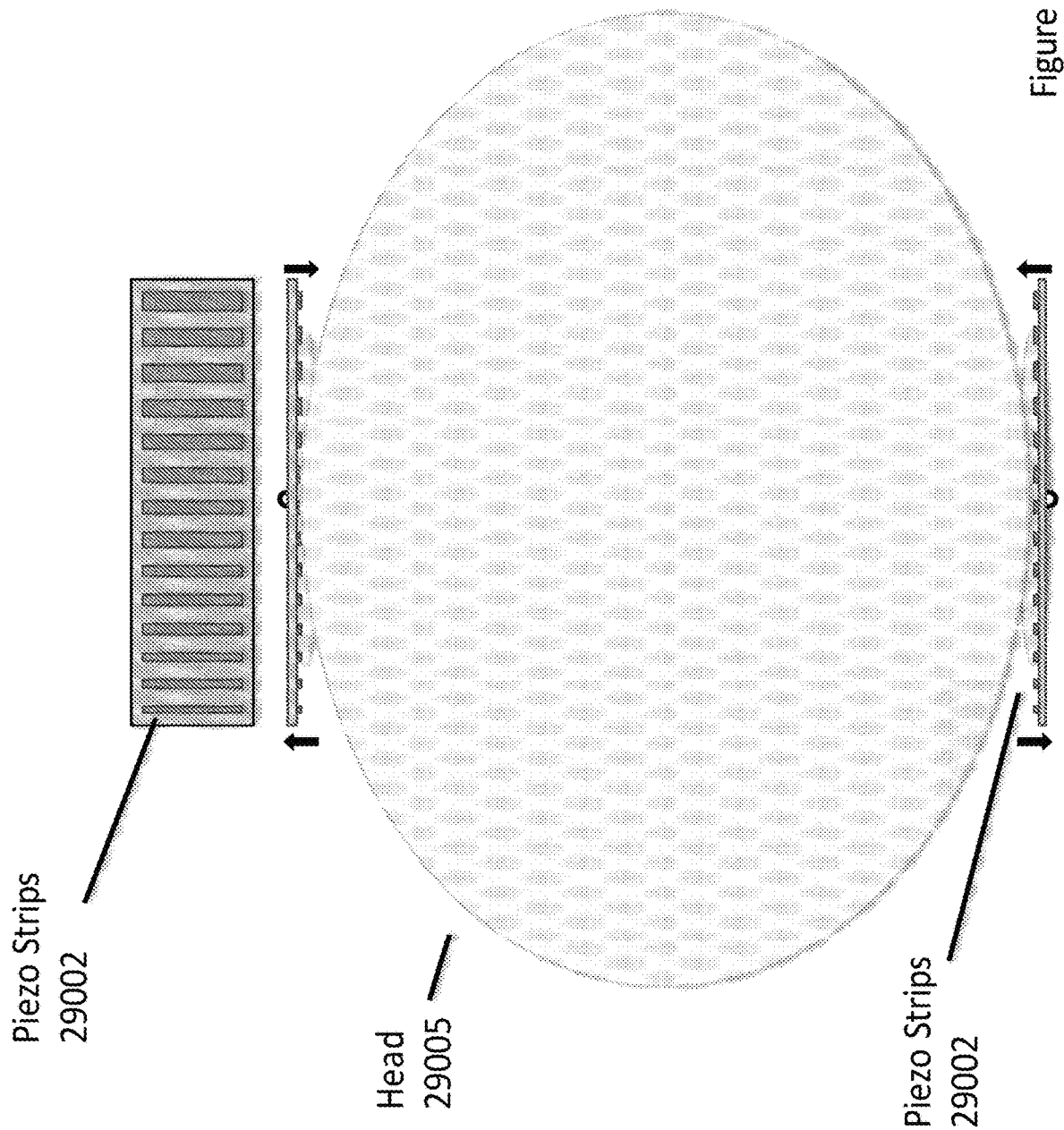

| Red | Green | Blue | Red | Green |
|-----|-------|------|-----|-------|
| Red | Green | Blue | Red | Green |
| Red | Green | Blue | Red | Green |

OPTICAL SYSTEMS FOR HEAD-WORN COMPUTERS

CROSS-REFERENCE TO RELATED APPLICATIONS

This application is a continuation of U.S. Non-Provisional application Ser. No. 17/485,083, filed on Sep. 24, 2021, which is a continuation of U.S. Non-Provisional application Ser. No. 16/719,815, filed on Dec. 18, 2019, now U.S. Pat. No. 11,156,834, issued on Oct. 26, 2021, which is a continuation of U.S. Non-Provisional application Ser. No. 15/058,383, filed on Mar. 2, 2016, now U.S. Pat. No. 10,591,728, issued on Mar. 17, 2020, the contents of which are incorporated by reference herein in their entirety.

BACKGROUND

Field of the Invention

This disclosure relates to optical systems for head-worn computer systems.

Description of Related Art

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display are required to improve the user experience.

SUMMARY

Aspects of the present disclosure relate to methods and systems for providing optical systems in head-worn computer systems.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures:

FIGS. 13a to 13c illustrate peripheral lighting systems in accordance with the principles of the present disclosure.

FIGS. 14a to 14h illustrate light suppression systems in accordance with the principles of the present disclosure.

FIG. 15 illustrates an external user interface in accordance with the principles of the present disclosure.

FIG. 16 illustrates external user interfaces in accordance with the principles of the present disclosure.

FIGS. 29 and 29a illustrate haptic systems in accordance with the principles of the present disclosure.

FIG. 32 shows a color filter layout wherein the colors repeat in rows.

While the disclosure has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present disclosure relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, compass heading, head tilt, where the user is looking and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
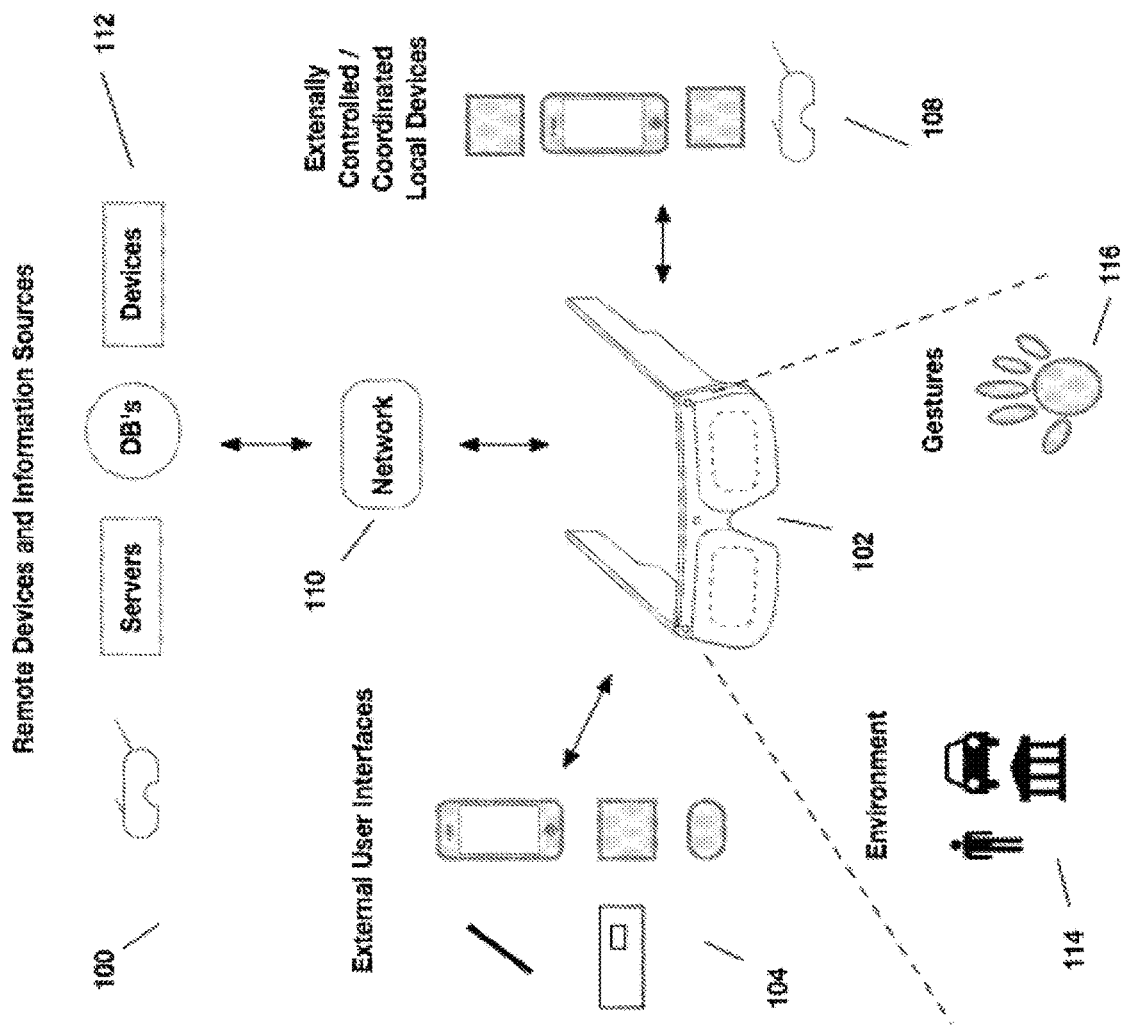
FIG. 1 illustrates a head worn computing system in accordance with the principles of the present disclosure.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI (e.g. air mouse, finger mounted mouse), such as a keyboard, touch surface, button (s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
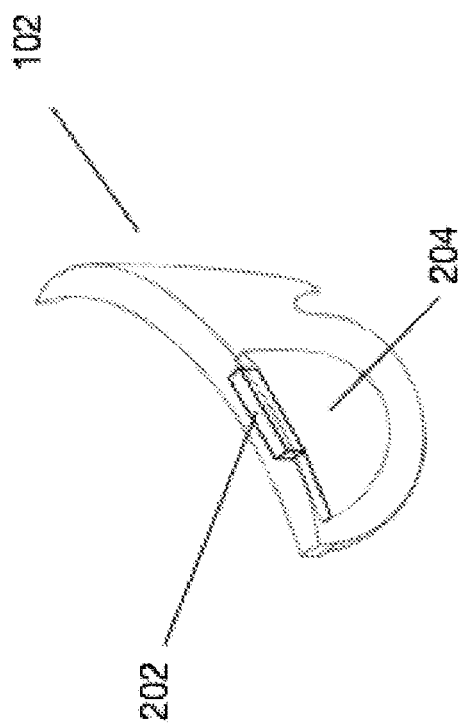
FIG. 2 illustrates a head worn computing system with optical system in accordance with the principles of the present disclosure.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present disclosure includes other physical configurations, such as that when the two modules are combined into a single module or where the elements making up the two modules are configured into more than two modules. In embodiments, the upper module 202 includes a computer controlled display (e.g. LCoS, FLCoS, DLP, OLED, backlit LCD, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present disclosure that embodiments will contain two image light delivery systems, one for each eye.

Figure 3:
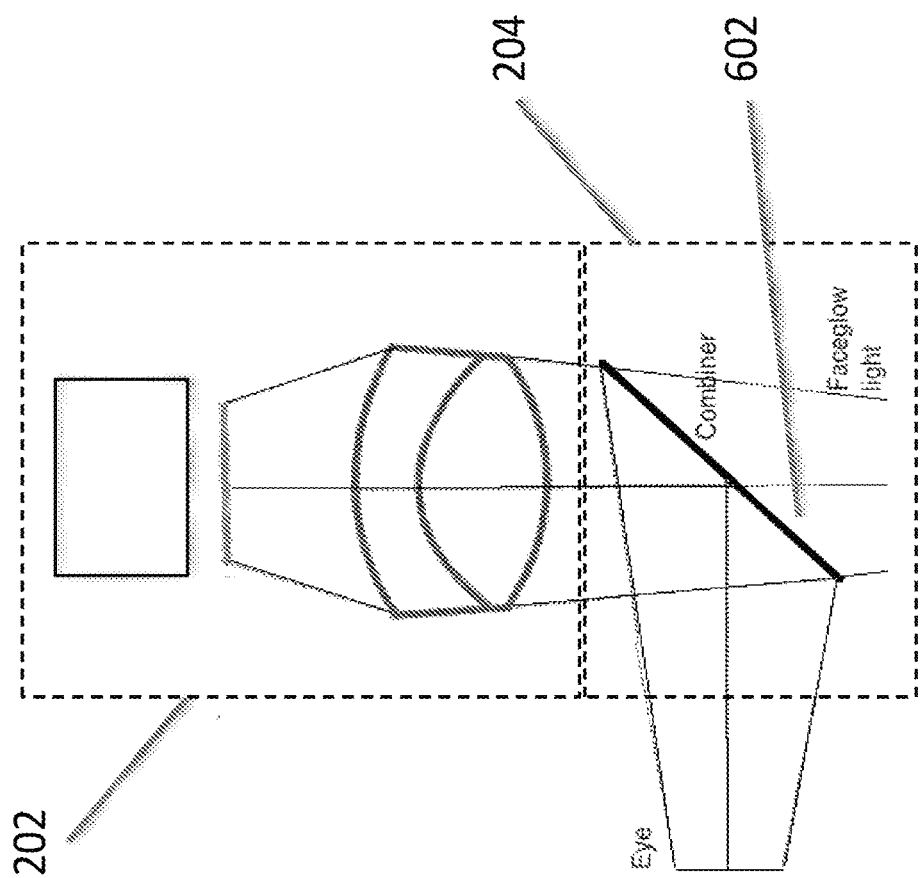
FIG. 3 illustrates upper and lower optical modules in accordance with the principles of the present disclosure.

FIG. 3 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror maybe included on the combiner surface. For example, in a three-color embodiment, where red, green and blue pixels are generated in the image light, the holographic mirror may be reflective to wavelengths substantially matching the wavelengths of the red, green and blue light provided in the image light. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the environmental surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided in the image light by the light source and substantially transmit the remaining wavelengths in the visible spectrum. For example, in the case where red, green and blue light is provided by the light source in the upper optics to enable full color images to be provided to the user, the notch mirror is a tristimulus notch mirror wherein the multilayer coating is designed to substantially reflect narrow bands of red, green and blue light that are matched to the what is provided by the light source and the remaining visible wavelengths are substantially transmitted through the coating to enable a view of the environment through the combiner. In another example where monochrome images are provided to the user, the notch mirror is designed to reflect a single narrow band of light that is matched to the wavelength range of the image light provided by the upper optics while transmitting the remaining visible wavelengths to enable a see-thru view of the environment. The combiner 602 with the notch mirror would operate, from the user's perspective, in a manner similar to the combiner that includes a holographic pattern on the combiner element 602. The combiner, with the tristimulus notch mirror, would reflect image light associated with pixels, to the eye because of the match between the reflective wavelengths of the notch mirror and the wavelengths or color of the image light, and the wearer would simultaneously be able to see with high clarity the environmental surroundings. The transparency between the user's eye and the surrounding may be approximately 80% when using the tristimulus notch mirror. In addition, the image provided with the notch mirror combiner can provide higher contrast images than the holographic mirror combiner because the notch mirror acts in a purely reflective manner compared to the holographic mirror which operates through diffraction, and as such the notch mirror is subject to less scattering of the imaging light by the combiner. In another embodiment, the combiner element 602 may include a simple partial mirror that reflects a portion (e.g. 50%) of all wavelengths of light in the visible.

Image light can escape through the combiner 602 and may produce face glow from the optics shown in FIG. 3, as the escaping image light is generally directed downward onto the cheek of the user. When using a holographic mirror combiner or a tristimulus notch mirror combiner, the escaping light can be trapped to avoid face glow. In embodiments, if the image light is polarized before the combiner, a linear polarizer can be laminated, or otherwise associated, to the combiner, with the transmission axis of the polarizer oriented relative to the polarized image light so that any escaping image light is absorbed by the polarizer. In embodiments, the image light would be polarized to provide S polarized light to the combiner for better reflection. As a result, the linear polarizer on the combiner would be oriented to absorb S polarized light and pass P polarized light. This provides the preferred orientation of polarized sunglasses as well.

If the image light is unpolarized, a microlouvered film such as a privacy filter can be used to absorb the escaping image light while providing the user with a see-thru view of the environment. In this case, the absorbance or transmittance of the microlouvered film is dependent on the angle of the light. Where steep angle light is absorbed and light at less of an angle is transmitted. For this reason, in an embodiment, the combiner with the microlouver film is angled at greater than 45 degrees to the optical axis of the image light (e.g. the combiner can be oriented at 50 degrees so the image light from the file lens is incident on the combiner at an oblique angle.

Figure 4:
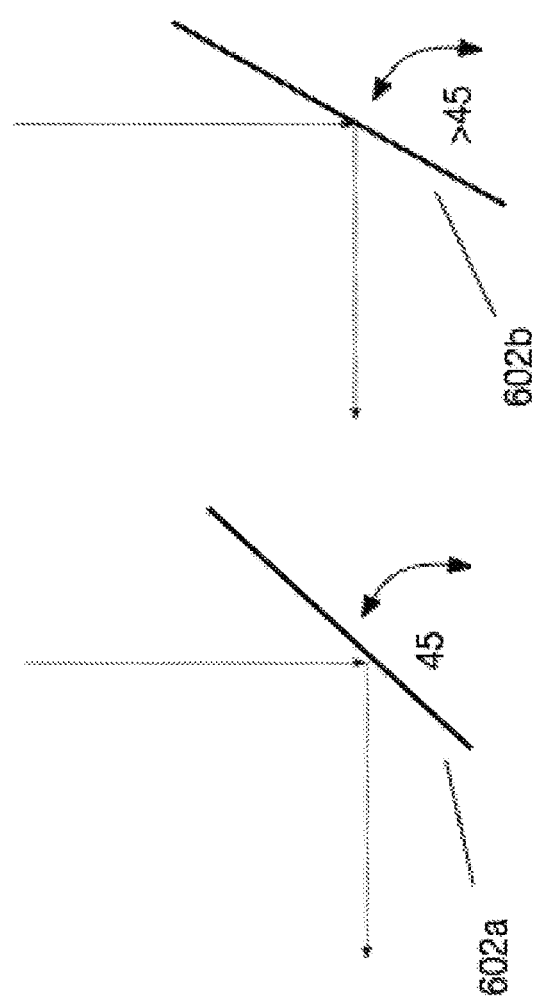
FIG. 4 illustrates angles of combiner elements in accordance with the principles of the present disclosure.

FIG. 4 illustrates an embodiment of a combiner element 602 at various angles when the combiner element 602 includes a holographic mirror. Normally, a mirrored surface reflects light at an angle equal to the angle that the light is incident to the mirrored surface. Typically, this necessitates that the combiner element be at 45 degrees, 602*a*, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed (including the tristimulus notch mirror described previously), the incident angle equals the reflected angle. As a result, increasing the angle of the combiner 602*a* requires that the incident image light be presented to the combiner 602*a* at a different angle which positions the upper optical module 202 to the left of the combiner as shown in FIG. 4. In contrast, a holographic mirror combiner, included in embodiments, can be made such that light is reflected at a different angle from the angle that the light is incident onto the holographic mirrored surface. This allows freedom to select the angle of the combiner element 602*b* independent of the angle of the incident image light and the angle of the light reflected into the wearer's eye. In embodiments, the angle of the combiner element 602*b* is greater than 45 degrees (shown in FIG. 4) as this allows a more laterally compact HWC design. The increased angle of the combiner element 602*b* decreases the front to back width of the lower optical module 204 and may allow for a thinner HWC display (i.e. the furthest element from the wearer's eye can be closer to the wearer's face).

Figure 5:
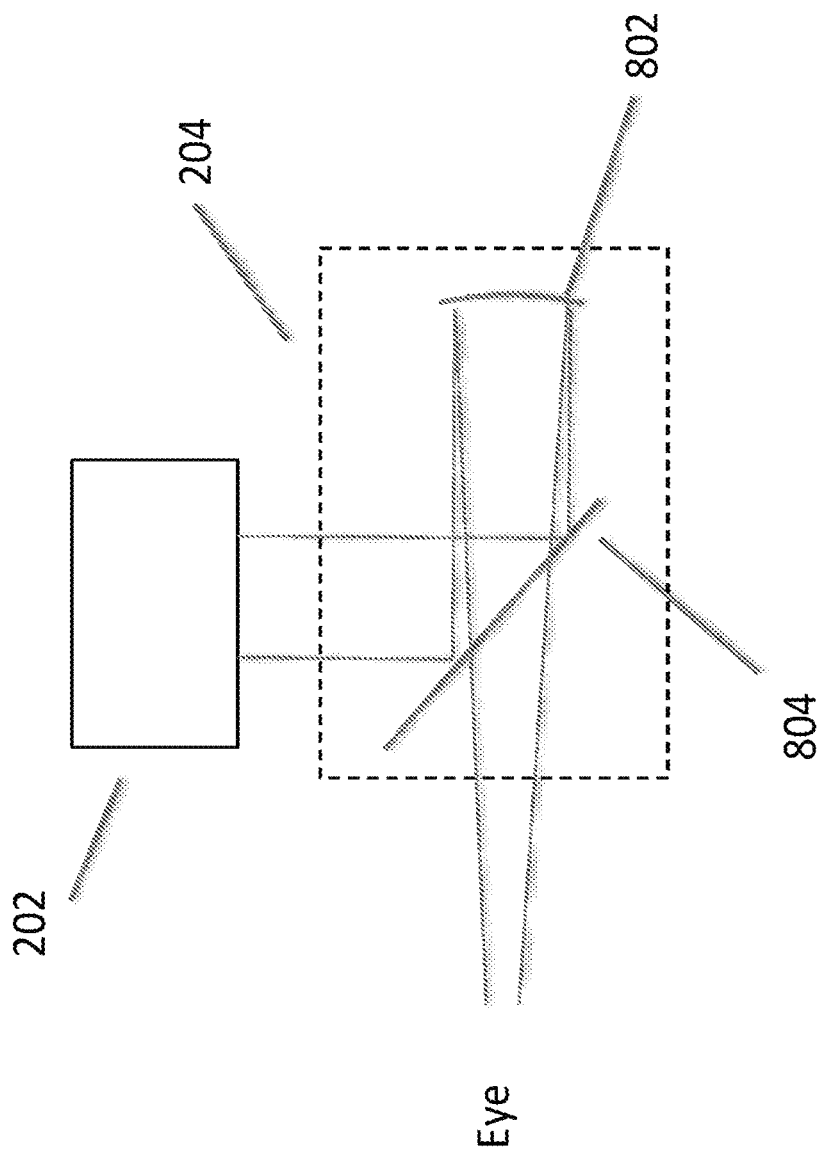
FIG. 5 illustrates upper and lower optical modules in accordance with the principles of the present disclosure.

FIG. 5 illustrates another embodiment of a lower optical module 204. In this embodiment, polarized or unpolarized image light provided by the upper optical module 202, is directed into the lower optical module 204. The image light reflects off a partial mirror 804 (e.g. polarized mirror, notch mirror, holographic mirror, etc.) and is directed toward a curved partially reflective mirror 802. The curved partial mirror 802 then reflects the image light back towards the user's eye, which passes through the partial mirror 804. The user can also see through the partial mirror 804 and the curved partial mirror 802 to see the surrounding environment. As a result, the user perceives a combined image comprised of the displayed image light overlaid onto the see-thru view of the environment. In a preferred embodiment, the partial mirror 804 and the curved partial mirror 802 are both non-polarizing so that the transmitted light from the surrounding environment is unpolarized so that rainbow interference patterns are eliminated when looking at polarized light in the environment such as provided by a computer monitor or in the reflected light from a lake.

While many of the embodiments of the present disclosure have been referred to as upper and lower modules containing certain optical components, it should be understood that the image light production and management functions described in connection with the upper module may be arranged to direct light in other directions (e.g. upward, sideward, etc.). In embodiments, it may be preferred to mount the upper module 202 above the wearer's eye, in which case the image light would be directed downward. In other embodiments it may be preferred to produce light from the side of the wearer's eye, or from below the wearer's eye. In addition, the lower optical module is generally configured to deliver the image light to the wearer's eye and allow the wearer to see through the lower optical module, which may be accomplished through a variety of optical components.

Figure 6:
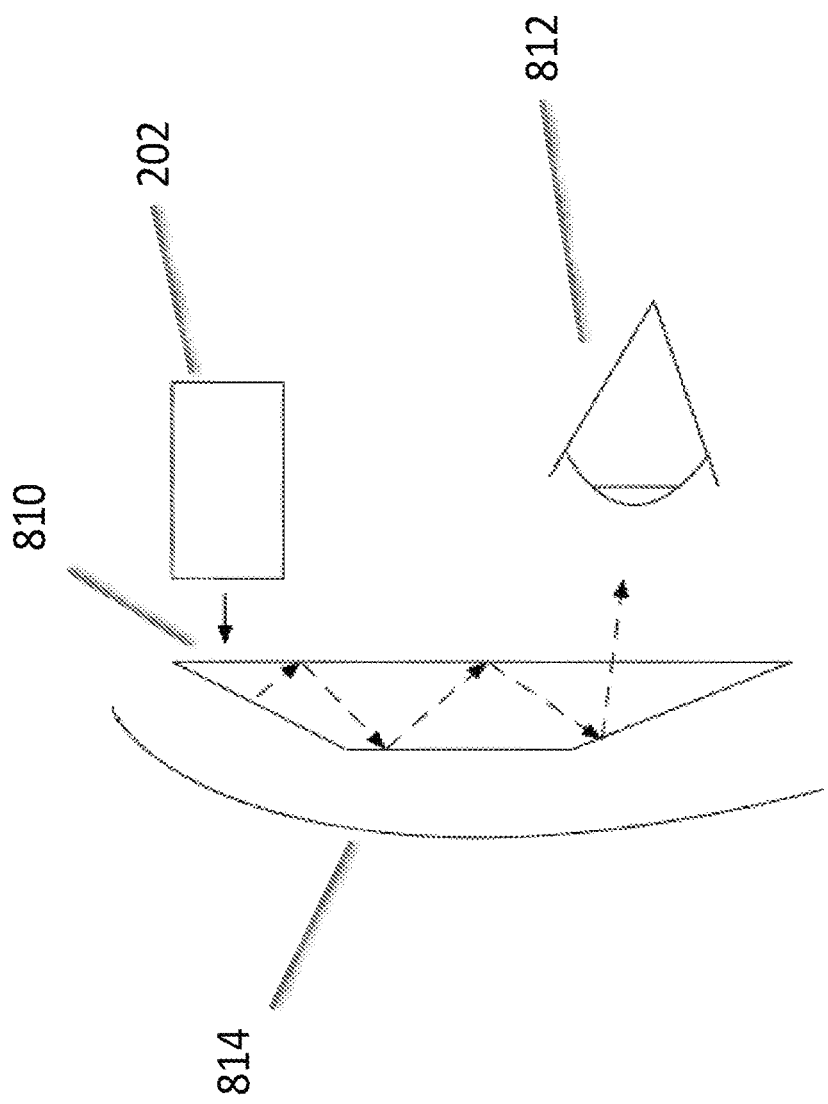
FIG. 6 illustrates upper and lower optical modules in accordance with the principles of the present disclosure.

FIG. 6 illustrates an embodiment of the present disclosure where the upper optical module 202 is arranged to direct image light into a total internal reflection (TIR) waveguide 810. In this embodiment, the upper optical module 202 is positioned above the wearer's eye 812 and the light is directed horizontally into the TIR waveguide 810. The TIR waveguide is designed to internally reflect the image light in a series of downward TIR reflections until it reaches the portion in front of the wearer's eye, where the light passes out of the TIR waveguide 812 in a direction toward the wearer's eye. In this embodiment, an outer shield 814 may be positioned in front of the TIR waveguide 810.

Figure 7:
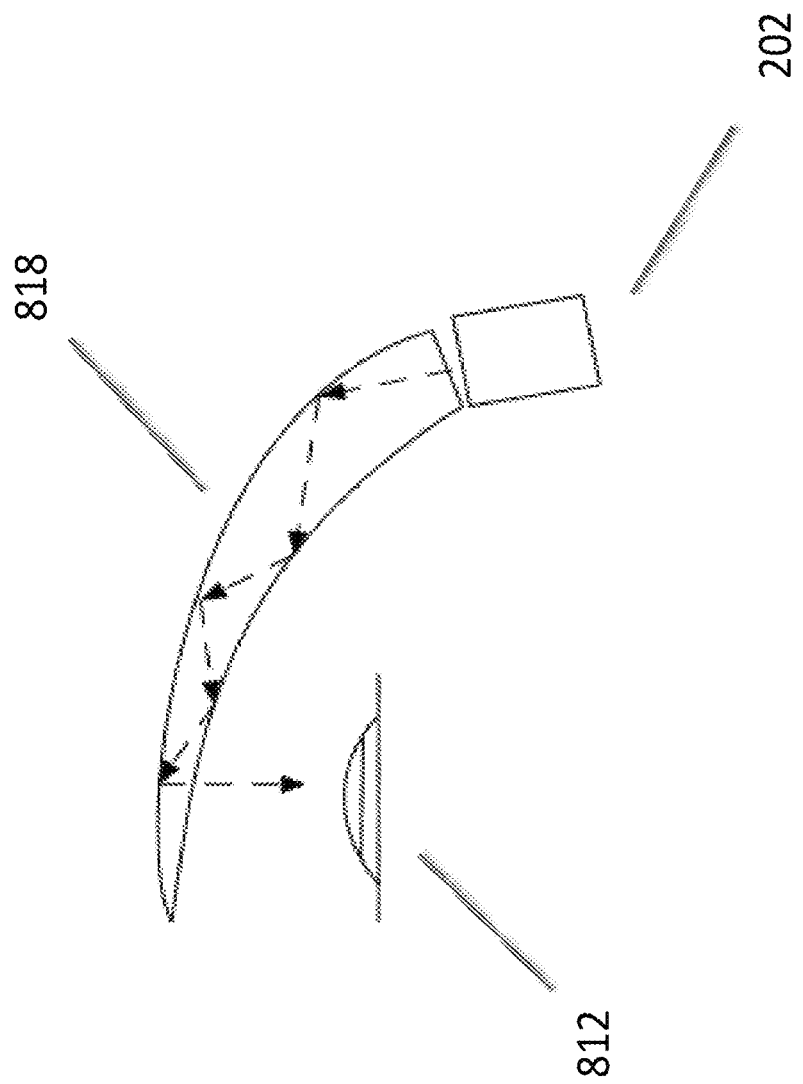
FIG. 7 illustrates upper and lower optical modules in accordance with the principles of the present disclosure.

FIG. 7 illustrates an embodiment of the present disclosure where the upper optical module 202 is arranged to direct image light into a TIR waveguide 818. In this embodiment, the upper optical module 202 is arranged on the side of the TIR waveguide 818. For example, the upper optical module may be positioned in the arm or near the arm of the HWC when configured as a pair of head worn glasses. The TIR waveguide 818 is designed to internally reflect the image light in a series of TIR reflections until it reaches the portion in front of the wearer's eye, where the light passes out of the TIR waveguide 818 in a direction toward the wearer's eye 812.

Figure 8:
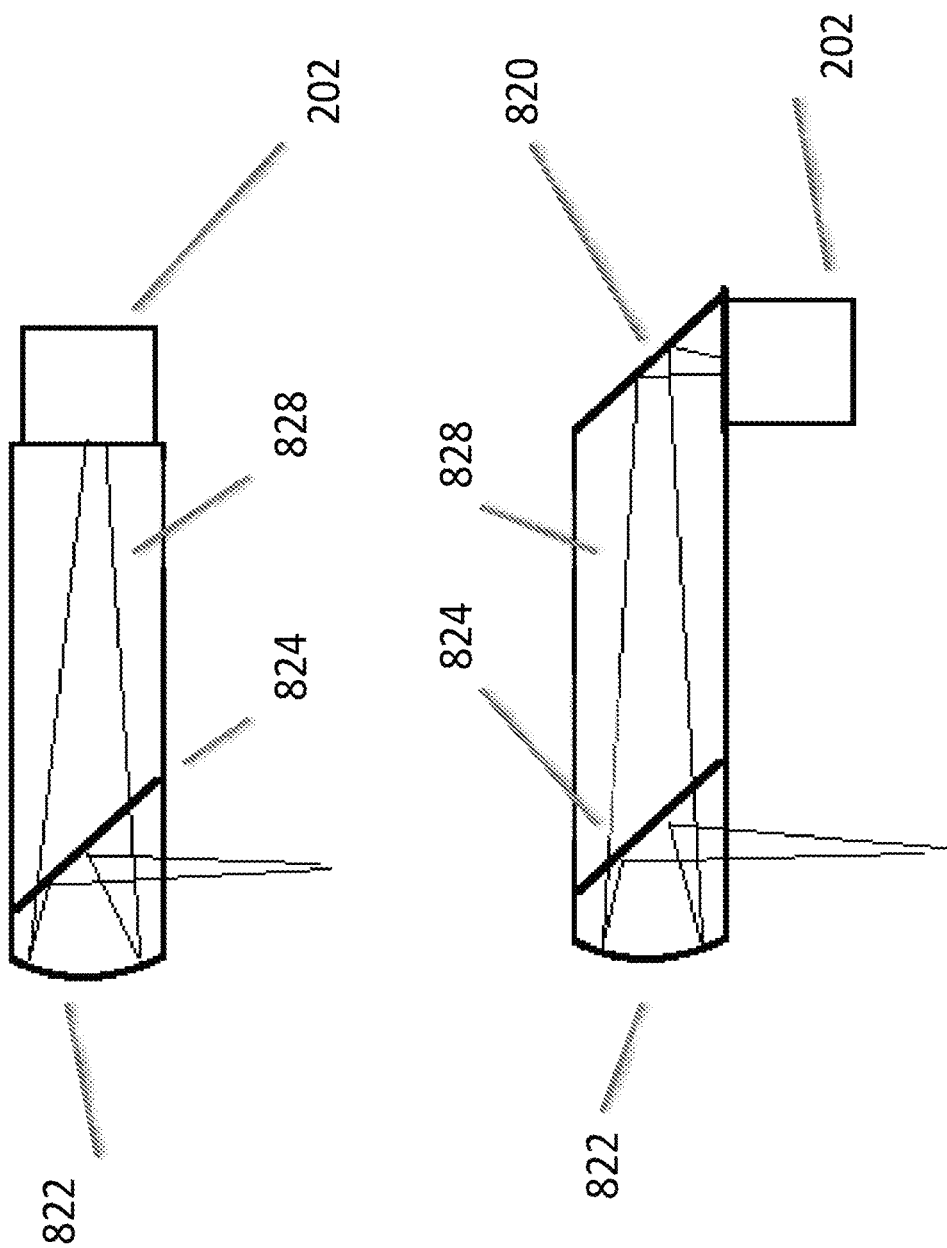
FIG. 8 illustrates upper and lower optical modules in accordance with the principles of the present disclosure.

FIG. 8 illustrates yet further embodiments of the present disclosure where an upper optical module 202 directs polarized image light into an optical guide 828 where the image light passes through a polarized reflector 824, changes polarization state upon reflection of the optical element 822 which includes a ¼ wave film for example and then is reflected by the polarized reflector 824 towards the wearer's eye, due to the change in polarization of the image light. The upper optical module 202 may be positioned behind the optical guide 828 wherein the image light is directed toward a mirror 820 that reflects the image light along the optical guide 828 and towards the polarized reflector 824. Alternatively, in other embodiments, the upper optical module 202 may direct the image light directly along the optical guide 828 and towards the polarized reflector 824. It should be understood that the present disclosure comprises other optical arrangements intended to direct image light into the wearer's eye.

Figure 9:
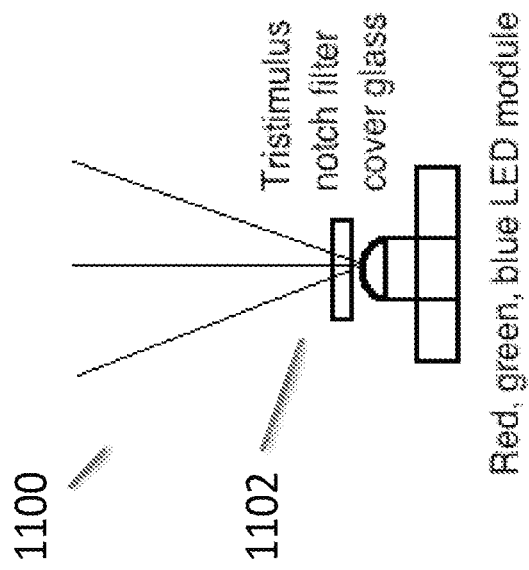
FIGS. 9, 10a, 10b and 11 illustrate light sources and filters in accordance with the principles of the present disclosure.
Figure 10A:
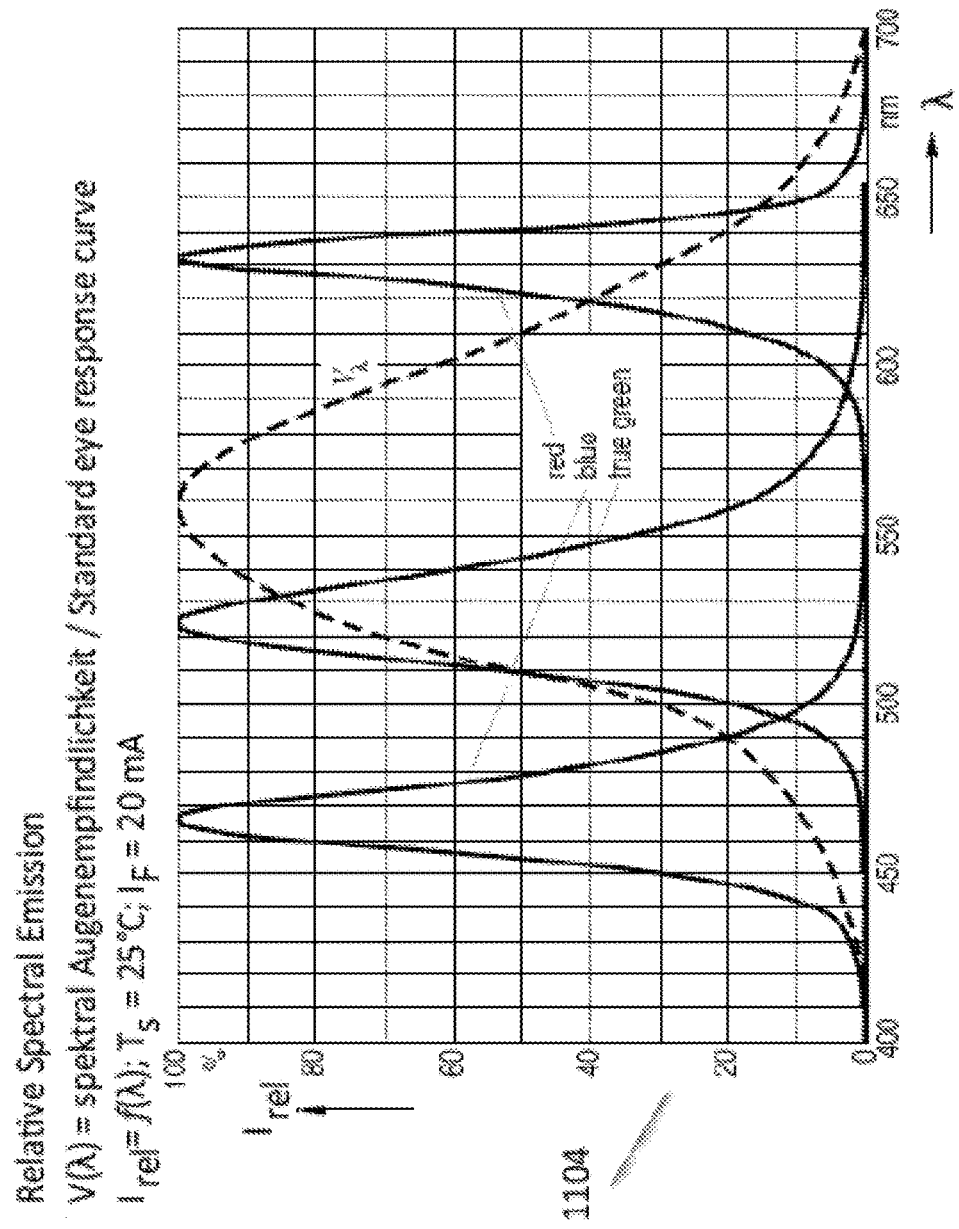
Figure 10B:
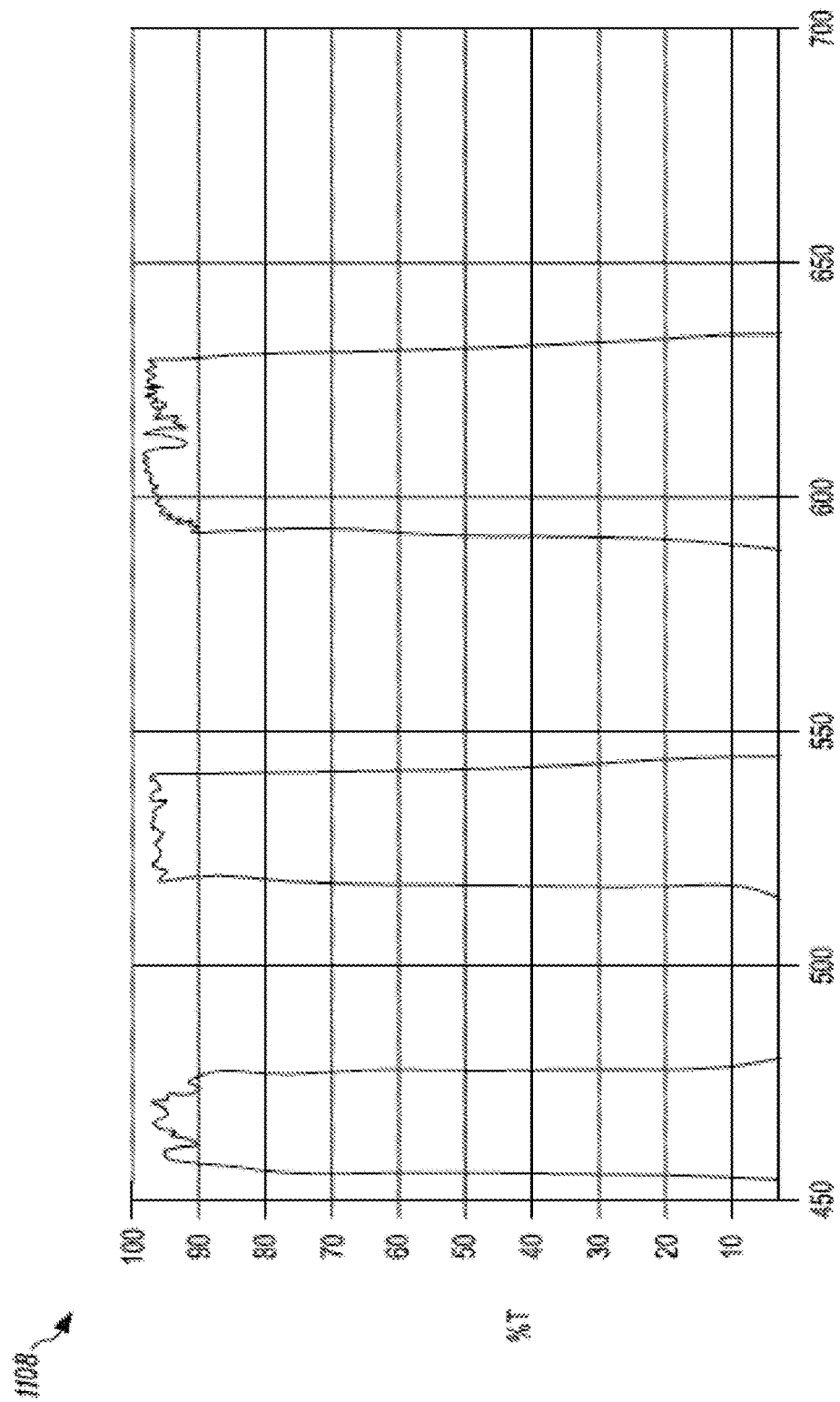
Figure 11:
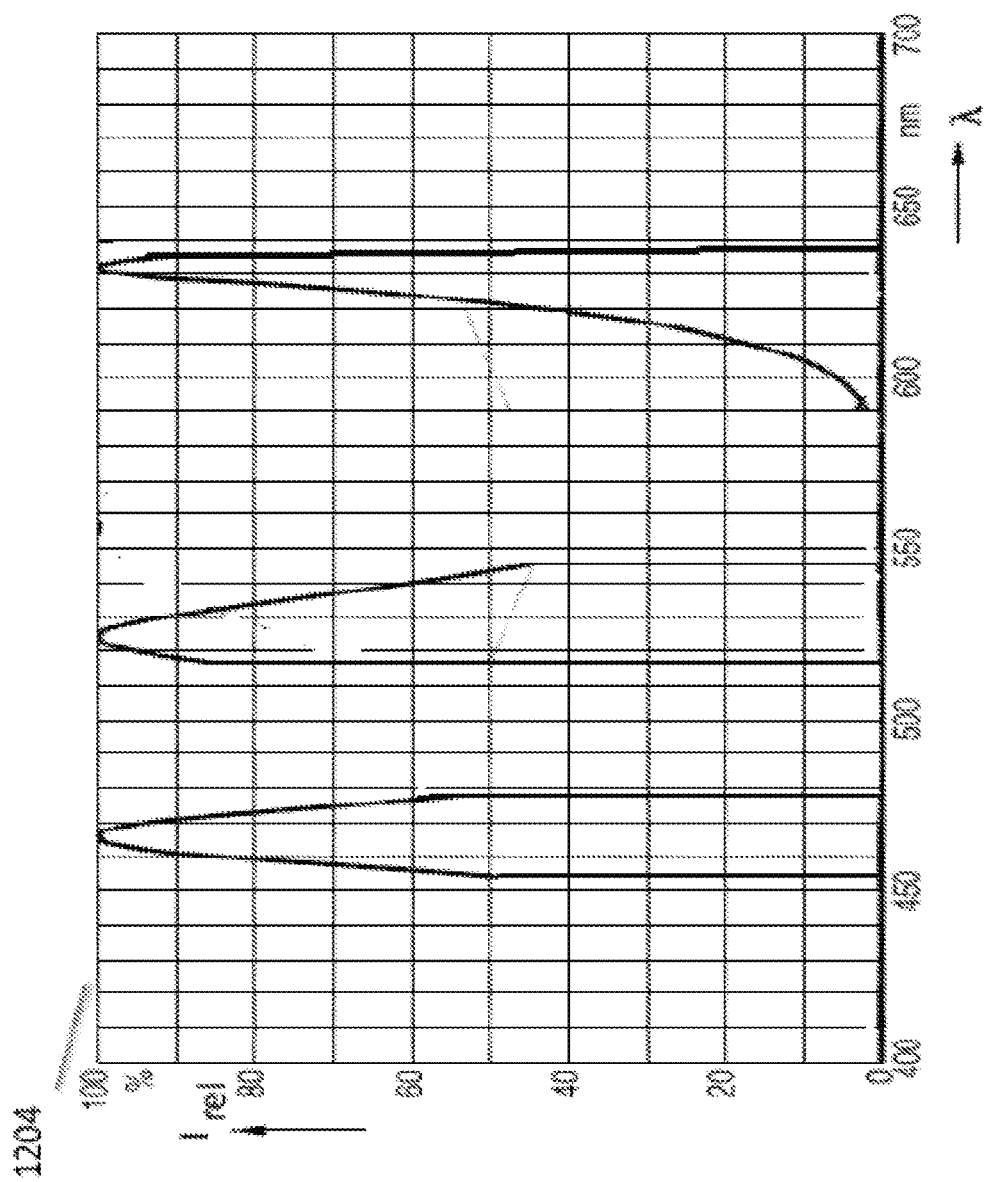

FIG. 9 illustrates a light source 1100 that may be used in association with the upper optics module 202. In embodiments, the light source 1100 may provide light to a backlighting optical system that is associated with the light source 1100 and which serves to homogenize the light and thereby provide uniform illuminating light to an image source in the upper optics. In embodiments, the light source 1100 includes a tristimulus notch filter 1102. The tristimulus notch filter 1102 has narrow band pass filters for three wavelengths, as indicated in FIG. 10b in a transmission graph 1108. The graph shown in FIG. 10a, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11 as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a matched combiner 602 that includes a holographic mirror or tristimulus notch mirror that substantially reflects the narrow bands of image light toward the wearer's eye with a reduced amount of image light that does not get reflected by the combiner, thereby improving efficiency of the head-worn computer (HWC) or head-mounted display (HMD) and reducing escaping light that can cause faceglow.

Figure 12A:
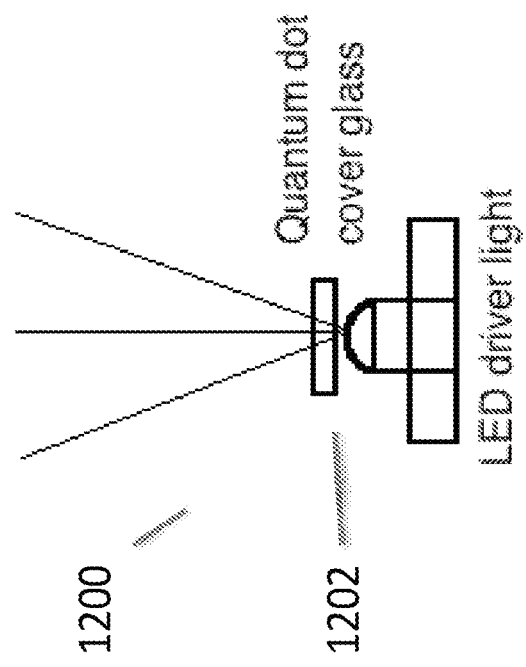
FIGS. 12a to 12c illustrate light sources and quantum dot systems in accordance with the principles of the present disclosure.
Figure 12B:
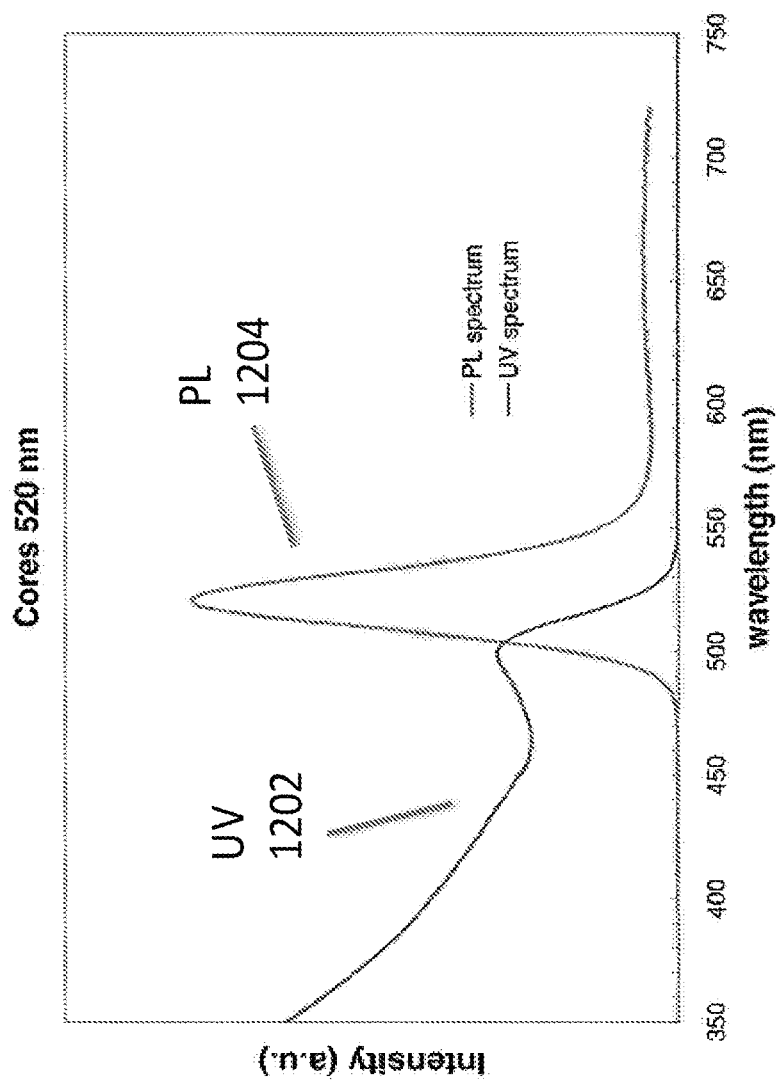
Figure 12C:
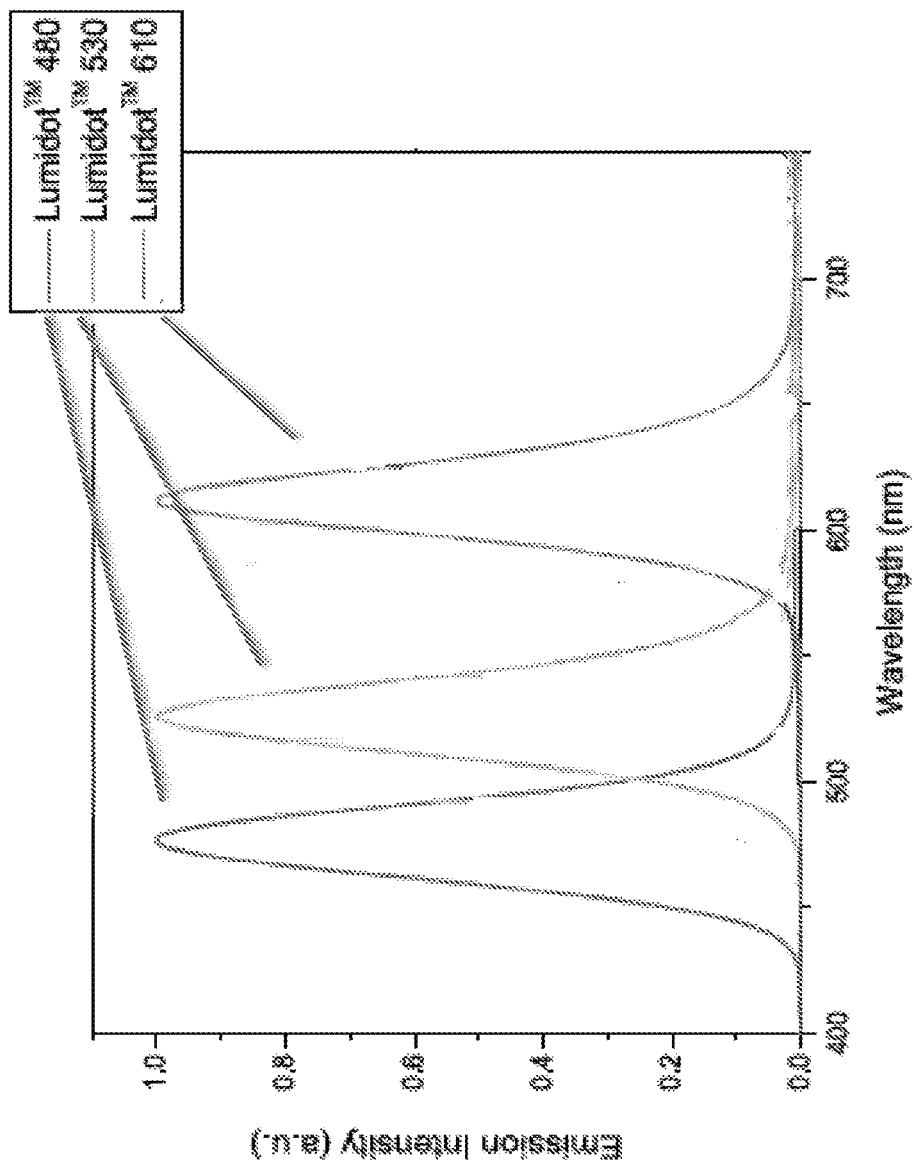

FIG. 12a illustrates another light source 1200 that may be used in association with the upper optics module 202. In embodiments, the light source 1200 may provide light to a backlighting optical system that homogenizes the light prior to illuminating the image source in the upper optics as described previously herein. In embodiments, the light source 1200 includes a quantum dot cover glass 1202. Where the quantum dots absorb light of a shorter wavelength and emit light of a longer wavelength (FIG. 12b shows an example wherein a UV spectrum 1202 applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12c where three different quantum dots are used. In embodiments, the LED driver light emits UV light, deep blue or blue light. For sequential illumination of different colors, multiple light sources 1200 would be used where each light source 1200 would include a quantum dot cover glass 1202 with at least one type of quantum dot selected to emit at one of each of the desired colors. The light source 1100 can be used in connection with a combiner 602 with a holographic mirror or tristimulus notch mirror to provide narrow bands of image light that are reflected toward the wearer's eye with less wasted image light that does not get reflected.

Another aspect of the present disclosure relates to the generation of peripheral image lighting effects for a person wearing a HWC. In embodiments, a solid state lighting system (e.g. LED, OLED, etc), or other lighting system, may be included inside the optical elements of an lower optical module 204. The solid state lighting system may be arranged such that lighting effects outside of a field of view (FOV) associated with displayed digital content is presented to create an immersive effect for the person wearing the HWC. To this end, the lighting effects may be presented to any portion of the HWC that is visible to the wearer. The solid state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
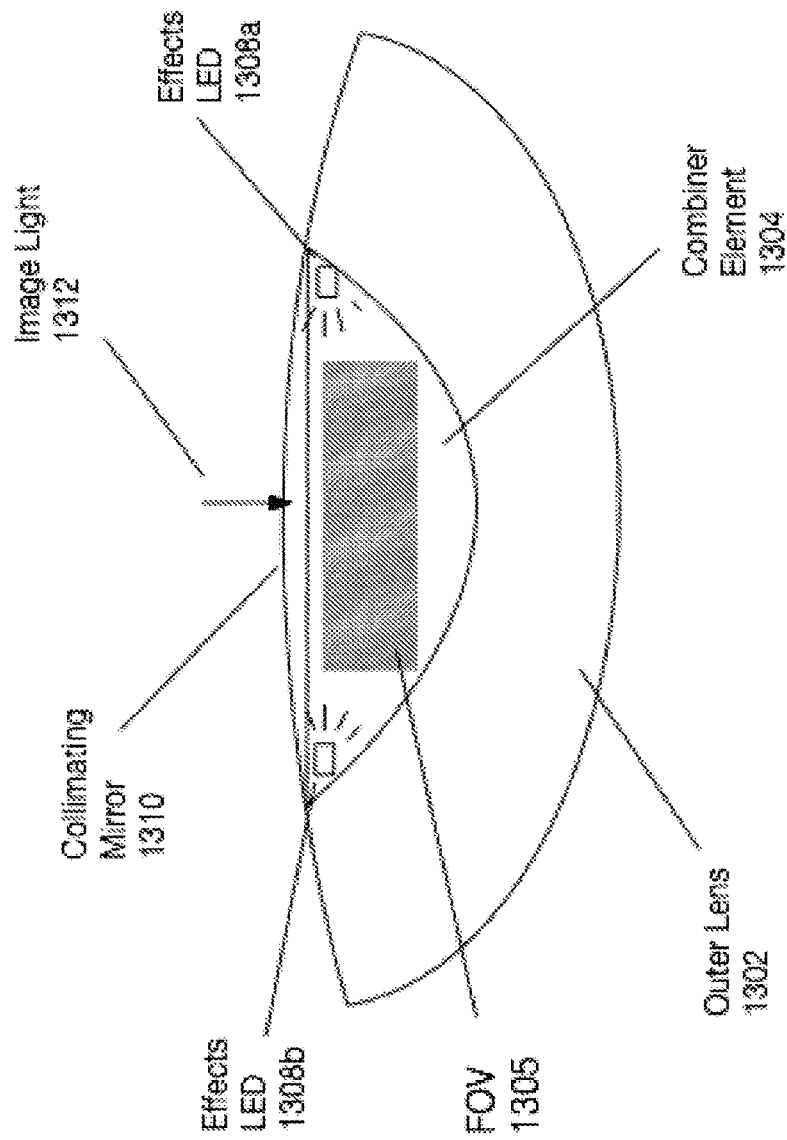

FIG. 13a illustrates optical components of a lower optical module 204 together with an outer lens 1302. FIG. 13a also shows an embodiment including effects LED's 1308a and 1308b. FIG. 13a illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13a) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, the image light may or may not be polarized and the see-through view of the surrounding environment is preferably non-polarized to provide a view of the surrounding environment that does not include rainbow interference patterns if the light from the surrounding environment is polarized such as from a computer monitor or reflections from a lake. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13a, the effects LEDs 1308a and 1308b are positioned at the sides of the combiner element 1304 and the outer lens 1302 and/or the collimating mirror 1310. In embodiments, the effects LEDs 1308a are positioned within the confines defined by the combiner element 1304 and the outer lens 1302 and/or the collimating mirror. The effects LEDs 1308a and 1308b are also positioned outside of the FOV 1305 associated with the displayed digital content. In this arrangement, the effects LEDs 1308a and 1308b can provide lighting effects within the lower optical module outside of the FOV 1305. In embodiments the light emitted from the effects LEDs 1308a and 1308b may be polarized and the outer lens 1302 may include a polarizer such that the light from the effects LEDs 1308a and 1308b will pass through the combiner element 1304 toward the wearer's eye and will be absorbed by the outer lens 1302. This arrangement provides peripheral lighting effects to the wearer in a more private setting by not transmitting the lighting effects through the front of the HWC into the surrounding environment. However, in other embodiments, the effects LEDs 1308a and 1308b may be non-polarized so the lighting effects provided are made to be purposefully viewable by others in the environment for entertainment such as giving the effect of the wearer's eye glowing in correspondence to the image content being viewed by the wearer.

FIG. 13b illustrates a cross section of the embodiment described in connection with FIG. 13a. As illustrated, the effects LED 1308a is located in the upper-front area inside of the optical components of the lower optical module. It should be understood that the effects LED 1308a position in the described embodiments is only illustrative and alternate placements are encompassed by the present disclosure. Additionally, in embodiments, there may be one or more effects LEDs 1308a in each of the two sides of HWC to provide peripheral lighting effects near one or both eyes of the wearer.

FIG. 13c illustrates an embodiment where the combiner element 1304 is angled away from the eye at the top and towards the eye at the bottom (e.g. in accordance with the holographic or notch filter embodiments described herein). In this embodiment, the effects LED 1308a may be located on the outer lens 1302 side of the combiner element 1304 to provide a concealed appearance of the lighting effects. As with other embodiments, the effects LED 1308a of FIG. 13c may include a polarizer such that the emitted light can pass through a polarized element associated with the combiner element 1304 and be blocked by a polarized element associated with the outer lens 1302. Alternatively the effects LED 13087a can be configured such that at least a portion of the light is reflected away from the wearer's eye so that it is visible to people in the surrounding environment. This can be accomplished for example by using a combiner 1304 that is a simple partial mirror so that a portion of the image light 1312 is reflected toward the wearer's eye and a first portion of the light from the effects LED 13087a is transmitted toward the wearer's eye and a second portion of the light from the effects LED 1308a is reflected outward toward the surrounding environment.

FIGS. 14a, 14b, 14c and 14d show illustrations of a HWC that includes eye covers 1402 to restrict loss of image light to the surrounding environment and to restrict the ingress of stray light from the environment. Where the eye covers 1402 can be removably attached to the HWC with magnets 1404. Another aspect of the present disclosure relates to automatically configuring the lighting system(s) used in the HWC 102. In embodiments, the display lighting and/or effects lighting, as described herein, may be controlled in a manner suitable for when an eye cover 1402 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1402 and then the HWC may go into a low light mode. The low light mode may, in some embodiments, only go into a low light mode when the eye cover 1402 is attached if the HWC identifies that the environment is in low light conditions (e.g. through environment light level sensor detection). In embodiments, the low light level may be determined to be at an intermediate point between full and low light dependent on environmental conditions.

Another aspect of the present disclosure relates to automatically controlling the type of content displayed in the HWC when eye covers 1402 are attached or removed from the HWC. In embodiments, when the eye cover(s) 1402 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Another aspect of the present disclosure relates to a system adapted to quickly convert from a see-through system to a non-see-through or very low transmission see-through system for a more immersive user experience. The conversion system may include replaceable lenses, an eye cover, and optics adapted to provide user experiences in both modes. The outer lenses, for example, may be 'blacked-out' with an opaque cover 1412 to provide an experience where all of the user's attention is dedicated to the digital content and then the outer lenses may be switched out for high see-through lenses so the digital content is augmenting the user's view of the surrounding environment. Another aspect of the disclosure relates to low transmission outer lenses that permit the user to see through the outer lenses but remain dark enough to maintain most of the user's attention on the digital content. The slight see-through can provide the user with a visual connection to the surrounding environment and this can reduce or eliminate nausea and other problems associated with total removal of the surrounding view when viewing digital content.

Figure 14A:
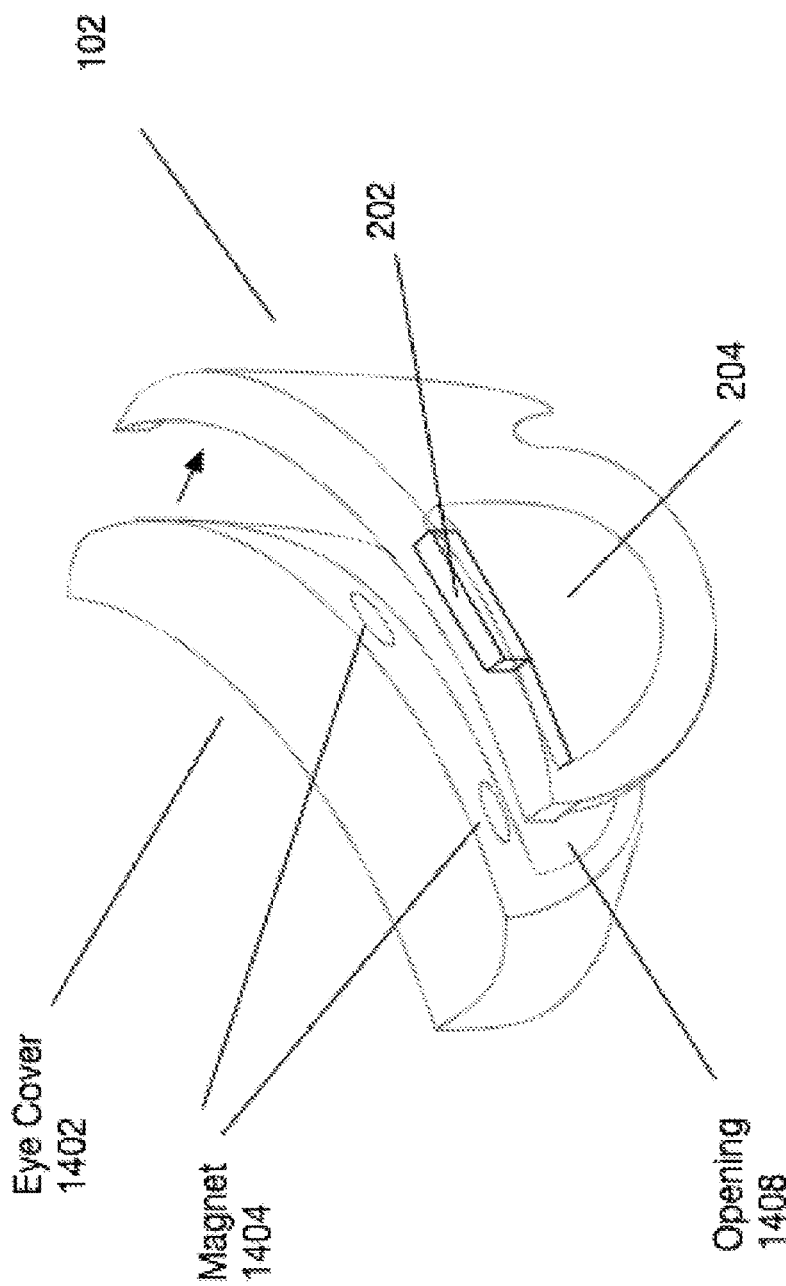
Figure 14B:
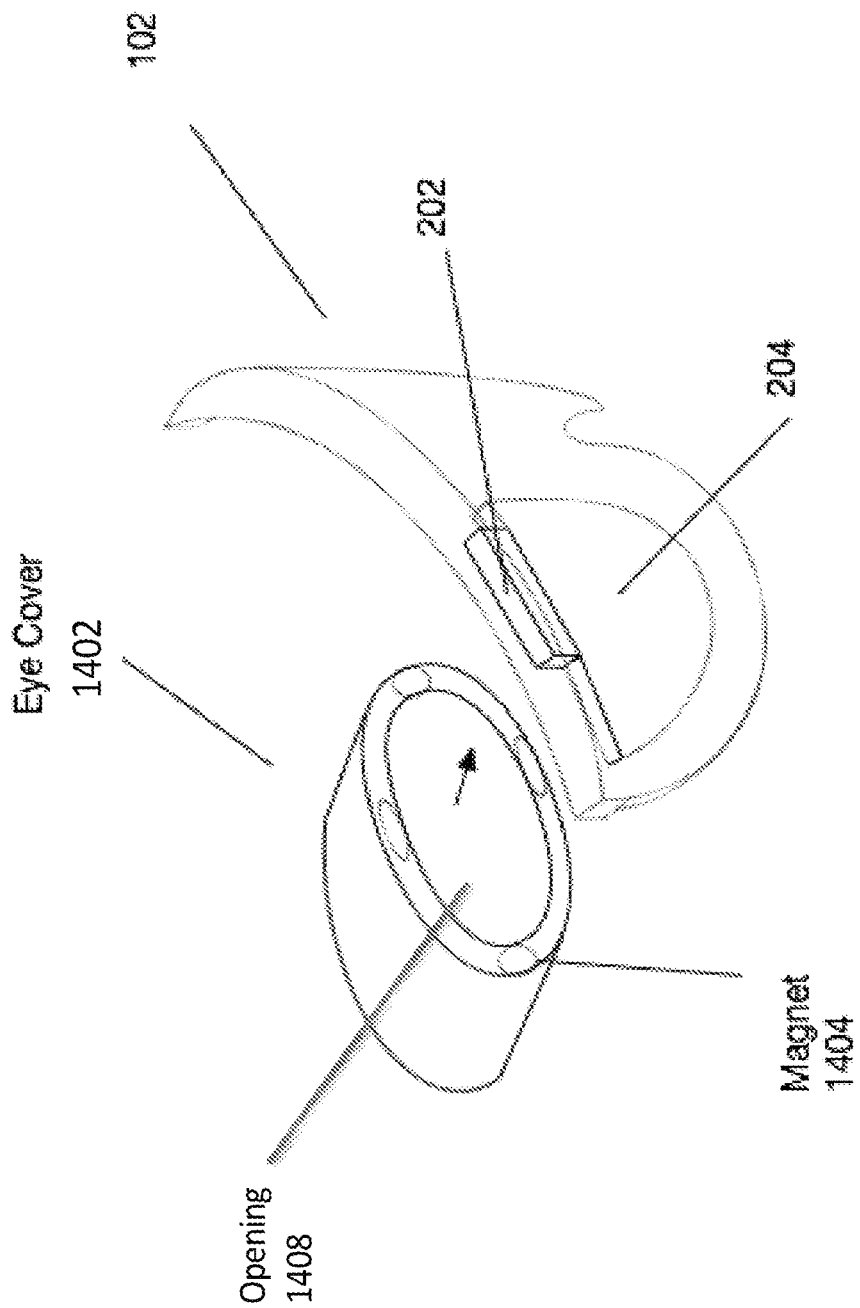
Figure 14C:
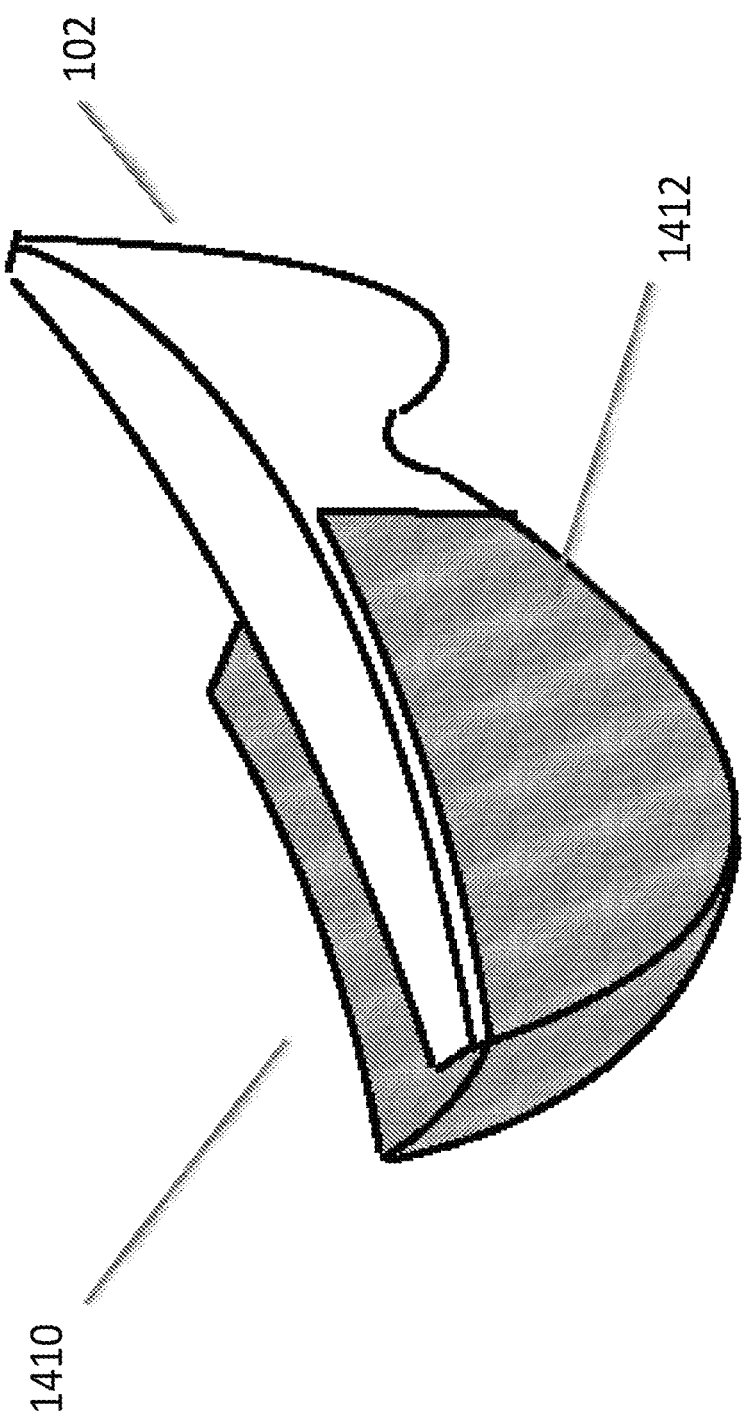
Figure 14D:
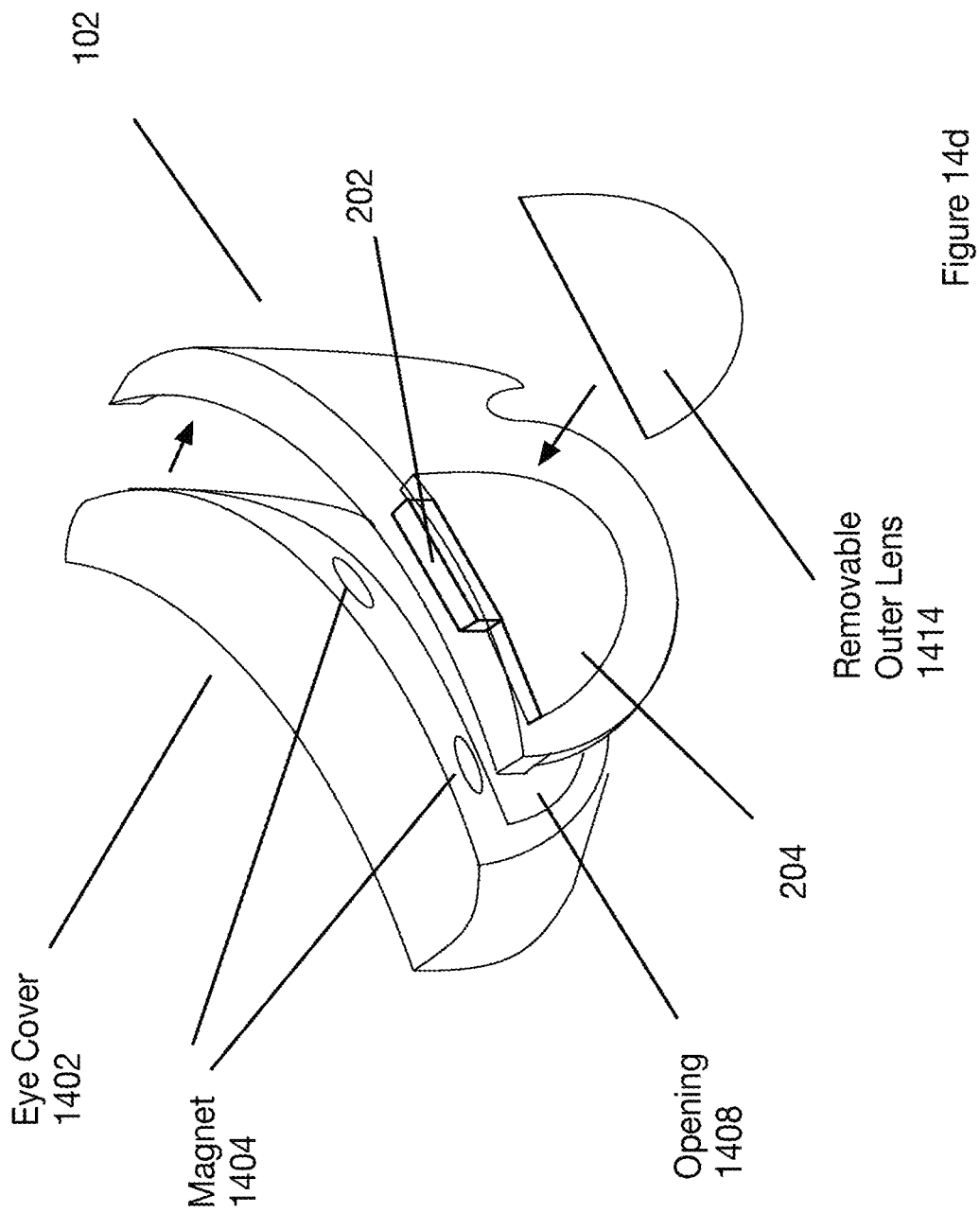

FIG. 14d illustrates a head-worn computer system 102 with a see-through digital content display 204 adapted to include a removable outer lens 1414 and a removable eye cover 1402. The eye cover 1402 may be attached to the head-worn computer 102 with magnets 1404 or other attachment systems (e.g. mechanical attachments, a snug friction fit between the arms of the head-worn computer 102, etc.). The eye cover 1402 may be attached when the user wants to cut stray light from escaping the confines of the head-worn computer, create a more immersive experience by removing the otherwise viewable peripheral view of the surrounding environment, etc. The removable outer lens 1414 may be of several varieties for various experiences. It may have no transmission or a very low transmission to create a dark background for the digital content, creating an immersive experience for the digital content. It may have a high transmission so the user can see through the see-through display and the outer lens 1414 to view the surrounding environment, creating a system for a heads-up display, augmented reality display, assisted reality display, etc. The outer lens 1414 may be dark in a middle portion to provide a dark background for the digital content (i.e. dark backdrop behind the see-through field of view from the user's perspective) and a higher transmission area elsewhere. The outer lenses 1414 may have a transmission in the range of 2 to 5%, 5 to 10%, 10 to 20% for the immersion effect and above 10% or 20% for the augmented reality effect, for example. The outer lenses 1414 may also have an adjustable transmission to facilitate the change in system effect. For example, the outer lenses 1414 may be electronically adjustable tint lenses (e.g. liquid crystal or have crossed polarizers with an adjustment for the level of cross).

In embodiments, the eye cover 1402 may have areas of transparency or partial transparency to provide some visual connection with the user's surrounding environment. This may also reduce or eliminate nausea or other feelings associated with the complete removal of the view of the surrounding environment.

Figure 14E:
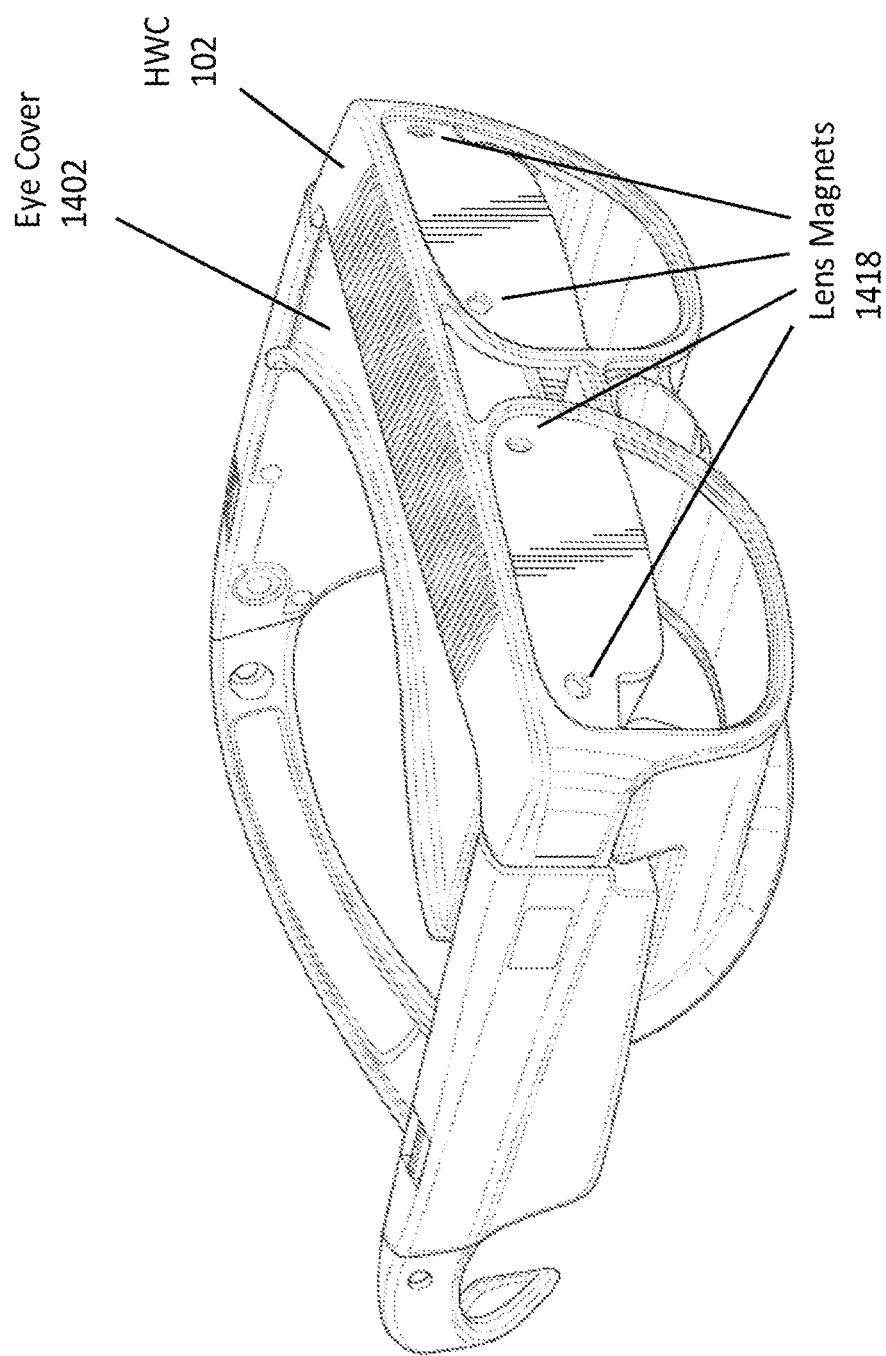

FIG. 14e illustrates a HWC 102 assembled with an eye cover 1402 without outer lenses in place. The outer lenses, in embodiments, may be held in place with magnets 1418 for ease of removal and replacement. In embodiments, the outer lenses may be held in place with other systems, such as mechanical systems.

Figure 14F:
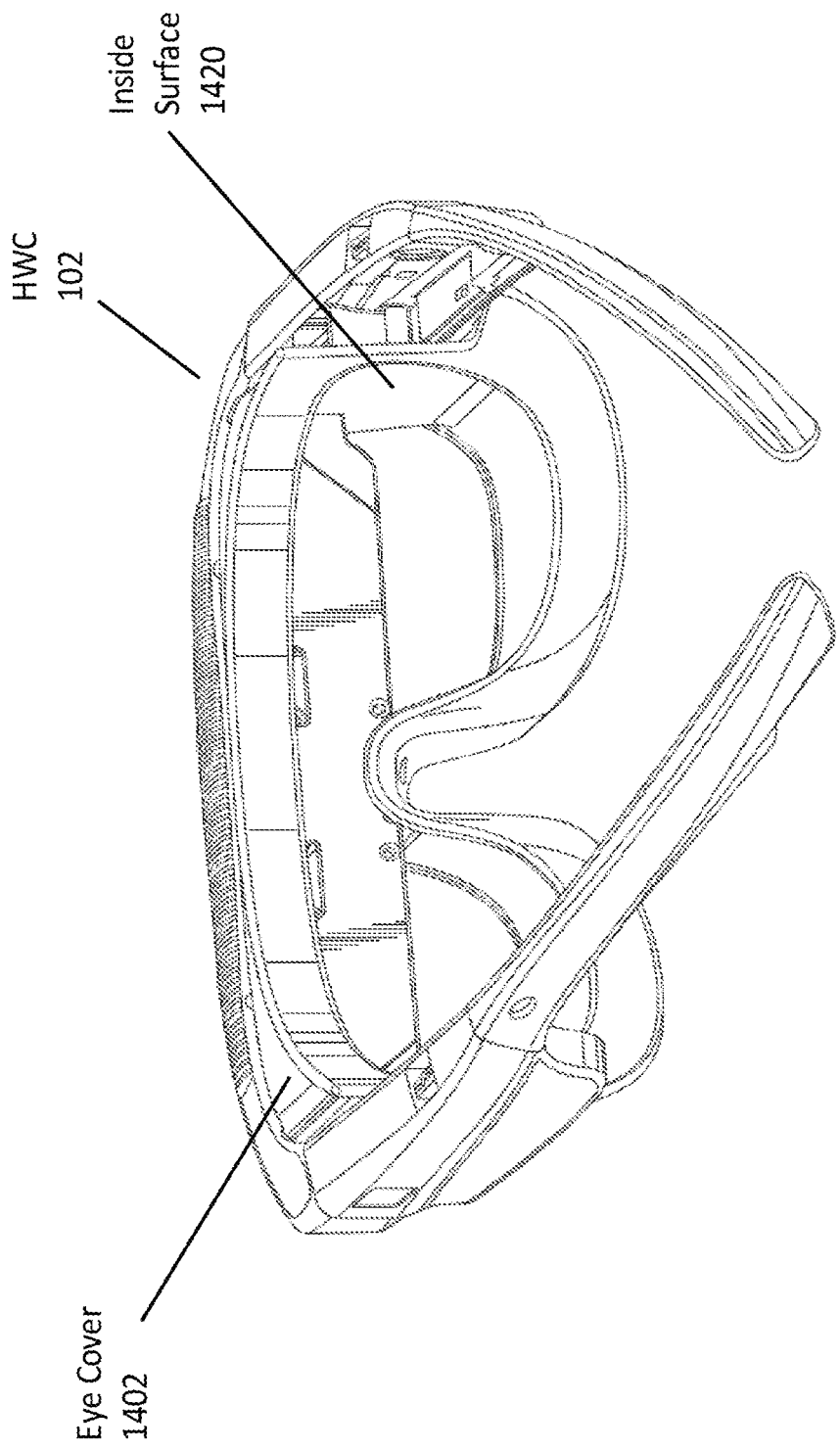

Another aspect of the present disclosure relates to an effects system that generates effects outside of the field of view in the see-through display of the head-worn computer. The effects may be, for example, lighting effects, sound effects, tactile effects (e.g. through vibration), air movement effects, etc. In embodiments, the effect generation system is mounted on the eye cover 1402. For example, a lighting system (e.g. LED(s), OLEDs, etc.) may be mounted on an inside surface 1420, or exposed through the inside surface 1420, as illustrated in FIG. 14f, such that they can create a lighting effect (e.g. a bright light, colored light, subtle color effect) in coordination with content being displayed in the field of view of the see-through display. The content may be a movie or a game, for example, and an explosion may happen on the right side of the content, as scripted, and matching the content, a bright flash may be generated by the effects lighting system to create a stronger effect. As another example, the effects system may include a vibratory system mounted near the sides or temples, or otherwise, and when the same explosion occurs, the vibratory system may generate a vibration on the right side to increase the user experience indicating that the explosion had a real sound wave creating the vibration. As yet a further example, the effects system may have an air system where the effect is a puff of air blown onto the user's face. This may create a feeling of closeness with some fast moving object in the content. The effects system may also have speakers directed towards the user's ears or an attachment for ear buds, etc.

In embodiments, the effects generated by the effects system may be scripted by an author to coordinate with the content. In embodiments, sensors may be placed inside of the eye cover to monitor content effects (e.g. a light sensor to measure strong lighting effects or peripheral lighting effects) that would than cause an effect(s) to be generated.

The effects system in the eye cover may be powered by an internal battery and the battery, in embodiments, may also provide additional power to the head-worn computer 102 as a back-up system. In embodiments, the effects system is powered by the batteries in the head-worn computer. Power may be delivered through the attachment system (e.g. magnets, mechanical system) or a dedicated power system.

The effects system may receive data and/or commands from the head-worn computer through a data connection that is wired or wireless. The data may come through the attachment system, a separate line, or through Bluetooth or other short range communication protocol, for example.

In embodiments, the eye cover 1402 is made of reticulated foam, which is very light and can contour to the user's face. The reticulated foam also allows air to circulate because of the open-celled nature of the material, which can reduce user fatigue and increase user comfort. The eye cover 1402 may be made of other materials, soft, stiff, priable, etc. and may have another material on the periphery that contacts the face for comfort. In embodiments, the eye cover 1402 may include a fan to exchange air between an external environment and an internal space, where the internal space is defined in part by the face of the user. The fan may operate very slowly and at low power to exchange the air to keep the face of the user cool. In embodiments the fan may have a variable speed controller and/or a temperature sensor may be positioned to measure temperature in the internal space to control the temperature in the internal space to a specified range, temperature, etc. The internal space is generally characterized by the space confined space in front of the user's eyes and upper cheeks where the eye cover encloses the area.

Another aspect of the present disclosure relates to flexibly mounting an audio headset on the head-worn computer 102 and/or the eye cover 1402. In embodiments, the audio headset is mounted with a relatively rigid system that has flexible joint(s) (e.g. a rotational joint at the connection with the eye cover, a rotational joint in the middle of a rigid arm, etc.) and extension(s) (e.g. a telescopic arm) to provide the user with adjustability to allow for a comfortable fit over, in or around the user's ear. In embodiments, the audio headset is mounted with a flexible system that is more flexible throughout, such as with a wire-based connection.

FIG. 14g illustrates a head-worn computer 102 with removable lenses 1414 along with a mounted eye cover 1402. The head-worn computer, in embodiments, includes a see-through display (as disclosed herein). The eye cover 1402 also includes a mounted audio headset 1422. The mounted audio headset 1422 in this embodiment is mounted to the eye cover 1402 and has audio wire connections (not shown). In embodiments, the audio wires' connections may connect to an internal wireless communication system (e.g. Bluetooth, NFC, WiFi) to make connection to the processor in the head-worn computer. In embodiments, the audio wires may connect to a magnetic connector, mechanical connector or the like to make the connection.

FIG. 14h illustrates an unmounted eye cover 1402 with a mounted audio headset 1422. As illustrated, the mechanical design of the eye cover is adapted to fit onto the head-worn computer to provide visual isolation or partial isolation and the audio headset.

In embodiments, the eye cover 1402 may be adapted to be removably mounted on a head-worn computer 102 with a see-through computer display. An audio headset 1422 with an adjustable mount may be connected to the eye cover, wherein the adjustable mount may provide extension and rotation to provide a user of the head-worn computer with a mechanism to align the audio headset with an ear of the user. In embodiments, the audio headset includes an audio wire connected to a connector on the eye cover and the eye cover connector may be adapted to removably mate with a connector on the head-worn computer. In embodiments, the audio headset may be adapted to receive audio signals from the head-worn computer 102 through a wireless connection (e.g. Bluetooth, WiFi). As described elsewhere herein, the head-worn computer 102 may have a removable and replaceable front lens 1414. The eye cover 1402 may include a battery to power systems internal to the eye cover 1402. The eye cover 1402 may have a battery to power systems internal to the head-worn computer 102.

In embodiments, the eye cover 1402 may include a fan adapted to exchange air between an internal space, defined in part by the user's face, and an external environment to cool the air in the internal space and the user's face. In embodiments, the audio headset 1422 may include a vibratory system (e.g. a vibration motor, piezo motor, etc. in the armature and/or in the section over the ear) adapted to provide the user with a haptic feedback coordinated with digital content presented in the see-through computer display. In embodiments, the head-worn computer 102 includes a vibratory system adapted to provide the user with a haptic feedback coordinated with digital content presented in the see-through computer display.

In embodiments, the eye cover 1402 is adapted to be removably mounted on a head-worn computer with a see-through computer display. The eye cover 1402 may also include a flexible audio headset mounted to the eye cover 1402, wherein the flexibility provides the user of the head-worn computer 102 with a mechanism to align the audio headset with an ear of the user. In embodiments, the flexible audio headset is mounted to the eye cover 1402 with a magnetic connection. In embodiments, the flexible audio headset may be mounted to the eye cover 1402 with a mechanical connection.

In embodiments, the audio headset 1422 may be spring or otherwise loaded such that the head set presses inward towards the user's ears for a more secure fit.

Referring to FIG. 15, we now turn to describe a particular external user interface 104, referred to generally as a pen 1500. The pen 1500 is a specially designed external user interface 104 and can operate as a user interface, to many different styles of HWC 102. The pen 1500 generally follows the form of a conventional pen, which is a familiar user handled device and creates an intuitive physical interface for many of the operations to be carried out in the HWC system 100. The pen 1500 may be one of several user interfaces 104 used in connection with controlling operations within the HWC system 100. For example, the HWC 102 may watch for and interpret hand gestures 116 as control signals, where the pen 1500 may also be used as a user interface with the same HWC 102. Similarly, a remote keyboard may be used as an external user interface 104 in concert with the pen 1500. The combination of user interfaces or the use of just one control system generally depends on the operation(s) being executed in the HWC's system 100.

While the pen 1500 may follow the general form of a conventional pen, it contains numerous technologies that enable it to function as an external user interface 104. FIG. 15 illustrates technologies comprised in the pen 1500. As can be seen, the pen 1500 may include a camera 1508, which is arranged to view through lens 1502. The camera may then be focused, such as through lens 1502, to image a surface upon which a user is writing or making other movements to interact with the HWC 102. There are situations where the pen 1500 will also have an ink, graphite, or other system such that what is being written can be seen on the writing surface. There are other situations where the pen 1500 does not have such a physical writing system so there is no deposit on the writing surface, where the pen would only be communicating data or commands to the HWC 102. The lens 1502 configuration is described in greater detail herein. The function of the camera 1508 is to capture information from an unstructured writing surface such that pen strokes can be interpreted as intended by the user. To assist in the predication of the intended stroke path, the pen 1500 may include a sensor, such as an IMU 1512. Of course, the IMU could be included in the pen 1500 in its separate parts (e.g. gyro, accelerometer, etc.) or an IMU could be included as a single unit. In this instance, the IMU 1512 is used to measure and predict the motion of the pen 1500. In turn, the integrated microprocessor 1510 would take the IMU information and camera information as inputs and process the information to form a prediction of the pen tip movement.

The pen 1500 may also include a pressure monitoring system 1504, such as to measure the pressure exerted on the lens 1502. As will be described in greater detail herein, the pressure measurement can be used to predict the user's intention for changing the weight of a line, type of a line, type of brush, click, double click, and the like. In embodiments, the pressure sensor may be constructed using any force or pressure measurement sensor located behind the lens 1502, including for example, a resistive sensor, a current sensor, a capacitive sensor, a voltage sensor such as a piezoelectric sensor, and the like.

The pen 1500 may also include a communications module 1518, such as for bi-directional communication with the HWC 102. In embodiments, the communications module 1518 may be a short distance communication module (e.g. Bluetooth). The communications module 1518 may be security matched to the HWC 102. The communications module 1518 may be arranged to communicate data and commands to and from the microprocessor 1510 of the pen 1500. The microprocessor 1510 may be programmed to interpret data generated from the camera 1508, IMU 1512, and pressure sensor 1504, and the like, and then pass a command onto the HWC 102 through the communications module 1518, for example. In another embodiment, the data collected from any of the input sources (e.g. camera 1508, IMU 1512, pressure sensor 1504) by the microprocessor may be communicated by the communication module 1518 to the HWC 102, and the HWC 102 may perform data processing and prediction of the user's intention when using the pen 1500. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 1514 for long or short term uses.

The pen 1500 may also include a number of physical user interfaces, such as quick launch buttons 1522, a touch sensor 1520, and the like. The quick launch buttons 1522 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 1522 to command the HWC 102 to launch an application. The pen 1500 may be provided with several quick launch buttons 1522, which may be user programmable or factory programmable. The quick launch button 1522 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 1520 may be used to take gesture style input from the user. For example, the user may be able to take a single finger and run it across the touch sensor 1520 to affect a page scroll.

The pen 1500 may also include a laser pointer 1524. The laser pointer 1524 may be coordinated with the IMU 1512 to coordinate gestures and laser pointing. For example, a user may use the laser 1524 in a presentation to help with guiding the audience with the interpretation of graphics and the IMU 1512 may, either simultaneously or when the laser 1524 is off, interpret the user's gestures as commands or data input.

FIG. 16 illustrates yet another embodiment of the present disclosure. FIG. 16 illustrates a watchband clip-on controller 2000. The watchband clip-on controller may be a controller used to control the HWC 102 or devices in the HWC system 100. The watchband clip-on controller 2000 has a fastener 2018 (e.g. rotatable clip) that is mechanically adapted to attach to a watchband, as illustrated at 2004.

The watchband controller 2000 may have quick launch interfaces 2008 (e.g. to launch applications and choosers as described herein), a touch pad 2014 (e.g. to be used as a touch style mouse for GUI control in a HWC 102 display) and a display 2012. The clip 2018 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replicable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller 2000 may have 3-axis motion monitoring (e.g. through an IMU, accelerometers, magnetometers, gyroscopes, etc.) to capture user motion. The user motion may then be interpreted for gesture control.

In embodiments, the watchband controller 2000 may comprise fitness sensors and a fitness computer. The sensors may track heart rate, calories burned, strides, distance covered, and the like. The data may then be compared against performance goals and/or standards for user feedback.

Figure 17:
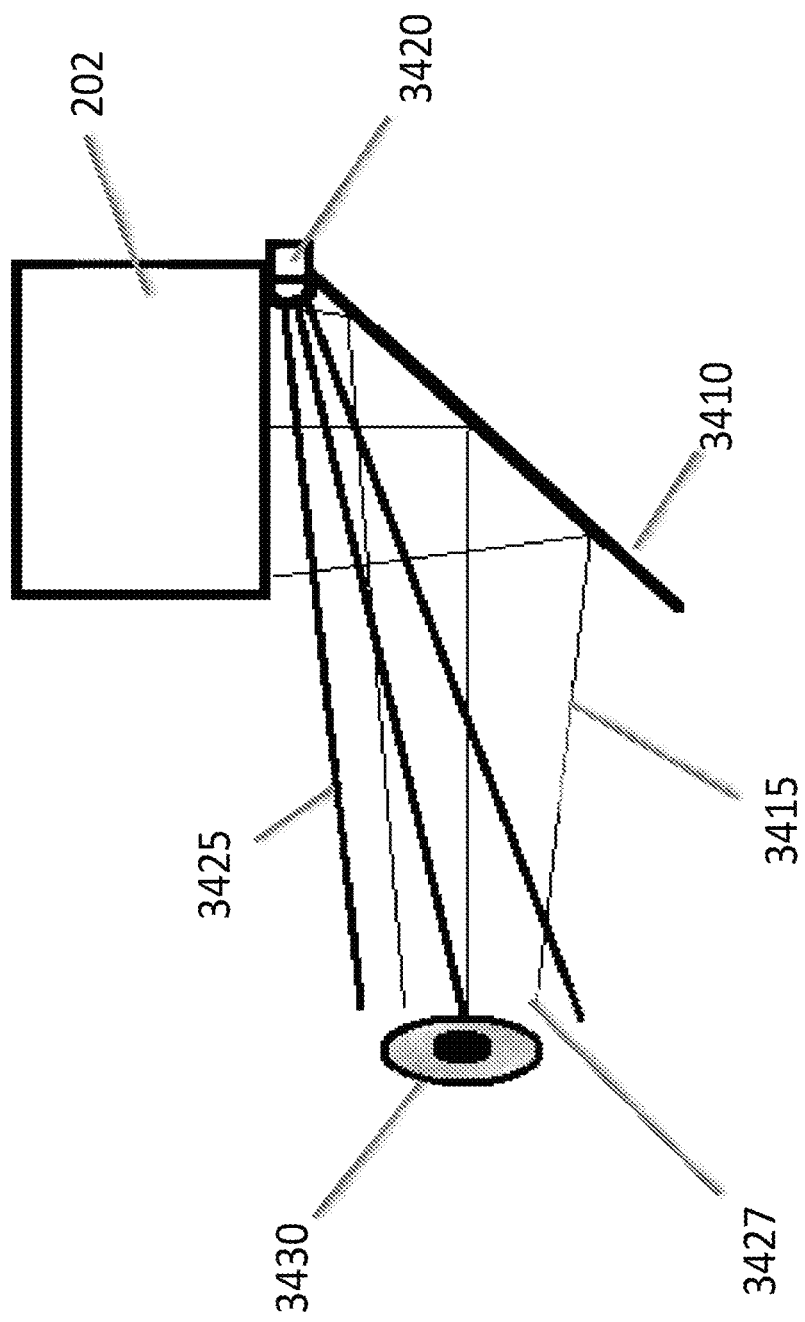
FIGS. 17 and 18 illustrate structured eye lighting systems according to the principles of the present disclosure.
Figure 18:
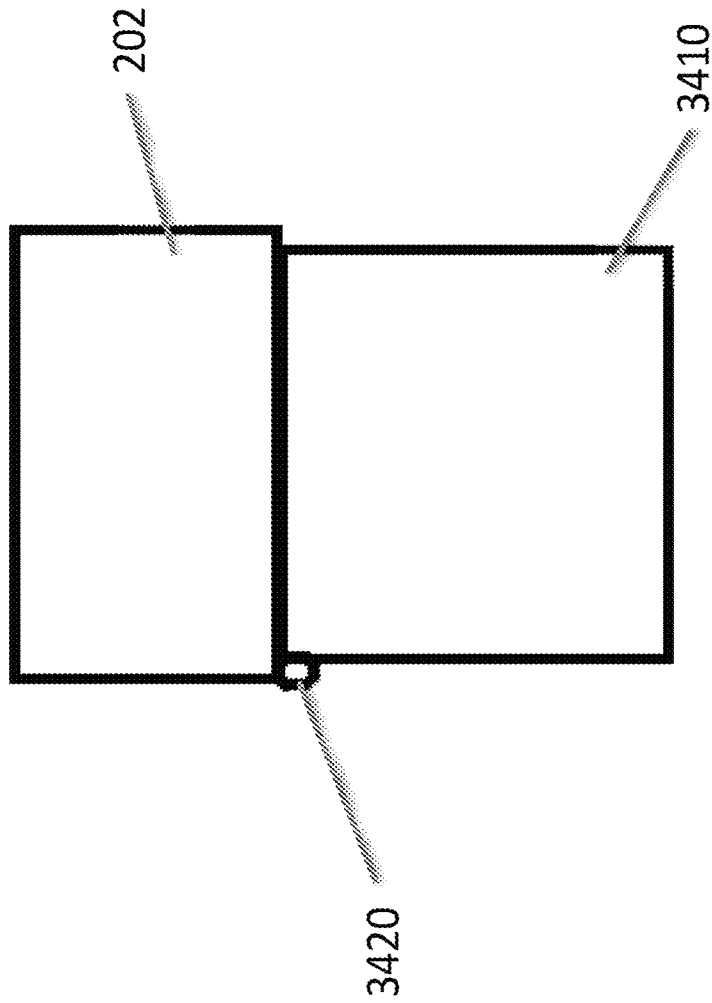

In embodiments directed to capturing images of the wearer's eye, light to illuminate the wearer's eye can be provided by several different sources including: light from the displayed image (i.e. image light); light from the environment that passes through the combiner or other optics; light provided by a dedicated eye light, etc. FIGS. 17 and 18 show illustrations of dedicated eye illumination lights 3420. FIG. 17 shows an illustration from a side view in which the dedicated illumination eye light 3420 is positioned at a corner of the combiner 3410 so that it doesn't interfere with the image light 3415. The dedicated eye illumination light 3420 is pointed so that the eye illumination light 3425 illuminates the eyebox 3427 where the eye 3430 is located when the wearer is viewing displayed images provided by the image light 3415. FIG. 18 shows an illustration from the perspective of the eye of the wearer to show how the dedicated eye illumination light 3420 is positioned at the corner of the combiner 3410. While the dedicated eye illumination light 3420 is shown at the upper left corner of the combiner 3410, other positions along one of the edges of the combiner 3410, or other optical or mechanical components, are possible as well. In other embodiments, more than one dedicated eye light 3420 with different positions can be used. In an embodiment, the dedicated eye light 3420 is an infrared light that is not visible by the wearer (e.g. 800 nm) so that the eye illumination light 3425 doesn't interfere with the displayed image perceived by the wearer.

In embodiments, the eye imaging camera is inline with the image light optical path, or part of the image light optical path. For example, the eye camera may be positioned in the upper module to capture eye image light that reflects back through the optical system towards the image display. The eye image light may be captured after reflecting off of the image source (e.g. in a DLP configuration where the mirrors can be positioned to reflect the light towards the eye image light camera), a partially reflective surface may be placed along the image light optical path such that when the eye image light reflects back into the upper or lower module that it is reflected in a direction that the eye imaging camera can capture light eye image light. In other embodiments, the eye image light camera is positioned outside of the image light optical path. For example, the camera(s) may be positioned near the outer lens of the platform.

Figure 19:
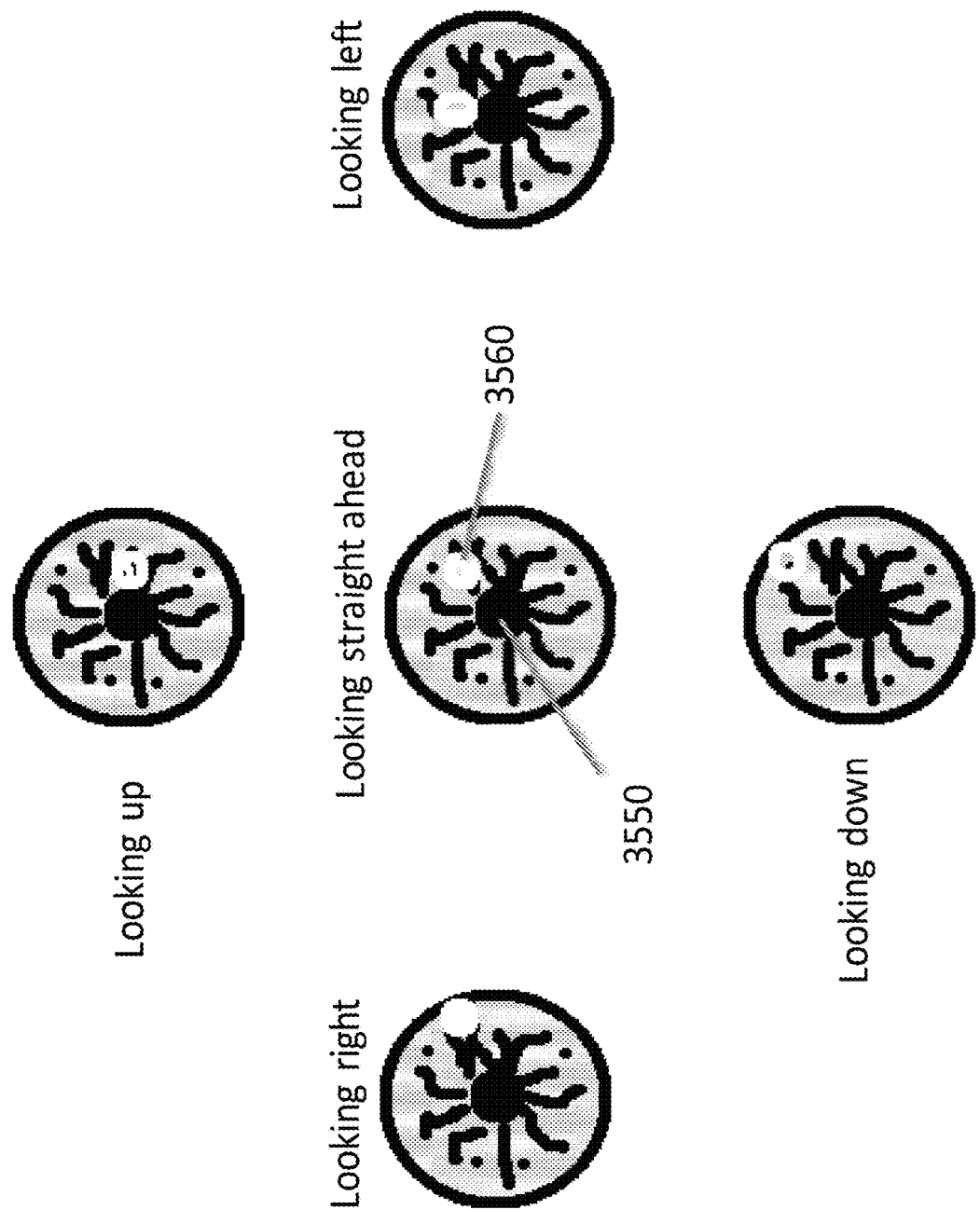
FIG. 19 illustrates eye glint in the prediction of eye direction analysis in accordance with the principles of the present disclosure.

FIG. 19 shows a series of illustrations of captured eye images that show the eye glint (i.e. light that reflects off the front of the eye) produced by a dedicated eye light mounted adjacent to the combiner as previously described herein. In this embodiment of the disclosure, captured images of the wearer's eye are analyzed to determine the relative positions of the iris 3550, pupil, or other portion of the eye, and the eye glint 3560. The eye glint is a reflected image of the dedicated eye light 3420 when the dedicated light is used. FIG. 19 illustrates the relative positions of the iris 3550 and the eye glint 3560 for a variety of eye positions. By providing a dedicated eye light 3420 in a fixed position, combined with the fact that the human eye is essentially spherical, or at least a reliably repeatable shape, the eye glint provides a fixed reference point against which the determined position of the iris can be compared to determine where the wearer is looking, either within the displayed image or within the see-through view of the surrounding environment. By positioning the dedicated eye light 3420 at a corner of the combiner 3410, the eye glint 3560 is formed away from the iris 3550 in the captured images. As a result, the positions of the iris and the eye glint can be determined more easily and more accurately during the analysis of the captured images, since they do not interfere with one another. In a further embodiment, the combiner includes an associated cut filter that prevents infrared light from the environment from entering the HWC and the eye camera is an infrared camera, so that the eye glint 3560 is only provided by light from the dedicated eye light. For example, the combiner can include a low pass filter that passes visible light while reflecting infrared light from the environment away from the eye camera, reflecting infrared light from the dedicated eye light toward the user's eye and the eye camera can include a high pass filter that absorbs visible light associated with the displayed image while passing infrared light associated with the eye image.

In an embodiment of the eye imaging system, the lens for the eye camera is designed to take into account the optics associated with the upper module 202 and the lower module 204. This is accomplished by designing the eye camera to include the optics in the upper module 202 and optics in the lower module 204, so that a high MTF image is produced, at the image sensor in the eye camera, of the wearer's eye. In yet a further embodiment, the eye camera lens is provided with a large depth of field to eliminate the need for focusing the eye camera to enable sharp images of the eye to be captured. Where a large depth of field is typically provided by a high f/# lens (e.g. f/#>5). In this case, the reduced light gathering associated with high f/# lenses is compensated by the inclusion of a dedicated eye light to enable a bright image of the eye to be captured. Further, the brightness of the dedicated eye light can be modulated and synchronized with the capture of eye images so that the dedicated eye light has a reduced duty cycle and the brightness of infrared light on the wearer's eye is reduced.

Figure 20B:
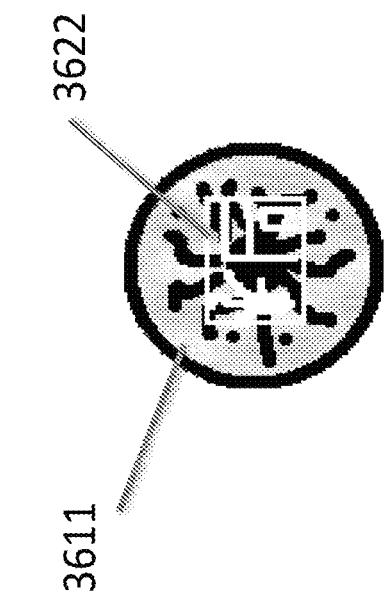
FIG. 20b illustrates a digital content presentation reflection off of the wearer's eye that may be analyzed in accordance with the principles of the present disclosure.
Figure 20A:
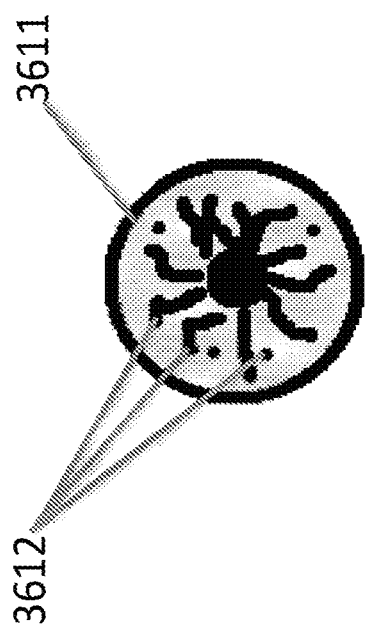
FIG. 20a illustrates eye characteristics that may be used in personal identification through analysis of a system according to the principles of the present disclosure.

In a further embodiment, FIG. 20a shows an illustration of an eye image that is used to identify the wearer of the HWC. In this case, an image of the wearer's eye 3611 is captured and analyzed for patterns of identifiable features 3612. The patterns are then compared to a database of eye images to determine the identity of the wearer. After the identity of the wearer has been verified, the operating mode of the HWC and the types of images, applications, and information to be displayed can be adjusted and controlled in correspondence to the determined identity of the wearer. Examples of adjustments to the operating mode depending on who the wearer is determined to be or not be include: making different operating modes or feature sets available, shutting down or sending a message to an external network, allowing guest features and applications to run, etc.

FIG. 20b is an illustration of another embodiment using eye imaging, in which the sharpness of the displayed image is determined based on the eye glint produced by the reflection of the displayed image from the wearer's eye surface. By capturing images of the wearer's eye 3611, an eye glint 3622, which is a small version of the displayed image can be captured and analyzed for sharpness. If the displayed image is determined to not be sharp, then an automated adjustment to the focus of the HWC optics can be performed to improve the sharpness. This ability to perform a measurement of the sharpness of a displayed image at the surface of the wearer's eye can provide a very accurate measurement of image quality. Having the ability to measure and automatically adjust the focus of displayed images can be very useful in augmented reality imaging where the focus distance of the displayed image can be varied in response to changes in the environment or changes in the method of use by the wearer.

An aspect of the present disclosure relates to controlling the HWC 102 through interpretations of eye imagery. In embodiments, eye-imaging technologies, such as those described herein, are used to capture an eye image or a series of eye images for processing. The image(s) may be processed to determine a user intended action, an HWC predetermined reaction, or other action. For example, the imagery may be interpreted as an affirmative user control action for an application on the HWC 102. Or, the imagery may cause, for example, the HWC 102 to react in a pre-determined way such that the HWC 102 is operating safely, intuitively, etc.

Figure 21:
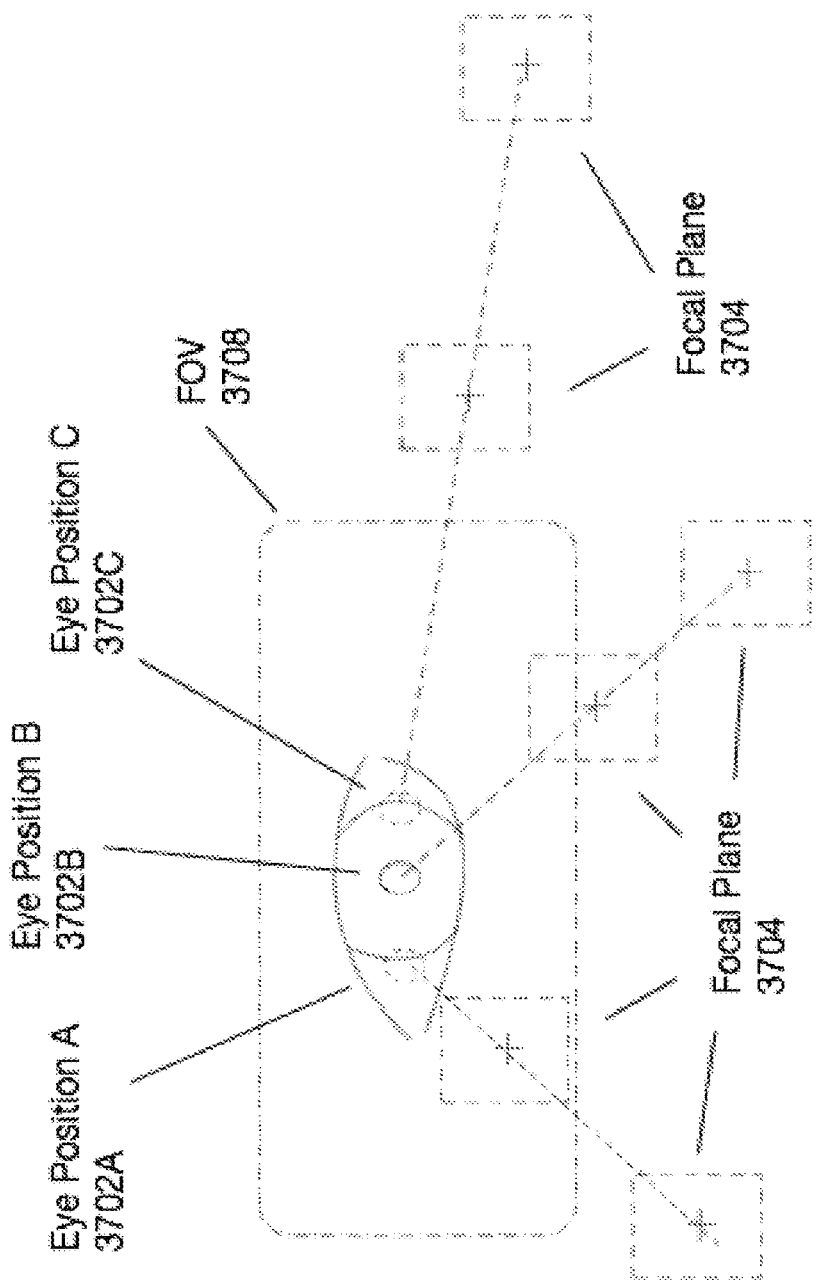
FIG. 21 illustrates eye imaging along various virtual target lines and various focal planes in accordance with the principles of the present disclosure.

FIG. 21 illustrates an eye imagery process that involves imaging the HWC 102 wearer's eye(s) and processing the images (e.g. through eye imaging technologies described herein) to determine in what position 3702 the eye is relative to it's neutral or forward looking position and/or the FOV 3708. The process may involve a calibration step where the user is instructed, through guidance provided in the FOV of the HWC 102, to look in certain directions such that a more accurate prediction of the eye position relative to areas of the FOV can be made. In the event the wearer's eye is determined to be looking towards the right side of the FOV 3708 (as illustrated in FIG. 21, the eye is looking out of the page) a virtual target line may be established to project what in the environment the wearer may be looking towards or at. The virtual target line may be used in connection with an image captured by camera on the HWC 102 that images the surrounding environment in front of the wearer. In embodiments, the field of view of the camera capturing the surrounding environment matches, or can be matched (e.g. digitally), to the FOV 3708 such that making the comparison is made more clear. For example, with the camera capturing the image of the surroundings in an angle that matches the FOV 3708 the virtual line can be processed (e.g. in 2d or 3d, depending on the camera images capabilities and/or the processing of the images) by projecting what surrounding environment objects align with the virtual target line. In the event there are multiple objects along the virtual target line, focal planes may be established corresponding to each of the objects such that digital content may be placed in an area in the FOV 3708 that aligns with the virtual target line and falls at a focal plane of an intersecting object. The user then may see the digital content when he focuses on the object in the environment, which is at the same focal plane. In embodiments, objects in line with the virtual target line may be established by comparison to mapped information of the surroundings.

In embodiments, the digital content that is in line with the virtual target line may not be displayed in the FOV until the eye position is in the right position. This may be a predetermined process. For example, the system may be set up such that a particular piece of digital content (e.g. an advertisement, guidance information, object information, etc.) will appear in the event that the wearer looks at a certain object(s) in the environment. A virtual target line(s) may be developed that virtually connects the wearer's eye with an object(s) in the environment (e.g. a building, portion of a building, mark on a building, gps location, etc.) and the virtual target line may be continually updated depending on the position and viewing direction of the wearer (e.g. as determined through GPS, e-compass, IMU, etc.) and the position of the object. When the virtual target line suggests that the wearer's pupil is substantially aligned with the virtual target line or about to be aligned with the virtual target line, the digital content may be displayed in the FOV 3704.

In embodiments, the time spent looking along the virtual target line and/or a particular portion of the FOV 3708 may indicate that the wearer is interested in an object in the environment and/or digital content being displayed. In the event there is no digital content being displayed at the time a predetermined period of time is spent looking at a direction, digital content may be presented in the area of the FOV 3708. The time spent looking at an object may be interpreted as a command to display information about the object, for example. In other embodiments, the content may not relate to the object and may be presented because of the indication that the person is relatively inactive. In embodiments, the digital content may be positioned in proximity to the virtual target line, but not in-line with it such that the wearer's view of the surroundings are not obstructed but information can augment the wearer's view of the surroundings. In embodiments, the time spent looking along a target line in the direction of displayed digital content may be an indication of interest in the digital content. This may be used as a conversion event in advertising. For example, an advertiser may pay more for an add placement if the wearer of the HWC 102 looks at a displayed advertisement for a certain period of time. As such, in embodiments, the time spent looking at the advertisement, as assessed by comparing eye position with the content placement, target line or other appropriate position may be used to determine a rate of conversion or other compensation amount due for the presentation.

Figure 22:
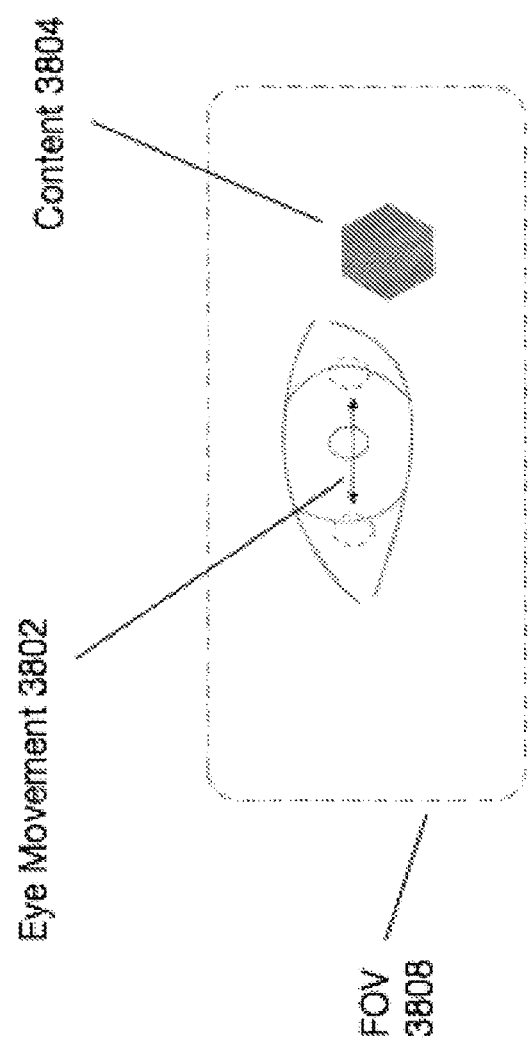
FIG. 22 illustrates content control with respect to eye movement based on eye imaging in accordance with the principles of the present disclosure.

An aspect of the disclosure relates to removing content from the FOV of the HWC 102 when the wearer of the HWC 102 apparently wants to view the surrounding environments clearly. FIG. 22 illustrates a situation where eye imagery suggests that the eye has or is moving quickly so the digital content 3804 in the FOV 3808 is removed from the FOV 3808. In this example, the wearer may be looking quickly to the side indicating that there is something on the side in the environment that has grabbed the wearer's attention. This eye movement 3802 may be captured through eye imaging techniques (e.g. as described herein) and if the movement matches a predetermined movement (e.g. speed, rate, pattern, etc.) the content may be removed from view. In embodiments, the eye movement is used as one input and HWC movements indicated by other sensors (e.g. IMU in the HWC) may be used as another indication. These various sensor movements may be used together to project an event that should cause a change in the content being displayed in the FOV.

Another aspect of the present disclosure relates to determining a focal plane based on the wearer's eye convergence. Eyes are generally converged slightly and converge more when the person focuses on something very close. This is generally referred to as convergence. In embodiments, convergence is calibrated for the wearer. That is, the wearer may be guided through certain focal plane exercises to determine how much the wearer's eyes converge at various focal planes and at various viewing angles. The convergence information may then be stored in a database for later reference. In embodiments, a general table may be used in the event there is no calibration step or the person skips the calibration step. The two eyes may then be imaged periodically to determine the convergence in an attempt to understand what focal plane the wearer is focused on. In embodiments, the eyes may be imaged to determine a virtual target line and then the eye's convergence may be determined to establish the wearer's focus, and the digital content may be displayed or altered based thereon.

Figure 23:
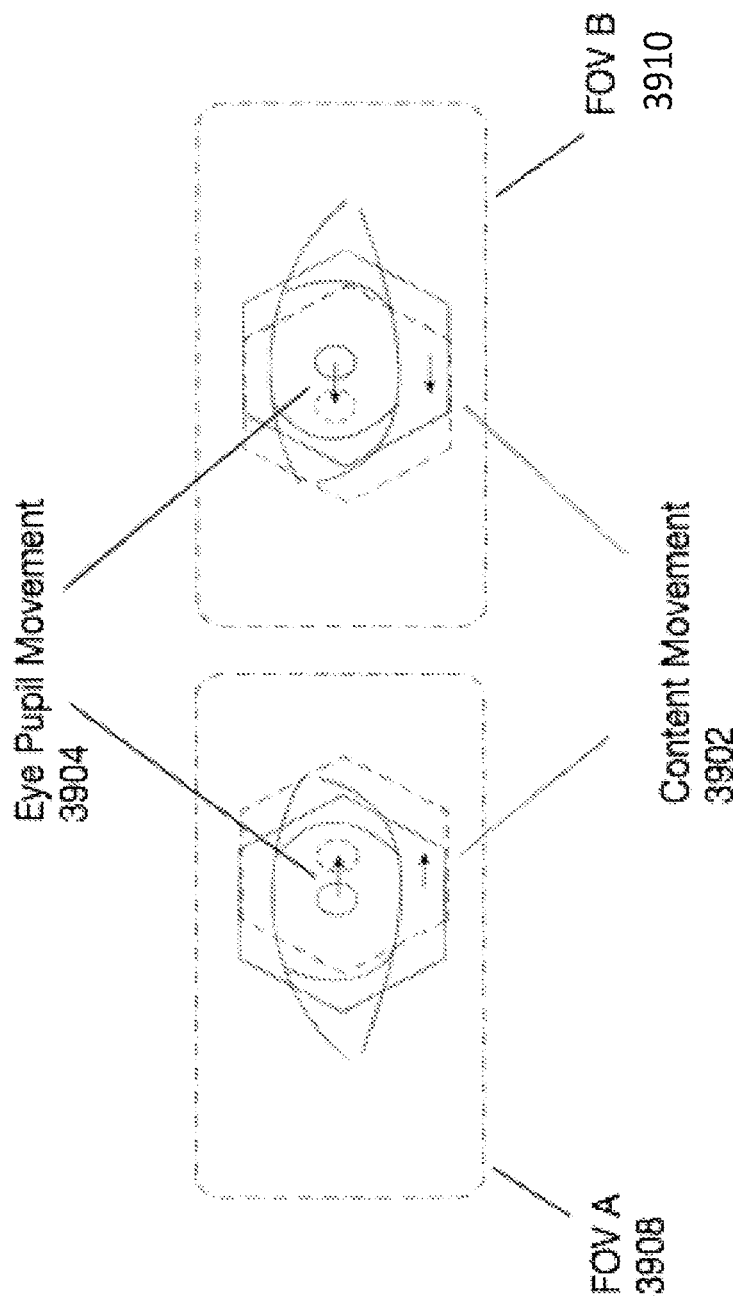
FIG. 23 illustrates eye imaging and eye convergence in accordance with the principles of the present disclosure.

FIG. 23 illustrates a situation where digital content is moved 3902 within one or both of the FOVs 3908 and 3910 to align with the convergence of the eyes as determined by the pupil movement 3904. By moving the digital content to maintain alignment, in embodiments, the overlapping nature of the content is maintained so the object appears properly to the wearer. This can be important in situations where 3D content is displayed.

An aspect of the present disclosure relates to controlling the HWC 102 based on events detected through eye imaging. A wearer winking, blinking, moving his eyes in a certain pattern, etc. may, for example, control an application of the HWC 102. Eye imaging (e.g. as described herein) may be used to monitor the eye(s) of the wearer and once a predetermined pattern is detected an application control command may be initiated.

An aspect of the disclosure relates to monitoring the health of a person wearing a HWC 102 by monitoring the wearer's eye(s). Calibrations may be made such that the normal performance, under various conditions (e.g. lighting conditions, image light conditions, etc.) of a wearer's eyes may be documented. The wearer's eyes may then be monitored through eye imaging (e.g. as described herein) for changes in their performance. Changes in performance may be indicative of a health concern (e.g. concussion, brain injury, stroke, loss of blood, etc.). If detected the data indicative of the change or event may be communicated from the HWC 102.

Aspects of the present disclosure relate to security and access of computer assets (e.g. the HWC itself and related computer systems) as determined through eye image verification. As discussed herein elsewhere, eye imagery may be compared to known person eye imagery to confirm a person's identity. Eye imagery may also be used to confirm the identity of people wearing the HWCs 102 before allowing them to link together or share files, streams, information, etc.

A variety of use cases for eye imaging are possible based on technologies described herein. An aspect of the present disclosure relates to the timing of eye image capture. The timing of the capture of the eye image and the frequency of the capture of multiple images of the eye can vary dependent on the use case for the information gathered from the eye image. For example, capturing an eye image to identify the user of the HWC may be required only when the HWC has been turned ON or when the HWC determines that the HWC has been put onto a wearer's head to control the security of the HWC and the associated information that is displayed to the user, wherein the orientation, movement pattern, stress or position of the earhorns (or other portions of the HWC) of the HWC can be used to determine that a person has put the HWC onto their head with the intention to use the HWC. Those same parameters may be monitored in an effort to understand when the HWC is dismounted from the user's head. This may enable a situation where the capture of an eye image for identifying the wearer may be completed only when a change in the wearing status is identified. In a contrasting example, capturing eye images to monitor the health of the wearer may require images to be captured periodically (e.g. every few seconds, minutes, hours, days, etc.). For example, the eye images may be taken in minute intervals when the images are being used to monitor the health of the wearer when detected movements indicate that the wearer is exercising. In a further contrasting example, capturing eye images to monitor the health of the wearer for long-term effects may only require that eye images be captured monthly. Embodiments of the disclosure relate to selection of the timing and rate of capture of eye images to be in correspondence with the selected use scenario associated with the eye images. These selections may be done automatically, as with the exercise example above where movements indicate exercise, or these selections may be set manually. In a further embodiment, the selection of the timing and rate of eye image capture is adjusted automatically depending on the mode of operation of the HWC. The selection of the timing and rate of eye image capture can further be selected in correspondence with input characteristics associated with the wearer including age and health status, or sensed physical conditions of the wearer including heart rate, chemical makeup of the blood and eye blink rate.

Figure 24:
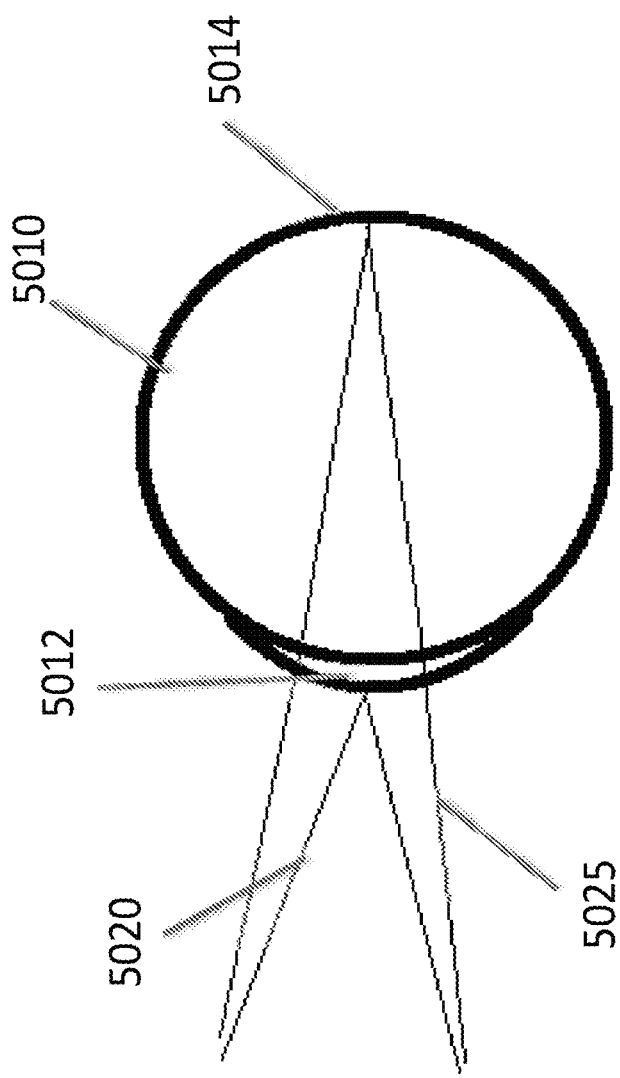
FIG. 24 illustrates light impinging an eye in accordance with the principles of the present disclosure.
Figure 25:
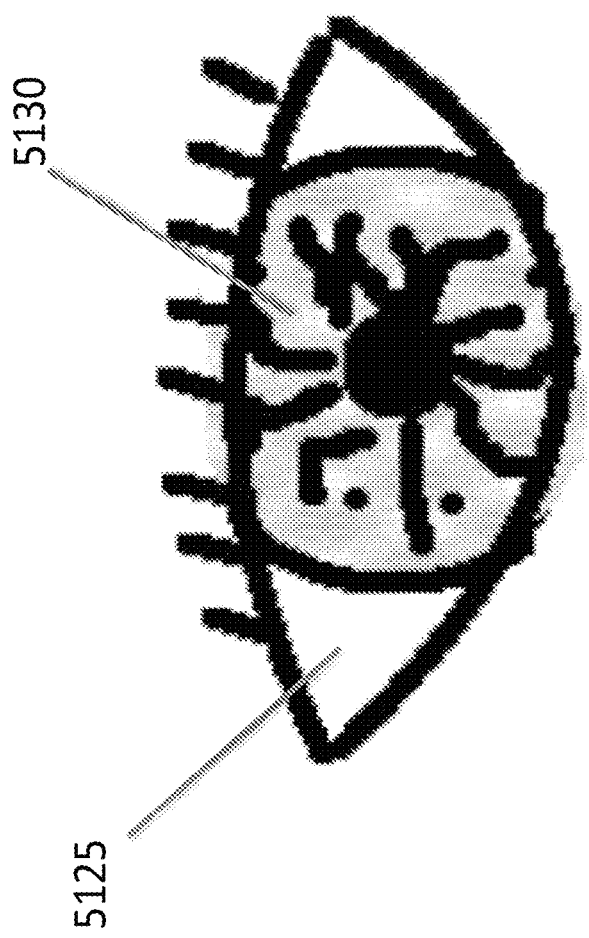
FIG. 25 illustrates a view of an eye in accordance with the principles of the present disclosure.

FIG. 24 illustrates a cross section of an eyeball of a wearer of an HWC with focus points that can be associated with the eye imaging system of the disclosure. The eyeball 5010 includes an iris 5012 and a retina 5014. Because the eye imaging system of the disclosure provides coaxial eye imaging with a display system, images of the eye can be captured from a perspective directly in front of the eye and inline with where the wearer is looking. In embodiments of the disclosure, the eye imaging system can be focused at the iris 5012 and/or the retina 5014 of the wearer, to capture images of the external surface of the iris 5012 or the internal portions of the eye, which includes the retina 5014. FIG. 24 shows light rays 5020 and 5025 that are respectively associated with capturing images of the iris 5012 or the retina 5014 wherein the optics associated with the eye imaging system are respectively focused at the iris 5012 or the retina 5014. Illuminating light can also be provided in the eye imaging system to illuminate the iris 5012 or the retina 5014. FIG. 25 shows an illustration of an eye including an iris 5130 and a sclera 5125. In embodiments, the eye imaging system can be used to capture images that include the iris 5130 and portions of the sclera 5125. The images can then be analyzed to determine color, shapes and patterns that are associated with the user. In further embodiments, the focus of the eye imaging system is adjusted to enable images to be captured of the iris 5012 or the retina 5014. Illuminating light can also be adjusted to illuminate the iris 5012 or to pass through the pupil of the eye to illuminate the retina 5014. The illuminating light can be visible light to enable capture of colors of the iris 5012 or the retina 5014, or the illuminating light can be ultraviolet (e.g. 340 nm), near infrared (e.g. 850 nm) or mid-wave infrared (e.g. 5000 nm) light to enable capture of hyperspectral characteristics of the eye.

Figure 26B:
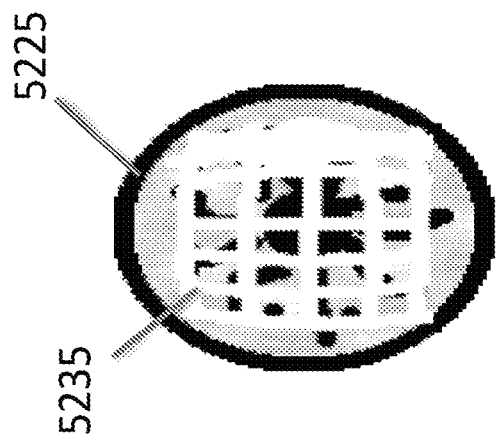
FIGS. 26a and 26b illustrate views of an eye with a structured light pattern in accordance with the principles of the present disclosure.
Figure 26A:
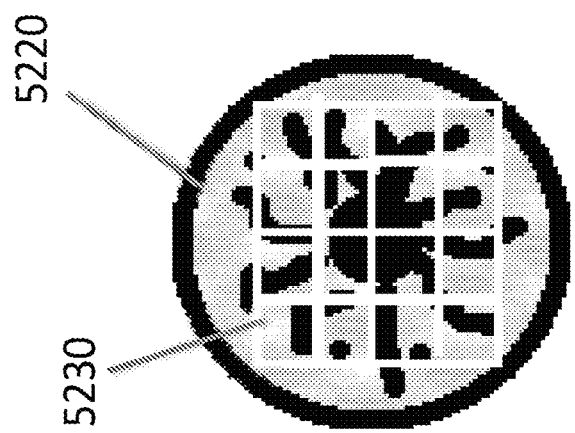

FIGS. 26a and 26b illustrate captured images of eyes where the eyes are illuminated with structured light patterns. In FIG. 26a, an eye 5220 is shown with a projected structured light pattern 5230, where the light pattern is a grid of lines. A light pattern of such as 5230 can be provided by the light source 5355 by including a diffractive or a refractive device to modify the light 5357 as are known by those skilled in the art. A visible light source can also be included for the second camera, which can include a diffractive or refractive to modify the light 5467 to provide a light pattern. FIG. 26b illustrates how the structured light pattern of 5230 becomes distorted to 5235 when the user's eye 5225 looks to the side. This distortion comes from the fact that the human eye is not completely spherical in shape, instead the iris sticks out slightly from the eyeball to form a bump in the area of the iris. As a result, the shape of the eye and the associated shape of the reflected structured light pattern is different depending on which direction the eye is pointed, when images of the eye are captured from a fixed position. Changes in the structured light pattern can subsequently be analyzed in captured eye images to determine the direction that the eye is looking.

The eye imaging system can also be used for the assessment of aspects of health of the user. In this case, information gained from analyzing captured images of the iris 5130 or sclera 5125 are different from information gained from analyzing captured images of the retina 5014. Where images of the retina 5014 are captured using light that illuminates the inner portions of the eye including the retina 5014. The light can be visible light, but in an embodiment, the light is infrared light (e.g. wavelength 1 to 5 microns) and the eye camera is an infrared light sensor (e.g. an InGaAs sensor) or a low resolution infrared image sensor that is used to determine the relative amount of light that is absorbed, reflected or scattered by the inner portions of the eye. Wherein the majority of the light that is absorbed, reflected or scattered can be attributed to materials in the inner portion of the eye including the retina where there are densely packed blood vessels with thin walls so that the absorption, reflection and scattering are caused by the material makeup of the blood. These measurements can be conducted automatically when the user is wearing the HWC, either at regular intervals, after identified events or when prompted by an external communication. In a preferred embodiment, the illuminating light is near infrared or mid infrared (e.g. 0.7 to 5 microns wavelength) to reduce the chance for thermal damage to the wearer's eye. In a further embodiment, the light source and the camera together comprise a spectrometer wherein the relative intensity of the light reflected by the eye is analyzed over a series of narrow wavelengths within the range of wavelengths provided by the light source to determine a characteristic spectrum of the light that is absorbed, reflected or scattered by the eye. For example, the light source can provide a broad range of infrared light to illuminate the eye and the camera can include: a grating to laterally disperse the reflected light from the eye into a series of narrow wavelength bands that are captured by a linear photodetector so that the relative intensity by wavelength can be measured and a characteristic absorbance spectrum for the eye can be determined over the broad range of infrared. In a further example, the light source can provide a series of narrow wavelengths of light (ultraviolet, visible or infrared) to sequentially illuminate the eye and camera includes a photodetector that is selected to measure the relative intensity of the series of narrow wavelengths in a series of sequential measurements that together can be used to determine a characteristic spectrum of the eye. The determined characteristic spectrum is then compared to known characteristic spectra for different materials to determine the material makeup of the eye. In yet another embodiment, the illuminating light is focused on the retina and a characteristic spectrum of the retina is determined and the spectrum is compared to known spectra for materials that may be present in the user's blood. For example, in the visible wavelengths 540 nm is useful for detecting hemoglobin and 660 nm is useful for differentiating oxygenated hemoglobin. In a further example, in the infrared, a wide variety of materials can be identified as is known by those skilled in the art, including: glucose, urea, alcohol and controlled substances.

Another aspect of the present disclosure relates to an intuitive user interface mounted on the HWC 102 where the user interface includes tactile feedback (otherwise referred to as haptic feedback) to the user to provide the user an indication of engagement and change. In embodiments, the user interface is a rotating element on a temple section of a glasses form factor of the HWC 102. The rotating element may include segments such that it positively engages at certain predetermined angles. This facilitates a tactile feedback to the user. As the user turns the rotating element it 'clicks' through it's predetermined steps or angles and each step causes a displayed user interface content to be changed. For example, the user may cycle through a set of menu items or selectable applications. In embodiments, the rotating element also includes a selection element, such as a pressure-induced section where the user can push to make a selection.

Figure 27:
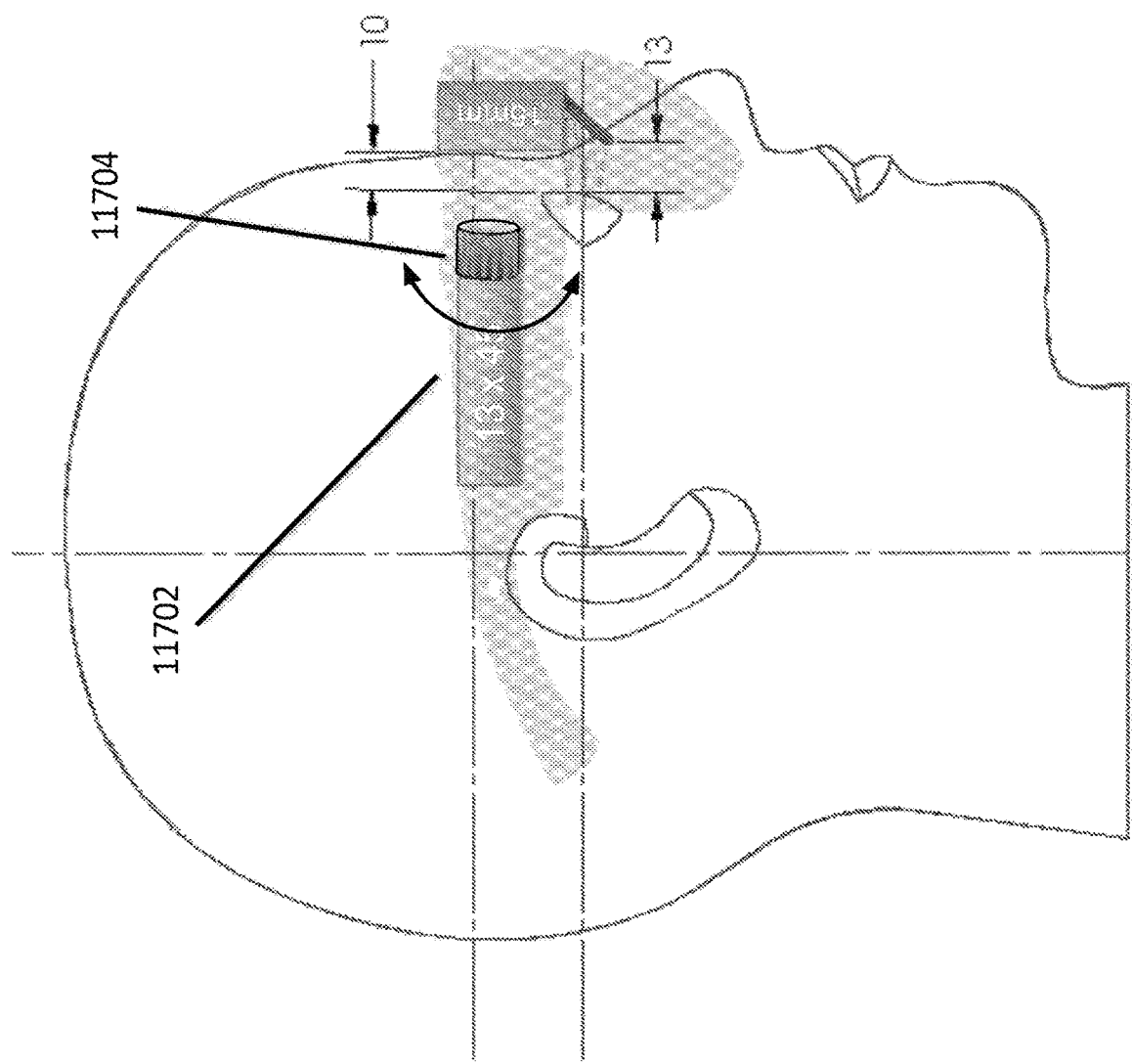
FIG. 27 illustrates a user interface in accordance with the principles of the present disclosure.
Figure 28:
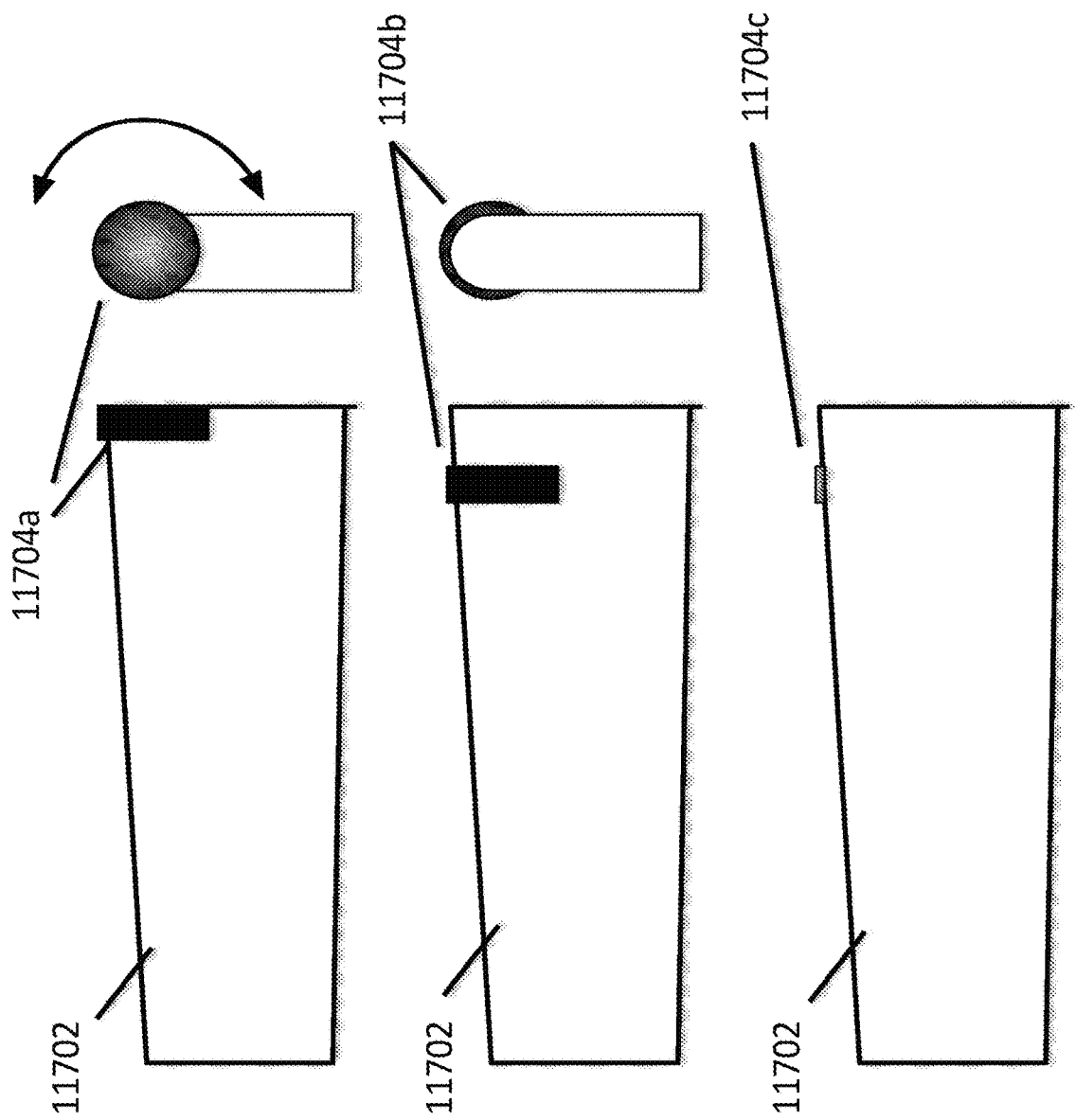
FIG. 28 illustrates a user interface in accordance with the principles of the present disclosure.

FIG. 27 illustrates a human head wearing a head-worn computer in a glasses form factor. The glasses have a temple section 11702 and a rotating user interface element 11704. The user can rotate the rotating element 11704 to cycle through options presented as content in the see-through display of the glasses. FIG. 28 illustrates several examples of different rotating user interface elements 11704a, 11704b and 11704c. Rotating element 11704a is mounted at the front end of the temple and has significant side and top exposure for user interaction. Rotating element 11704b is mounted further back and also has significant exposure (e.g. 270 degrees of touch). Rotating element 11704c has less exposure and is exposed for interaction on the top of the temple. Other embodiments may have a side or bottom exposure.

Another aspect of the present disclosure relates to a haptic system in a head-worn computer. Creating visual, audio, and haptic sensations in coordination can increase the enjoyment or effectiveness of awareness in a number of situations. For example, when viewing a movie or playing a game while digital content is presented in a computer display of a head-worn computer, it is more immersive to include coordinated sound and haptic effects. When presenting information in the head-worn computer, it may be advantageous to present a haptic effect to enhance or be the information. For example, the haptic sensation may gently cause the user of the head-worn computer believe that there is some presence on the user's right side, but out of sight. It may be a very light haptic effect to cause the 'tingling' sensation of a presence of unknown origin. It may be a high intensity haptic sensation to coordinate with an apparent explosion, either out of sight or in-sight in the computer display. Haptic sensations can be used to generate a perception in the user that objects and events are close by. As another example, digital content may be presented to the user in the computer displays and the digital content may appear to be within reach of the user. If the user reaches out his hand in an attempt to touch the digital object, which is not a real object, the haptic system may cause a sensation and the user may interpret the sensation as a touching sensation. The haptic system may generate slight vibrations near one or both temples for example and the user may infer from those vibrations that he has touched the digital object. This additional dimension in sensory feedback can be very useful and create a more intuitive and immersive user experience.

Another aspect of the present disclosure relates to controlling and modulating the intensity of a haptic system in a head-worn computer. In embodiments, the haptic system includes separate piezo strips such that each of the separate strips can be controlled separately. Each strip may be controlled over a range of vibration levels and some of the separate strips may have a greater vibration capacity than others. For example, a set of strips may be mounted in the arm of the head-worn computer (e.g. near the user's temple, ear, rear of the head, substantially along the length of the arm, etc.) and the further forward the strip the higher capacity the strip may have. The strips of varying capacity could be arranged in any number of ways, including linear, curved, compound shape, two dimensional array, one dimensional array, three dimensional array, etc.). A processor in the head-worn computer may regulate the power applied to the strips individually, in sub-groups, as a whole, etc. In embodiments, separate strips or segments of varying capacity are individually controlled to generate a finely controlled multi-level vibration system. Patterns based on frequency, duration, intensity, segment type, and/or other control parameters can be used to generate signature haptic feedback. For example, to simulate the haptic feedback of an explosion close to the user, a high intensity, low frequency, and moderate duration may be a pattern to use. A bullet whipping by the user may be simulated with a higher frequency and shorter duration. Following this disclosure, one can imagine various patterns for various simulation scenarios.

Another aspect of the present disclosure relates to making a physical connection between the haptic system and the user's head. Typically, with a glasses format, the glasses touch the user's head in several places (e.g. ears, nose, forehead, etc.) and these areas may be satisfactory to generate the necessary haptic feedback. In embodiments, an additional mechanical element may be added to better translate the vibration from the haptic system to a desired location on the user's head. For example, a vibration or signal conduit may be added to the head-worn computer such that there is a vibration translation medium between the head-worn computers internal haptic system and the user's temple area.

Figure 29:
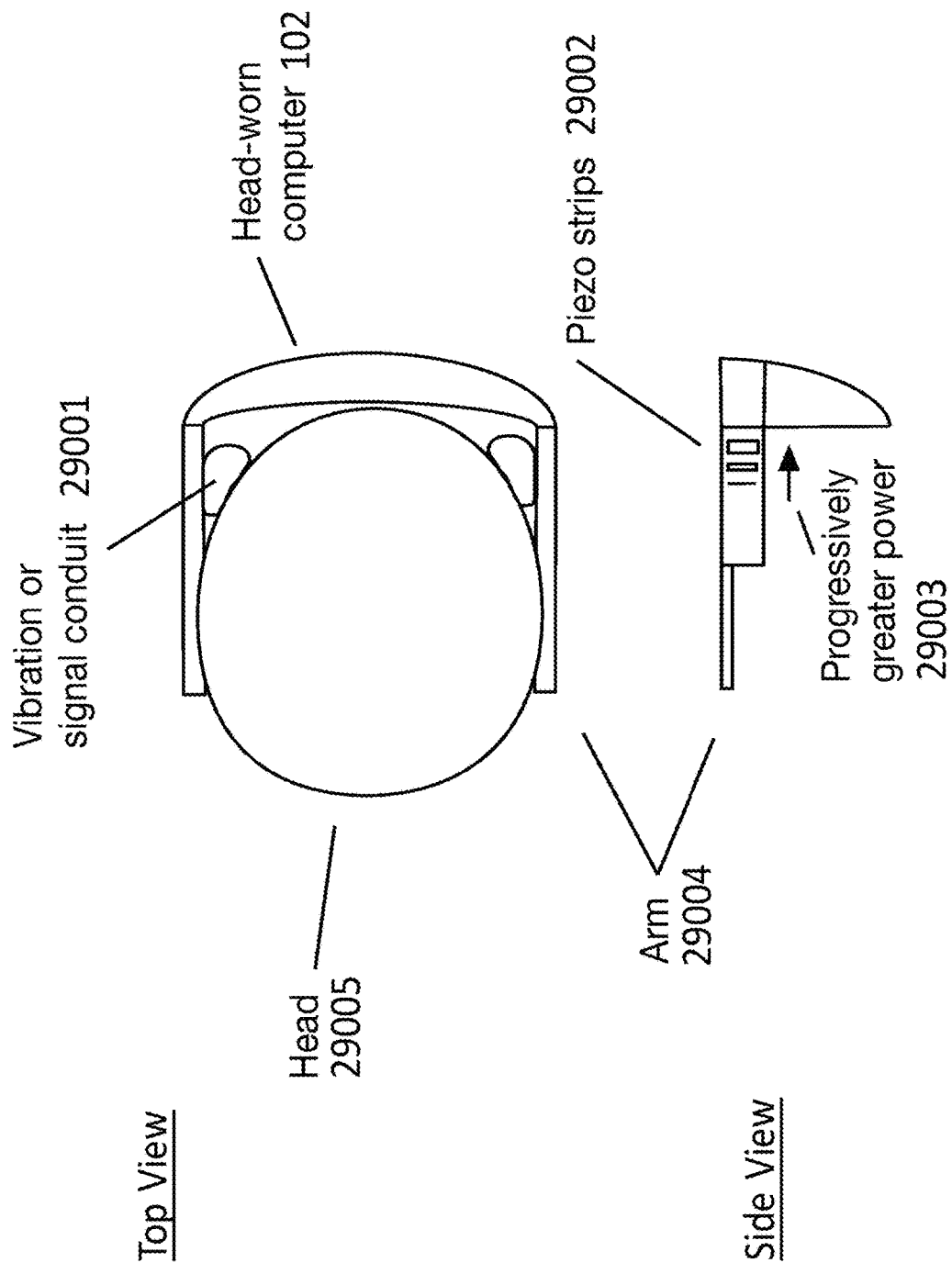

FIG. 29 illustrates a head-worn computer 102 with a haptic system comprised of piezo strips 29002. In this embodiment, the piezo strips 29002 are arranged linearly with strips of increasing vibration capacity from back to front of the arm 29004. The increasing capacity may be provided by different sized strips, for example. This arrangement can cause a progressively increased vibration power 29003 from back to front. This arrangement is provided for ease of explanation; other arrangements are contemplated by the inventors of the present application and these examples should not be construed as limiting. The head-worn computer 102 may also have a vibration or signal conduit 29001 that facilitates the physical vibrations from the haptic system to the head of the user 29005. The vibration conduit may be malleable to form to the head of the user for a tighter or more appropriate fit.

An aspect of the present invention relates to a head-worn computer, comprising: a frame adapted to hold a computer display in front of a user's eye; a processor adapted to present digital content in the computer display and to produce a haptic signal in coordination with the digital content display; and a haptic system comprised of a plurality of haptic segments, wherein each of the haptic segments is individually controlled in coordination with the haptic signal. In embodiments, the haptic segments comprise a piezo strip activated by the haptic signal to generate a vibration in the frame. The intensity of the haptic system may be increased by activating more than one of the plurality of haptic segments. The intensity may be further increased by activating more than 2 of the plurality of haptic segments. In embodiments, each of the plurality of haptic segments comprises a different vibration capacity. In embodiments, the intensity of the haptic system may be regulated depending on which of the plurality of haptic segments is activated. In embodiments, each of the plurality of haptic segments are mounted in a linear arrangement and the segments are arranged such that the higher capacity segments are at one end of the linear arrangement. In embodiments, the linear arrangement is from back to front on an arm of the head-worn computer. In embodiments, the linear arrangement is proximate a temple of the user. In embodiments, the linear arrangement is proximate an ear of the user. In embodiments, the linear arrangement is proximate a rear portion of the user's head. In embodiments, the linear arrangement is from front to back on an arm of the head-worn computer, or otherwise arranged.

An aspect of the present disclosure provides a head-worn computer with a vibration conduit, wherein the vibration conduit is mounted proximate the haptic system and adapted to touch the skin of the user's head to facilitate vibration sensations from the haptic system to the user's head. In embodiments, the vibration conduit is mounted on an arm of the head-worn computer. In embodiments, the vibration conduit touches the user's head proximate a temple of the user's head. In embodiments, the vibration conduit is made of a soft material that deforms to increase contact area with the user's head.

An aspect of the present disclosure relates to a haptic array system in a head-worn computer. The haptic array(s) that can correlate vibratory sensations to indicate events, scenarios, etc. to the wearer. The vibrations may correlate or respond to auditory, visual, proximity to elements, etc. of a video game, movie, or relationships to elements in the real world as a means of augmenting the wearer's reality. As an example, physical proximity to objects in a wearer's environment, sudden changes in elevation in the path of the wearer (e.g. about to step off a curb), the explosions in a game or bullets passing by a wearer. Haptic effects from a piezo array(s) that make contact the side of the wearer's head may be adapted to effect sensations that correlate to other events experienced by the wearer.

FIG. 29a illustrates a haptic system according to the principles of the present disclosure. In embodiments the piezo strips are mounted or deposited with varying width and thus varying force Piezo Elements on a rigid or flexible, non-conductive substrate attached, to or part of the temples of glasses, goggles, bands or other form factor. The non-conductive substrate may conform to the curvature of a head by being curved and it may be able to pivot (e.g. in and out, side to side, up and down, etc.) from a person's head. This arrangement may be mounted to the inside of the temples of a pair of glasses. Similarly, the vibration conduit, described herein elsewhere, may be mounted with a pivot. As can be seen in FIG. 29a, the piezo strips 29002 may be mounted on a substrate and the substrate may be mounted to the inside of a glasses arm, strap, etc. The piezo strips in this embodiment increase in vibration capacity as they move forward.

To make compact optics for head-worn computers, it is advantageous to use a wide cone of light from the image source. A wide cone of light from the image source is especially important if the optics are to provide the user with a wide field of view as the wide cone makes it easier for the optics to spread the ray bundles of the image light from the small image source to the larger area of the combiner when providing the wide angular field of image light that makes up the wide field of view. In this way, the optics for head worn computers are very different from a display such as a television where a viewer sees the display from a very limited cone of image light.

Figure 35:
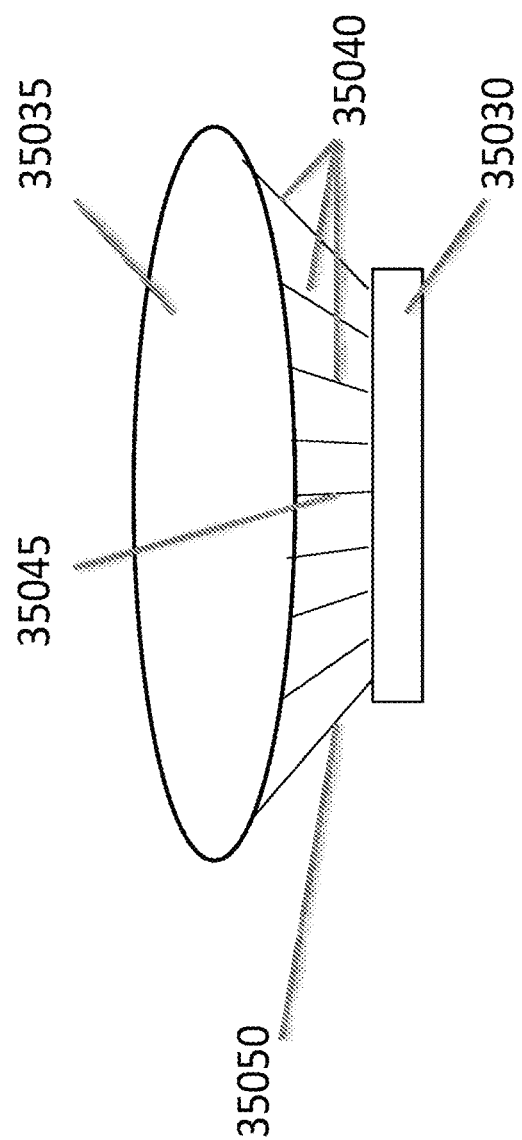
FIG. 35 is an illustration of how the ray angles of the image light sampled by a lens in forming an image for display in a typical compact head-worn computer vary across an image source.
Figure 35A:
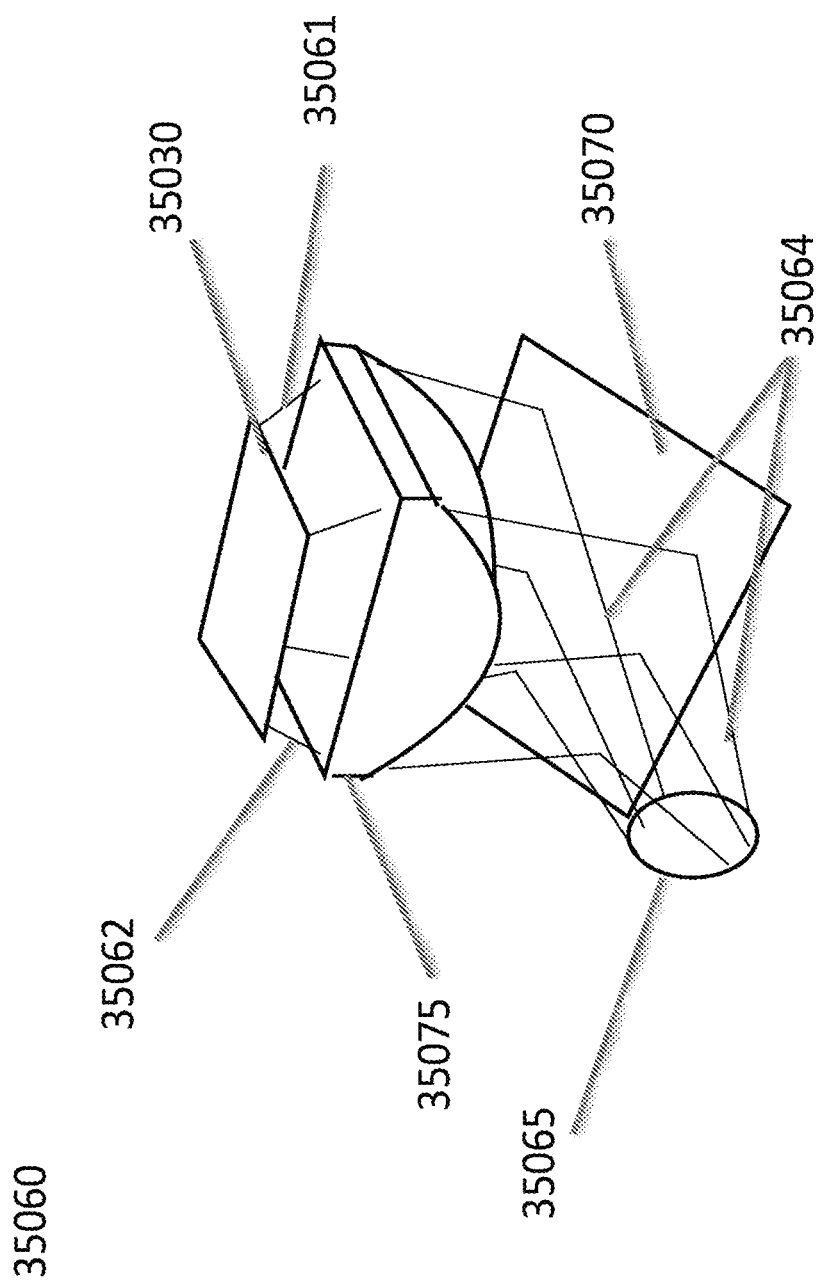
FIG. 35a shows an illustration of a compact optical system with a folded optical path wherein light rays are shown passing through the optics from the emissive image source to the eyebox where the user can view the image.
Figure 35B:
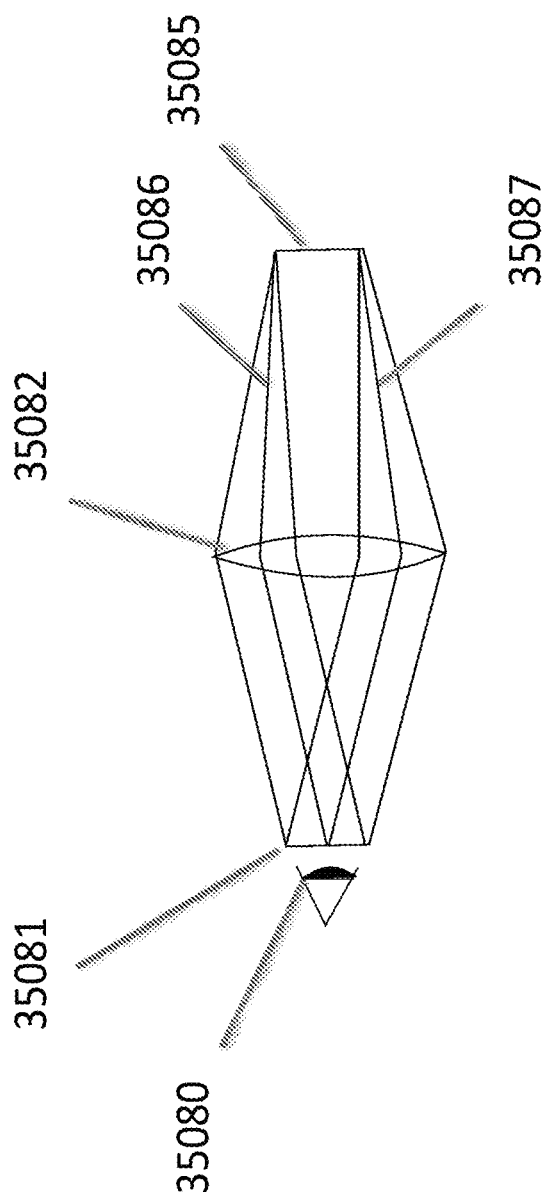
FIG. 35b shows a thin lens layout with a relatively long focal length and a relatively narrow field of view.
Figure 35C:
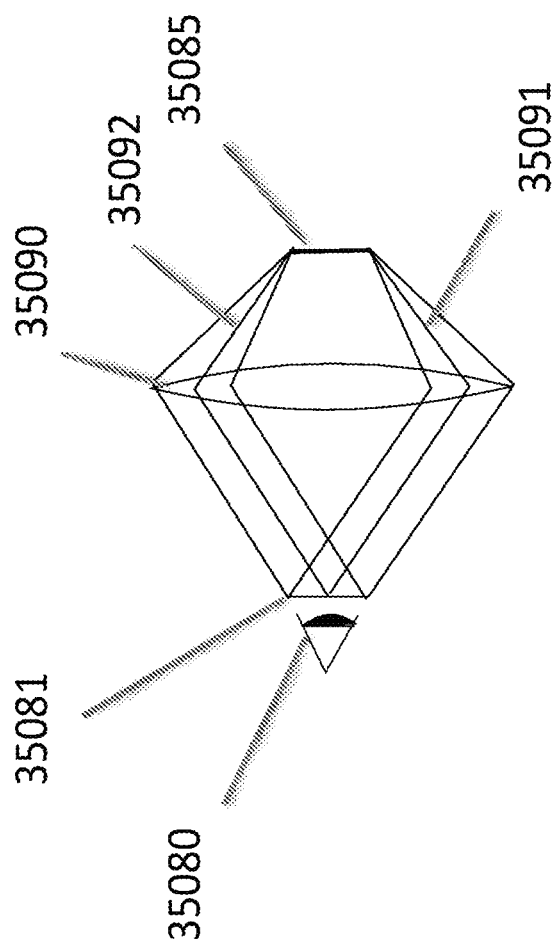
FIG. 35c shows a thin lens layout with a reduced length and a wider field of view.

FIG. 35a shows an illustration of a typical compact optical system 35060 with a folded optical path wherein light rays are shown passing through the optics from the emissive image source 35030 to the eyebox 35065 where the user can view the image. as shown in FIG. 35a, image light is emitted by the image source 35030. The image light is then condensed by the lens 35075 so that a converging field of view is provided to the eyebox after being reflected by the beam splitter 35070. In this example, the angular size of the field of view is ultimately established by the size of the lens 35075 and the optical distance from the lens 35075 to the eyebox 35065. This can be seen by following the diverging rays 35064 from the eyebox 35065 to the beam splitter 35070 where they are folded by reflection from the beam splitter 35070 and then to the lens 35075. Where the angle between the outermost rays 35064 form the field of view associated with the displayed image. To make the optical system 35060 lower cost and light weight, it is advantageous to use a small image source 35030. To make the optical system 35060 compact, it is advantageous to use a folded optical path as shown in FIG. 35a wherein the fold is provided by the beam splitter 35070, but other folded configurations are also possible. Another important factor that enables the optical system 35060 to be compact is to use a wide cone of image light from the image source 35030 which enables the image source 35030 to be positioned close to the lens 35075. FIGS. 35b and 35c illustrate how using a short focal length lens in an optical system enables a more compact overall length while also providing a wider field of view to the user's eye. FIG. 35b shows a typical thin lens layout with a relatively long focal length and a relatively narrow field of view, wherein the image source 35085 is positioned at the focal length of the lens 35082 and the eye 35080 is positioned approximately at the same distance from the lens as the focal length. The aperture of the lens system is determined by the eyebox 35081. The ray bundles from any point on the image source 35085 provide a cone of light that as sampled by the lens 35082 will cover the area of the eyebox 35081. With the relatively long focal length lens 35082, the chief rays 35086 and 35087 at the center of each ray bundle are shown as essentially parallel and as a result, the chief rays 35086 and 35087 sampled by the lens 35082 all have a chief ray angle (the angle between the chief ray and the surface normal of the image source) of nearly zero. In contrast, FIG. 35c shows a thin lens layout with a reduced length and a wider field of view. This is provided by using a lens 35090 with a shorter focal length. The image source 35085 is again positioned at the focal length of the lens 35090 to provide a sharp image. However in this case, the chief rays 35092 and 35091 are substantially diverging in order to provide the increased field of view to the eyebox 35081 and the user's eye 35080. Where the field of view is the subtended angle between the rays provided to the eyebox 35081. As such, for a given size of image source 35085, optical systems that provide a wide field of view will be associated with larger chief ray angles as sampled by the lens 35090 to provide the image to the user's eye 35080.

In a display system for a head-worn computer such as the optical system 35060 shown in FIG. 35a, the lens 35075 samples the image light provided by the image source 35030 such that the chief ray angles associated with the ray bundles of image light that is used to form the image seen by the user, will vary with the radial distance from the center of the image source 35030. Consequently, the chief ray angle is typically zero at the center of the image source 35030 and the chief ray angle increases out to the corner of the image source 35030 where it reaches it's greatest value. For an optical system 35060 that provides a field of view of 30 degrees or greater, the chief ray angle can be 25 degrees or greater. For an optical system 35060 that provides a field of view of 50 degrees or greater, the chief ray angle can be 40 degrees or greater. Where the chief ray is the center of a cone of light rays for each pixel in the image and the subtended angle of the cone of light rays in the ray bundle is determined by the f# of the optical system 35060. As such the angular distribution of the image light that provides the image to the user at the eyebox 35065 is determined by the chief ray angles and the f# of the optical system 35060. To provide uniform brightness and color to the user over the entire image, the image source 35030 must be capable of providing uniform brightness and color for all of the pixels in the image regardless of the chief ray angle associated with the pixel.

Figure 30:
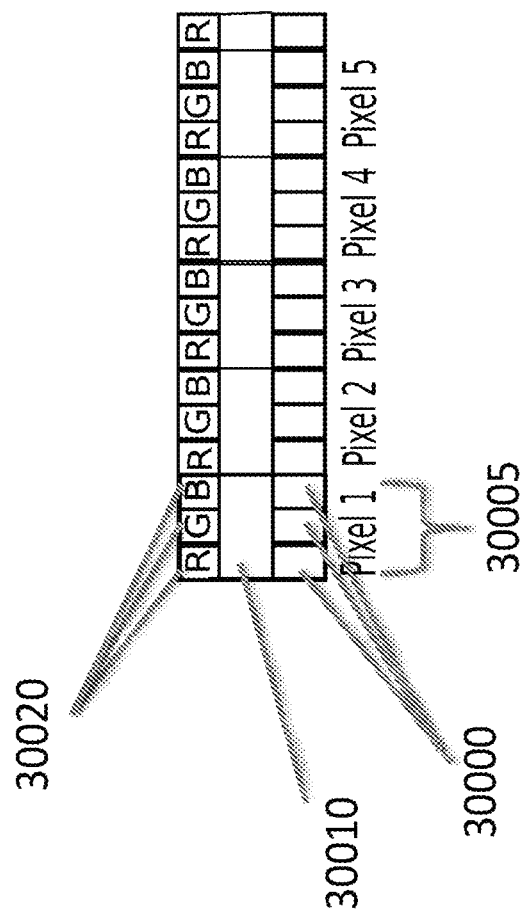
FIG. 30 is an illustration of a cross section of an emissive image source such as an OLED.

FIG. 30 is an illustration of a cross section of an emissive image source 35030 such as an OLED as it is typically provided. Wherein the image source 35030 is comprised of pixels 30005 where each pixel 30005 includes a set of subpixels 30000. For simplicity in FIG. 30 and others (FIGS. 37, 38, 39, and 40) Pixel 1 is presented as the center pixel on the image source 35030 and Pixel 5 is positioned near the edge of the image source 35030. Each set of subpixels 30000 provide the color set associated with each pixel 30005, such as red, green and blue, or cyan, magenta, yellow but other configurations of sets of subpixels 30000 are possible such as including a white subpixel with each pixel 30005. While the subpixels 30000 can be made to directly emit different colors, in many cases, it is advantageous for manufacturers of OLED image sources to provide subpixels 30000 comprised of white emitting subpixels 30000 with an associated color filter array 30020 to convert the emitted white light from each subpixel 30000 to the appropriate color for the subpixel 30000. Where the color filter array 30020 can be separated from the white emitting subpixels 30000 by a transparent layer 30010 that is provided for a variety of reasons such as to provide a moisture barrier over the pixels 30005. The color filter array 30020 can also be protected by a cover glass (not shown) that is positioned directly over the color filter array 30020. Many of the OLED microdisplays available at this time are made in this way with white emitting subpixels 30000, a transparent layer 30010 and a color filter array 30020 with a cover glass. This alignment of the color filters 30020 directly over associated subpixels 30000 provides good color rendition across the image when viewed from a position directly above the image source 35030 where the viewing angle is relatively uniform. However, when viewed from an angle so that a chief ray angle of greater than approximately 20 degrees such in the optical system shown in FIG. 35*c*, the color rendition changes and a shift in the color of the image is observed. The reasons for this color shift will be explained in more detail below.

Figure 31:
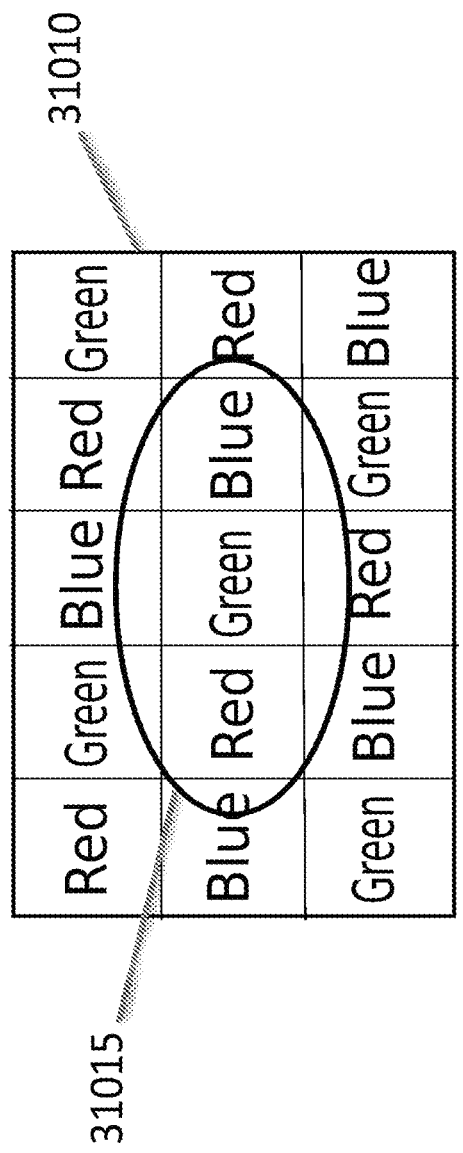
FIG. 31 shows a color filter layout wherein the colors repeat in rows and the rows are offset from one another by one subpixel.
Figure 33:
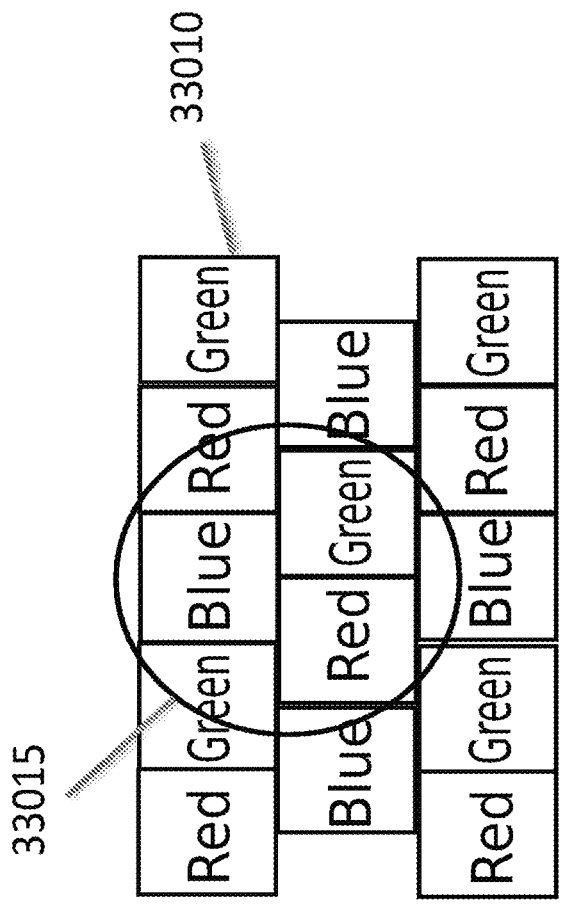
FIG. 33 shows a color filter layout wherein the colors repeat in rows and each row is offset from neighboring rows by 1½ subpixels.

FIGS. 31, 32 and 33 show illustrations of examples of common layouts for the color filters associated with subpixels on image sources. FIG. 31 shows a color filter layout 31010 wherein the colors repeat in rows and the rows are offset from one another by one subpixel. FIG. 32 shows a color filter layout 33010 wherein the colors repeat in rows. FIG. 33 shows a color filter layout 33010 wherein the colors repeat in rows and each row is offset from neighboring rows by 1½ subpixels. As shown in FIG. 31, a pixel 31015 is comprised of three subpixels 30000 with red, green and blue color filters arranged in a linear pattern. While the pixel 31015 is shown to be rectangular with square subpixels 30000 for simplicity, pixels 31015 are typically actually square with rectangular subpixels 30000. Similarly, FIG. 32 shows pixels 33015 comprised of subpixels 30000 with red-green and blue color filter linearly arranged. FIG. 33 shows a different layout wherein a pixel 33015 is comprised of subpixels 30000 that include red, green and blue color filters. However, in this case, the subpixels 30000 and color filters are arranged in a triangle to make the pixel appear as more of a round spot in the image.

Figure 34:
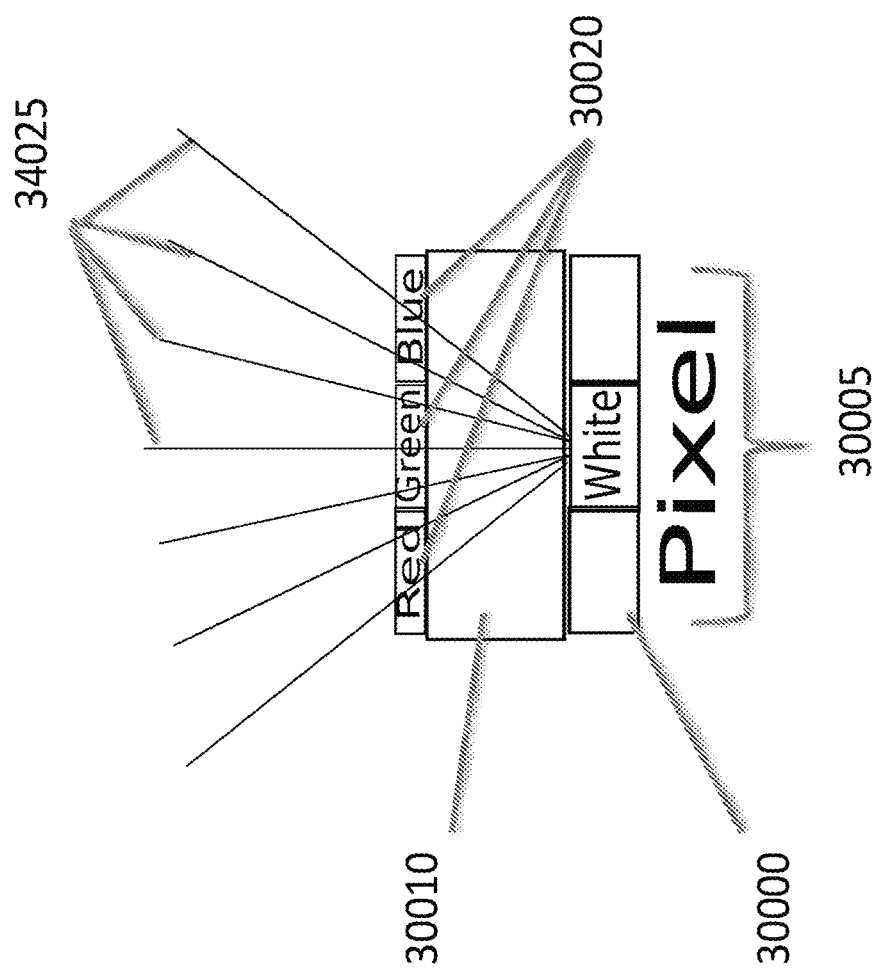
FIG. 34 shows an illustration of rays of image light as emitted by a single subpixel in a pixel.

FIG. 34 shows an illustration of rays 34025 of image light as emitted by a single subpixel 30000 in a pixel 30005. The subpixel 30000 emits white light with an angular cone subtended by the rays 34025. The rays 34025 then pass through the transparent layer 30010 and the color filters 30020. However the angular cone subtended by the rays 34025 is large enough that the rays pass through not only the color filter 30020 associated with the particular subpixel 30000, but also the adjacent color filters 30020 that are associated with adjacent subpixels 30000. Since as shown in FIGS. 31, 32 and 33 the adjacent subpixels may have color filters of different colors, the rays 34025 will have different colors depending on which color filter they have passed through. As such, the color produced by a subpixel 30000 varies depending on the angle that it is viewed from above the image source 130. This effect is responsible for causing a color shift in images displayed in head-worn computers that becomes more noticeable as the chief ray angle increases such as near the edges or sides of the displayed image.

Figure 36:
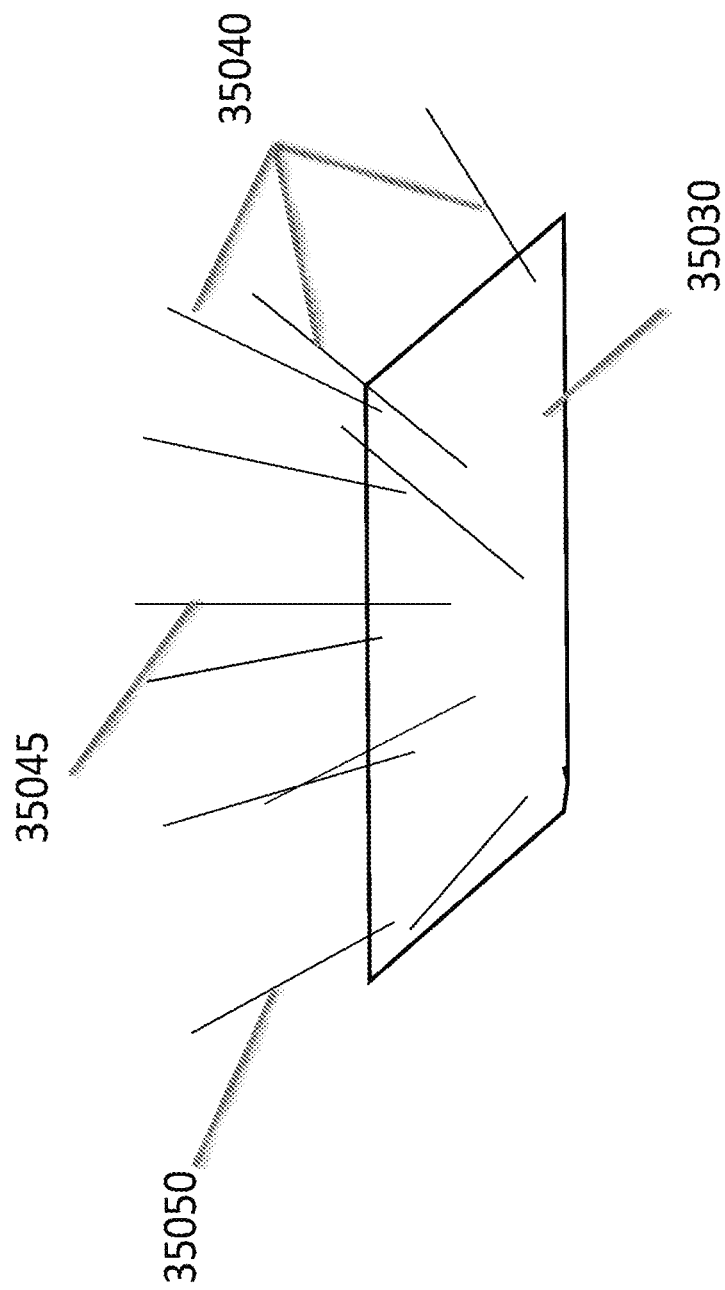
FIG. 36 is an illustration of the chief ray angles sampled by the lens over the surface of the image source.
Figure 37:
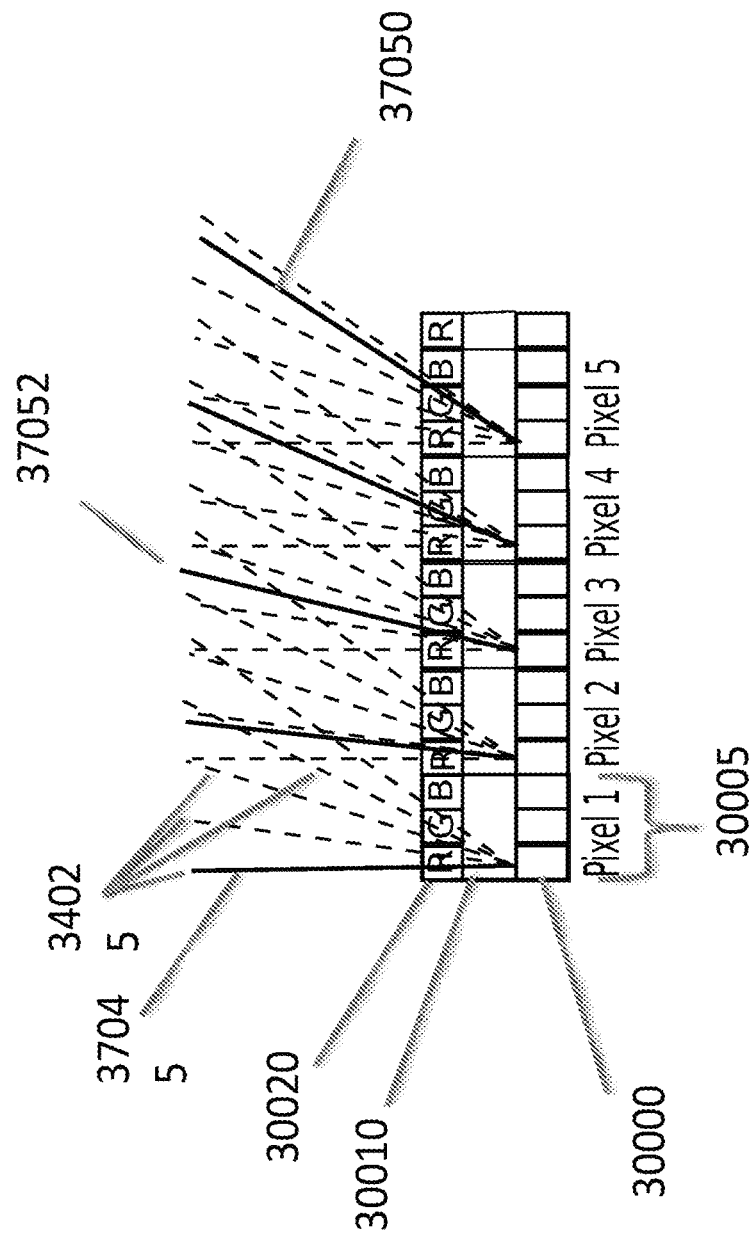
FIG. 37 is an illustration of a cross section of a portion of an image source wherein Pixel 1 is a center pixel and Pixel 5 is an edge pixel.

FIG. 35 is an illustration of how the ray angles of the image light sampled by a lens in forming an image for display in a typical compact head-worn computer vary across an image source 35030. Image light rays 35040 as sampled by the lens 35035 to form an image for display to a user have a chief ray angle that varies across the image source 35030. In the center of the image source 35030, the ray 35045 has a zero chief ray angle. In contrast, the ray 35050 at an edge of the image source 35030 has a chief ray angle that is approximately 45 degrees as shown. FIG. 36 is an illustration of the chief ray angles sampled by the lens 35035 over the surface of the image source 35030. This illustration shows how the chief ray angle varies based on the radial distance from the center of the image source 35030. Ray 35050 has the largest chief ray angle because the associated pixel 30005 is located adjacent to the corner of the image source 35030 thereby positioning the pixel 30005 radially furthest from the center of the image source 35030. As such, when the chief ray angle for the rays 35040 is considered in combination with the effect described with FIG. 34 and the thickness of the transparent layer 30010, ray 35045 would be of the intended color and ray 35050 would be of another color that came from an adjacent color filter 30020. These color differences will be visible in the image that is displayed to the user FIG. 37 is an illustration of a cross section of a portion of an image source 35030 wherein Pixel 1 is a center pixel and Pixel 5 is an edge pixel. Rays 34025 are shown emitted as a cone of rays (only half of the cone of rays emitted by each subpixel is shown to simplify the figure) for one subpixel 30000 in each pixel 30005. While each subpixel 30000 emits the same cone of rays 34025, the lens 35035 only samples a small portion of the rays 34025 emitted by each subpixel 30000. Where the sampled portion of the rays 34025 is different for each subpixel 30000 depending on the chief ray angle associated with the pixel 30005 and the radial position of the pixel 30005 relative to the center of the image source 35030. As a result, while each subpixel 30000 shown with emitted rays 34025 in FIG. 37 can be thought of as a red subpixel because a red color filter is positioned directly over each subpixel 30000, the colors of the sampled rays (shown as dark lines in FIG. 37) will progressively shift from red (ray 37045) to green (ray 37050). Consequently methods are needed to compensate for the color shift encountered at the edges and corners of images displayed in head-worn computers when the optical systems use high chief ray angles.

Figure 38:
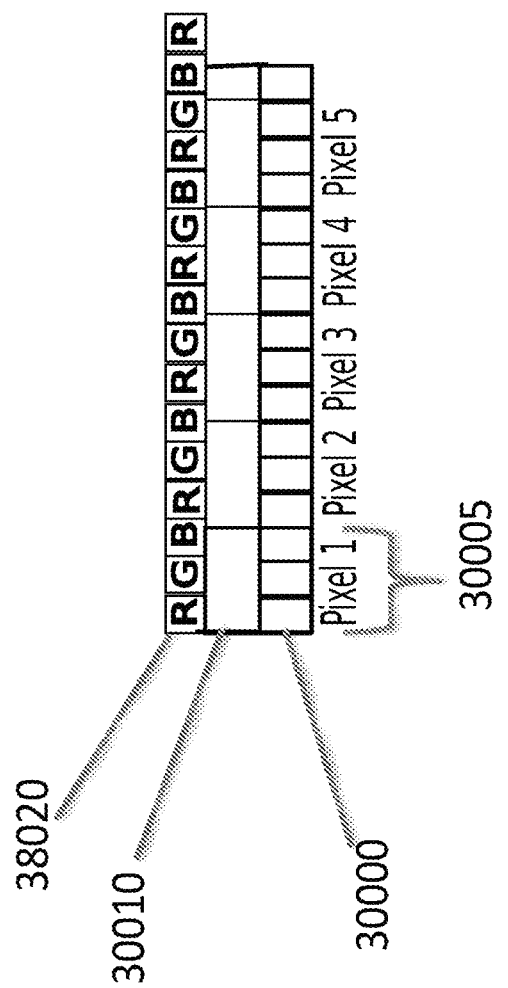
FIG. 38 shows a modified color filter array wherein the color filter array is somewhat larger than the array of subpixels.
Figure 39:
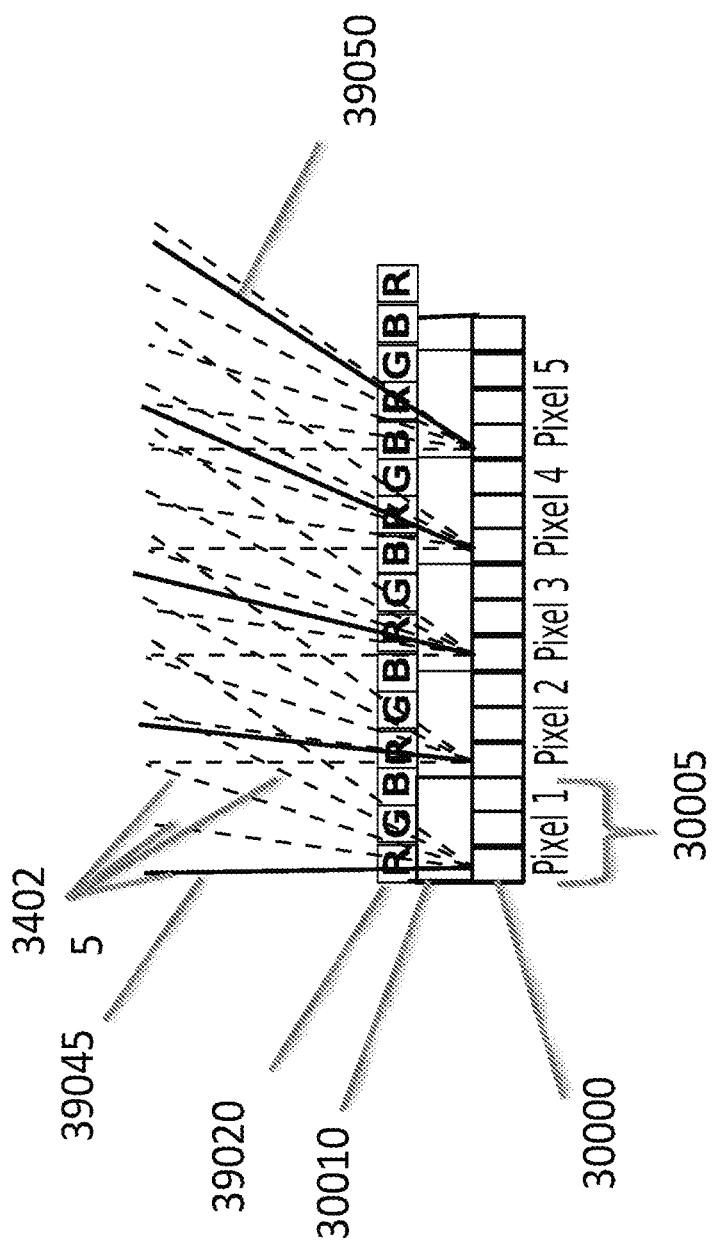
FIG. 39 shows the effect of the progressively offset color filter array.

FIG. 38 shows a modified color filter array 38020 wherein the color filter array 38020 is somewhat larger than the array of subpixels 30000. As a result, the position of the color filters over the subpixels 30000 is progressively outwardly offset for subpixels that are positioned further away from the center of the image source. FIG. 39 shows the effect of the progressively offset color filter array 39020. Each of the subpixels 30000 emits the same cone of rays 34025 as shown in FIG. 37, but now the rays that are sampled by the lens 39045 (shown as dark lines) all pass through the red color filter in the color filter array 39020 so that each of the subpixels 30000 shown in the same relative position within the pixels 30005 produce the same red color in the image displayed to the user in the optical system 35060. As such, the progressively offset color filter array 39020 effectively compensates for the increasing chief ray angle that enables compact optical systems with a wide field of view. Where the progressive offset of the color filter array can be radially based, linearly based with a progressive X direction shift or rectilinearly based with a progressive X direction and Y direction shift. Where a radial shift or a rectinlinear shift are well suited for a symmetric arrangement of the subpixels and color filters such as is shown in FIG. 33. A linearly based shift is well suited for a more rectangular arrangement of subpixels and color filters such as shown in FIG. 32 or a version of FIG. 31 wherein the pixels are square and the subpixels and color filters are rectangular. This embodiment can be implemented by changing the color filter array pattern that is applied to the image source.

Figure 40:
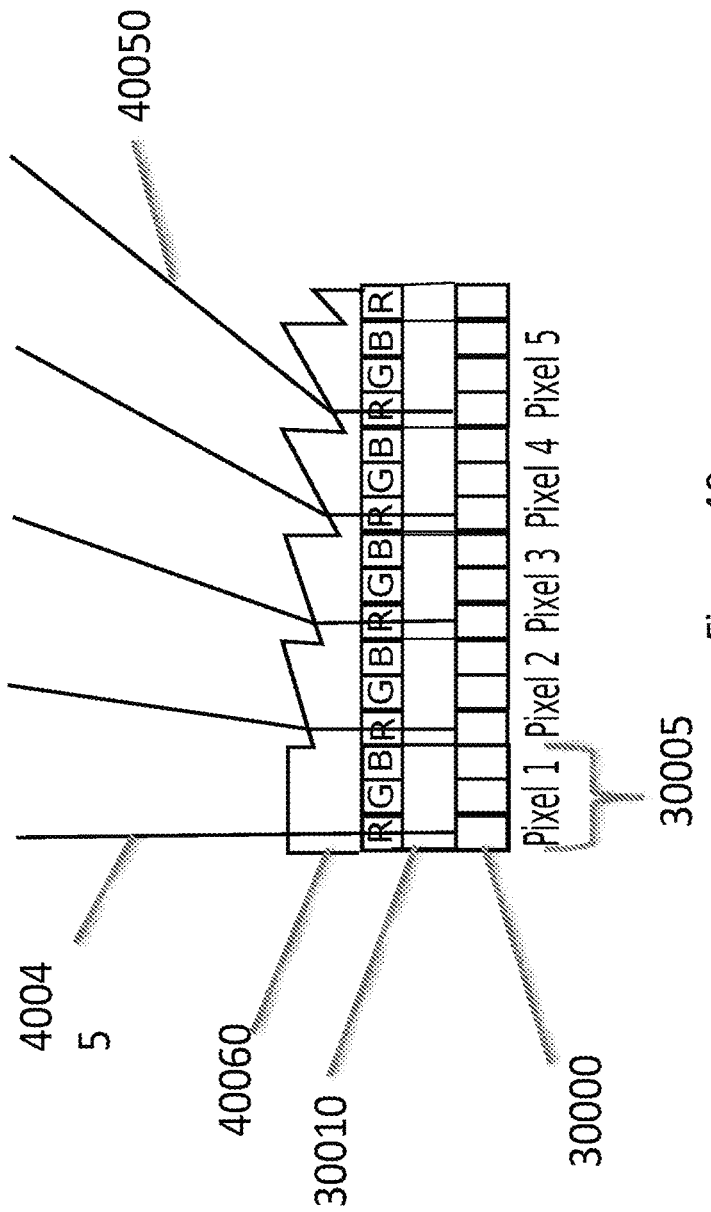
FIG. 40 shows an illustration of an optical solution wherein the rays from each subpixel are repointed so that zero angle rays become rays with the chief ray angle matched to the sampling of the lens.

FIG. 40 shows an illustration of an optical solution wherein the rays from each subpixel 30000 are repointed so that zero angle rays (rays that are emitted perpendicular to the surface of the image source) become rays with the chief ray angle matched to the sampling of the lens. As shown in FIG. 40, zero angle rays from all of the subpixels are repointed by an optical film 40060 thereby forming rays with progressively greater chief ray angles in correspondence to what the lens 35035 samples to form the image for the user. As shown in FIG. 40, the optical film 40060 is a diffractive lens or a Fresnel lens that progressively refracts the zero angle ray provided by subpixels 30000 and pixels 30005 so that subpixels 30000 and pixels 30005 that are positioned farther from the center of the image source 35030 are refracted more to give them a greater chief ray angle. The optical film 40060 can be attached to the upper surface of the image source 35030 (or attached to a cover glass over the color filter array) to make a compensated image source module or the optical film 40060 can be retained separately. This embodiment provides a further advantage in that the zero angle rays, which are emitted perpendicular to the surface of the subpixel 30000, include the most intense image light so that the image provided to the user will be brighter.

In alternative embodiments, the optical film 40060 can include microlenses to repoint the zero angle. The microlenses can be provided as a microlens array in an optical film or alternatively the microlenses can be applied directly to a cover glass over the color filter array. Microlenses provide a further advantage in that the cone of light emitted by the subpixel can be condensed to utilize more of the light emitted by the subpixel and thereby improve energy efficiency.

Figure 41:
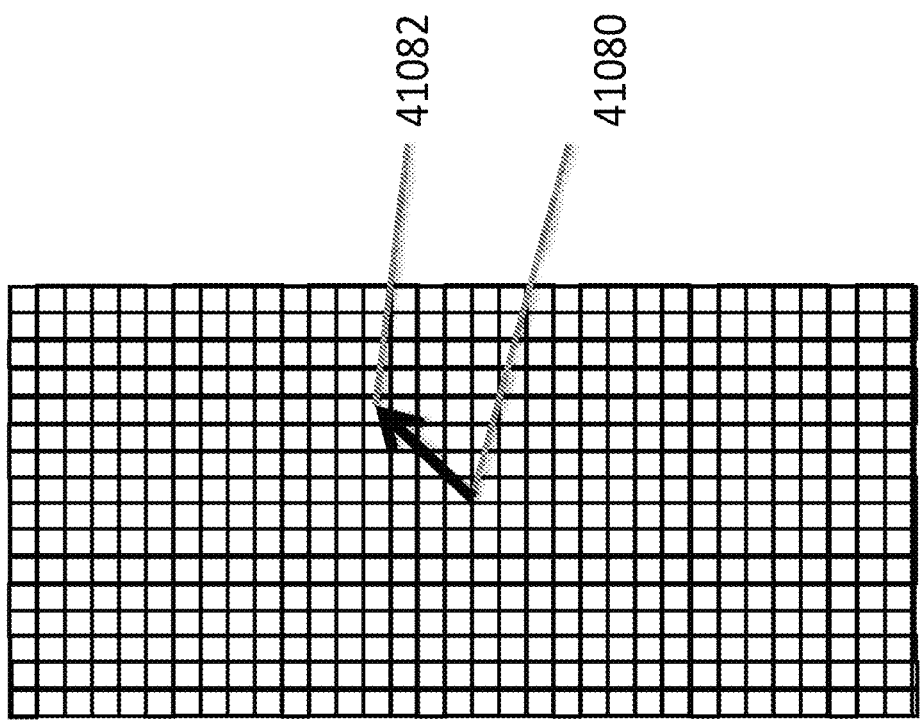
FIG. 41 shows an illustration of an array of subpixels on an image source, where is the center point of the image source is a subpixel in the array of subpixels.

In a further embodiment, the color shift caused by the chief ray angle of the rays sampled by the lens 35035 and the thickness of the transparent layer 30010, is compensated in the digital image by changing the digital code values presented to the pixels in the digital image. In this case, the layout of the color filter array 30020 is also taken into account so that a digital shift equation is applied to the digital image prior to being displayed on the head-worn display. Where the digital shift equation includes the position of the subpixel relative to the center of the image source, the chief ray angle for rays sampled by the lens at that position, the thickness of the transparent layer as well as the relative position of the color filters adjacent to and surrounding the subpixel. FIG. 41 shows an illustration of an array of subpixels on an image source, where 41080 is the center point of the image source and 41082 is a subpixel in the array of subpixels. The arrow shown shows the distance from the center 41080 to the subpixel 41082. The digital shift equation thereby determines which pixels will have a color shift caused by the emitted light exiting through an adjacent color filter and then determining how the code values associated with the pixel need to be shifted between subpixels within the digital image to provide a modified digital image that when viewed by the user in the head-worn computer will have the colors intended to be included in the digital image. The distance of the pixel 41082 from the center of the image source 41080 and the lens characteristics (e.g. focal length) determines the chief ray angle for the pixel which along with the thickness of the transparent layer 30010 determines whether the sampled ray from the subpixel 41082 will exit through the intended color filter as shown in FIG. 37 as ray 37045, or whether the sampled ray will exit through an adjacent color filter as shown by ray 37050. To compensate for the sampled rays exiting through adjacent color filters, the code values for the pixel in the digital image are shifted in the opposite direction (e.g. toward the center of the image) to an adjacent subpixel. Wherein each code value associated with a pixel determines how brightly each subpixel in the set of subpixels will emit white light, and consequently how bright each color associated with the pixel in the image will be. As such in this method, the relationship between the subpixels and the colors produced by the subpixels in the displayed image is changed to take into account the effect of the lens and the distribution of ray angles used by the lens to provide the displayed image within the head-worn computer. When shifting the code values to an adjacent subpixel, the adjacent subpixel may be in the same pixel or in an adjacent pixel. Equation 1 is an example of a digital shift equation for a subpixel, wherein: Ps is the number of subpixels that the code value is to be laterally shifted by; d is the distance from the center of the image source to the position of the subpixel; t is the thickness of the transparent layer; fL, is the focal length of the lens; C is a function of the color filter array layout surrounding the subpixel; and f(a) is a function of the angle of the chief ray angle relative to the color filter array layout. Equation 1 is shown as an example of a digital shift equation but other equations are possible.

$$Ps = (dXt/fL)(CXf(\alpha)) \quad \text{Equation 1}$$

For example as shown in FIG. 37, the code values for pixels 1 and 2 will not be shifted because the sampled rays from each subpixel (samples rays are shown as dark lines) exit through their intended color filters as shown by ray

37045 exiting through a red color filter. In contrast, the code values for pixels 4 and 5 will be shifted by one subpixel because the sampled rays exit through the adjacent color filter as shown by ray 37050 which exits through a green color filter. As such the code values for all the subpixels in pixels 4 and 5 will be shifted to the left by one subpixel so that the emitted light will exit through the intended color filter. For cases such as shown by ray 37052 where the sampled ray from a subpixel in pixel 3 exits partially through a red color filter and partially through a green color filter, the code values for the pixel 3 subpixels can be shared between subpixels, for example by averaging the code values between the two subpixels and thereby providing a ½ subpixel shift. Alternatively, code value shifts can be limited to whole subpixels and the code value shift is only applied when the majority of the sampled ray associated with the subpixel will exit through the adjacent color filter.

Looking at the color filter array patterns shown in FIGS. 31, 32 and 33, code value shifts between subpixels will vary depending on the color filter array pattern. For the color filter array pattern shown in FIG. 32, code values shifts between subpixels are only provided to reduce color shifts in the horizontal direction. Since the color filter array includes vertical stripes of the same color, increasing chief ray angle will only cause a color shift in the horizontal direction and not in the vertical direction. However, for the color filter array patterns shown in FIGS. 31 and 33, code shifting between subpixels will be needed in both X and Y directions as the chief ray angle increases toward the corners of the image. For example for the color filter array shown in FIG. 31, for a pixel positioned horizontally from the center of the image source with a chief ray angle that causes the emitted light from a subpixel to go into the adjacent color filter, red code values will need to be shifted left into the subpixel under the blur color filter. Similarly the green code values will need to be shifted left into the subpixel under the red color filter and likewise, the blue code value will need to be shifted left to the subpixel under the green color filter. For a pixel located in the top right corner of the image source code values will need to be shifted to the left and down to make the light rays emitted by the subpixel and sampled by the lens to exit through the intended color filter.

It should be noted that all of the methods described including color filter shifts, ray repointing and digital pixel shifts will produce an image that when viewed from a position directly above the image source such as when viewed by eye, will actually produce an image that has poor color rendition. This is because when viewed in this manner the chief ray angles will all be close to zero degrees. It is only when a lens with a relatively short focal length so that chief rays with substantial chief ray angles are sampled by the lens when viewing the image, that the color rendition will be improved by these methods. As such, the method would not be useful on a television type display or in a display system that uses telecentric image light. The color shift that is the topic of this invention is only important when compact optics are included with a short focal length lens relative to the size of the image source such as is used to provide a head-worn computer with a wide display field of view with compact optical systems.

Figure 42:
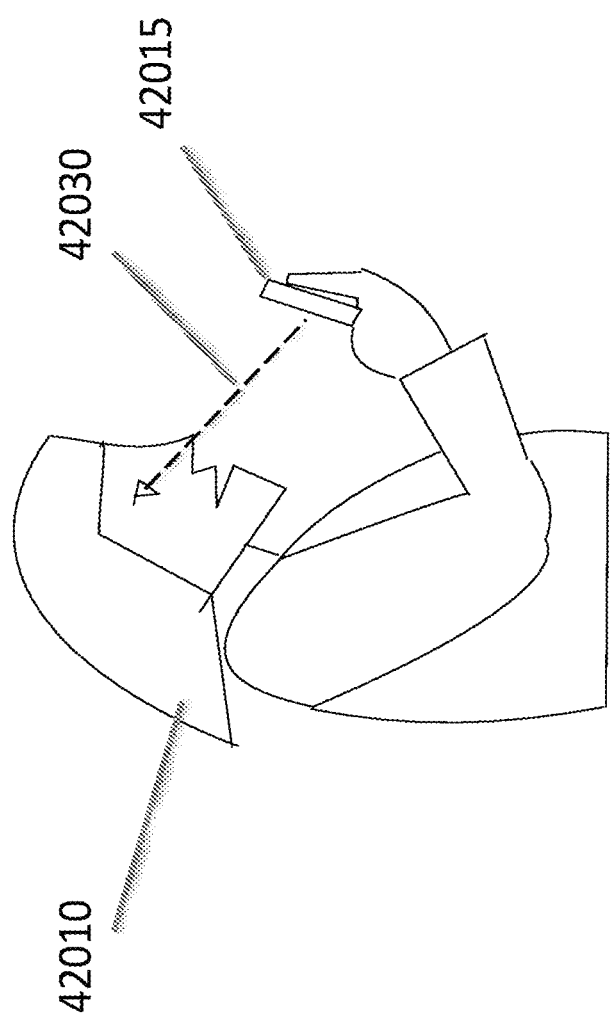
FIG. 42 illustrates a user looking at a phone.

Users of smartphones often complain of neck pain caused by the repetitive stress of looking downward at the smartphone while texting, emailing or internet surfing. An illustration of a user 42010 using a smartphone 42015 wherein the user is looking at the smartphone with an extreme downward line of sight 42030 is shown in FIG. 42. The neck pain condition has been called a variety of descriptive names including "text neck, iPhone neck, smartphone neck, etc (for example see: http://health.clevelandclinic.org/2015/03/text-neck-is-smartphone-use-causing-your-neck-pain/). While the issue can be reduced if the user holds the smartphone directly in front, this is typically not comfortable for the user's arms. The problem is that the user is limited to being either having an uncomfortable neck when looking at the smartphone or having uncomfortable arms holding the smartphone. A head-worn computer (HWC) is not limited in these ways because the HWC is mounted on the user's head. In addition the user interface for an HWC can be held separately in the user's hands (e.g. a separate keyboard). As a result a HWC can be used in more ergonomic positions than a smartphone.

The disclosure provides a method of operation of a HWC that promotes an ergonomic positioning of the user's head when viewing images on the HWC. To avoid interfering with augmented reality uses when the user is moving through an environment, the user's activities are monitored to determine the type of activity that the user is engaged in. When the user is determined to be engaged in an activity that includes limited motion where an ergonomic position would be beneficial, the position of the image in the HWC is modified so that the image content is only fully viewable when the user's head is at an ergonomically advantaged position.

Figure 43:
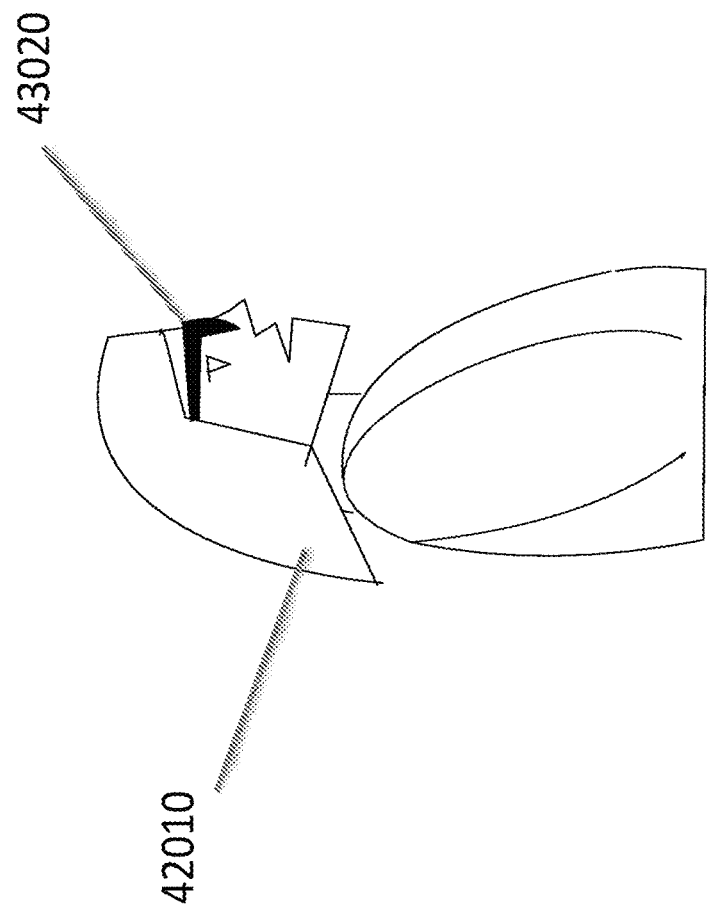
FIGS. 43 and 44 illustrate a user wearing a HWC.
Figure 44:
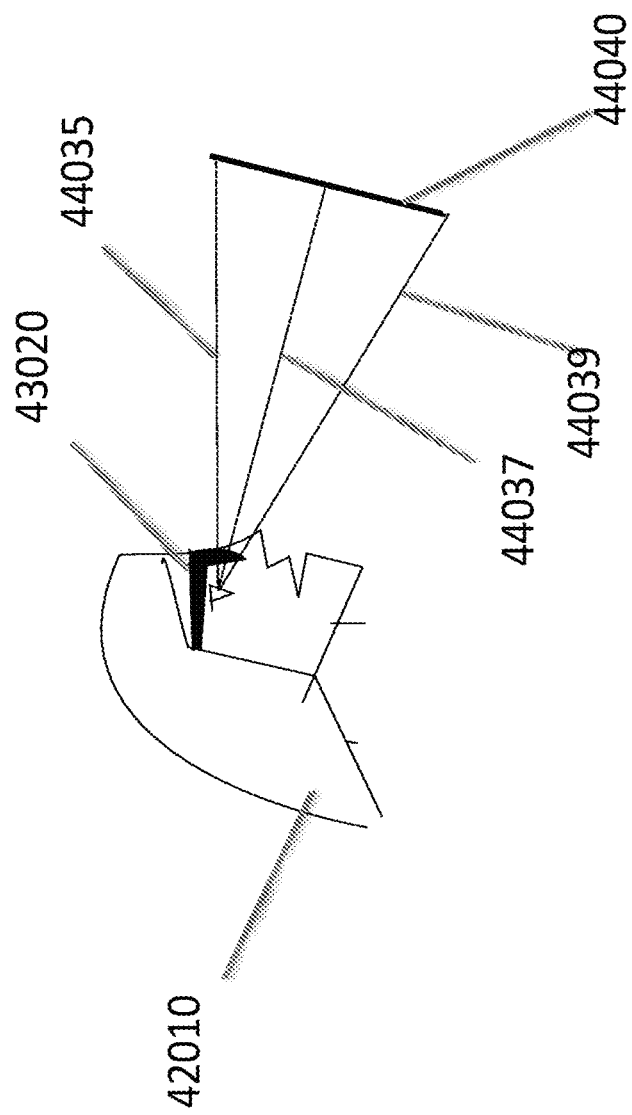

Neck pain caused by the prolonged use of a smartphone 42015 is connected with the user looking downwards thereby tilting their head downwards, as shown in FIG. 42, for extended periods of time. Wherein, the user's line of sight 42030 is approximately 45 degrees below horizontal or greater. In contrast, when using an HWC, the image presented by the HWC can be viewed at any angle the user chooses to position their head. FIG. 43 is an illustration of a user 42010 looking at an image in an HWC 43020, wherein the user's head is positioned neutrally so the user 42010 looks straight forward or slightly downward when viewing images. FIG. 44 shows the relative position of the user's line of sight 44037 to the center of the virtual image which is preferably approximately 15 degrees below horizontal. The disclosure provides a method of operation that limits viewing of images with full image content to head angles that are ergonomic.

HWCs are used in a variety of use cases including use cases where the user moves about in a surrounding environment, such as by walking or running in which case head position is determined at least in part by the surrounding environment. In this case, neck pain is not as much of an issue and limiting the viewing of images to ergonomic head positions would actually interfere with functional aspects of the use case. Similarly, in certain types of augmented reality use cases such as gaming where the user may not be moving in the environment, but the use case calls for the user to move their head around a lot, neck pain is not as much of an issue and limiting the view of image to ergonomic head angles would interfere with functional aspects of the use case. However, in those use cases where the user keeps their head relatively still while viewing images for extended periods of time such as when watching a movie or while reading email, limiting the viewing of images to head angles that are ergonomic provides a significant advantage in user comfort.

To be able to differentiate between use cases wherein ergonomic head position is an advantage and use cases where an ergonomic head position would interfere with functional aspects of the use case, the HWC needs to be able to identify what the user is doing. In embodiments this determination can be done by a combination of sensors to determine how the user is moving. In embodiments, a marker can also be associated with the use case that identifies the use case to be one that needs the image to be locked in position within the display field of view of the HWC or one that would provide improved user comfort if the viewing was limited to ergonomic head positions.

Determining what the user is doing relative to whether ergonomic head positioning should be provided or not, involves determining whether the user is moving about in the environment and whether the user is substantially moving their head. The HWC can include various sensors that can be used to determine what the user is doing. The sensors may include an inertial measurement unit (IMU), which can include gyroscopes and accelerometers to measure movement and tilt, a magnetometer to measure compass heading, a global navigation satellite sensor (GNSS or GPS) to measure position on the earth and an altimeter to measure altitude. Polling of the IMU and GPS can be used to determine whether the user is moving about in the environment and at what speed the user is moving. Slow speed (e.g. below 20 miles per hour) as indicated by the GPS along with cyclic up and down measurements from the IMU can be used to determine whether the user is walking or running. Measurements from the GPS and altimeter can be used to determine whether the user is in a vehicle. High speed movement (e.g. above 20 miles per hour) at a low altitude can indicate the user is in a vehicle such as a car. High speed movement wherein the compass heading is largely the same as the GPS movement aside from some periodic differences to the left and right, can indicate that the user is driving a vehicle. High speed movement wherein the compass heading is different from the GPS movement can indicate that the user is a passenger in a vehicle and if the tilt is downward the user can be indicated to be reading. Very high speed (e.g. above 150 miles per hour) movement at a high altitude can indicate that the user is flying in a plane. Rapid head movements back and forth can indicate that the user is looking for something. If the head movements correspond to changes in the displayed image, the user can be determined to be reacting to augmented reality imagery. Thus movement signatures corresponding to combinations of different types of measurement patterns from sensors in the HWC can be used to determine what the user is doing.

Figure 45:
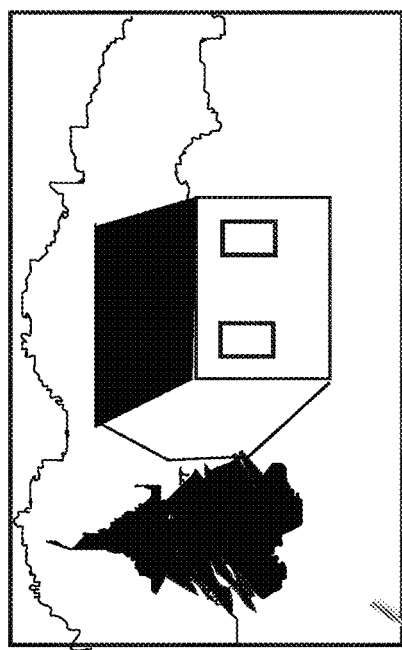
FIG. 45 illustrates a see-through head-worn display with displayed content.

In cases where the user is determined to be stationary or to be a passenger in a vehicle or a plane, the HWC can automatically switch to a mode of operation in which the image content is only fully viewable when the HWC is oriented within a range of degrees from horizontal (e.g. −10 to −20 degrees from horizontal) that is considered ergonomically advantaged. Wherein the HWC is preferably setup to follow the ergonomic recommendations for a workspace that includes a computer monitor. In the ergonomic recommendations for computer workstations (for example see http://www.cbs.state.or.us/osha/pdf/pubs/1863.pdf) the upper edge of the monitor should be positioned to be horizontally opposite to the user's eye and the middle of the monitor should be viewable with the user's eye at 15 degrees below horizontal. FIG. 44 is an illustration showing a user 42010 with an HWC 43020 positioned to provide a line of sight 44037 to the center of a virtual image 44040 that is approximately 15 degrees below horizontal and the line of sight to the top of the virtual image 44035 is approximately horizontal. FIG. 45 shows an example of a virtual image 44040 as seen by the user 42010 when the user's head is positioned as shown in FIGS. 43 and 44 where the user is presented with a full view of the virtual image 44040 including all the image content.

Figure 46:
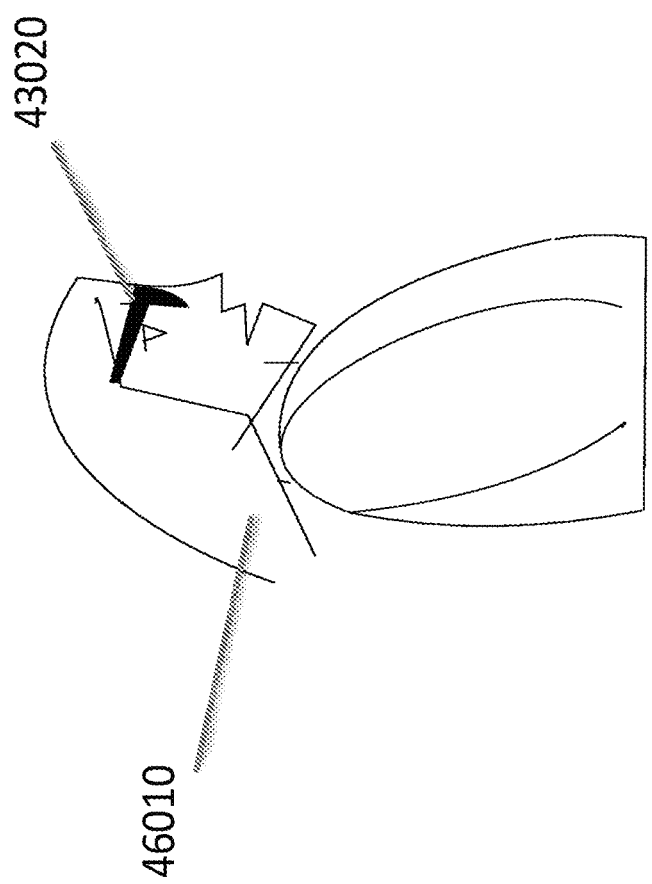
FIG. 46 illustrates a user wearing a HWC.
Figure 47:
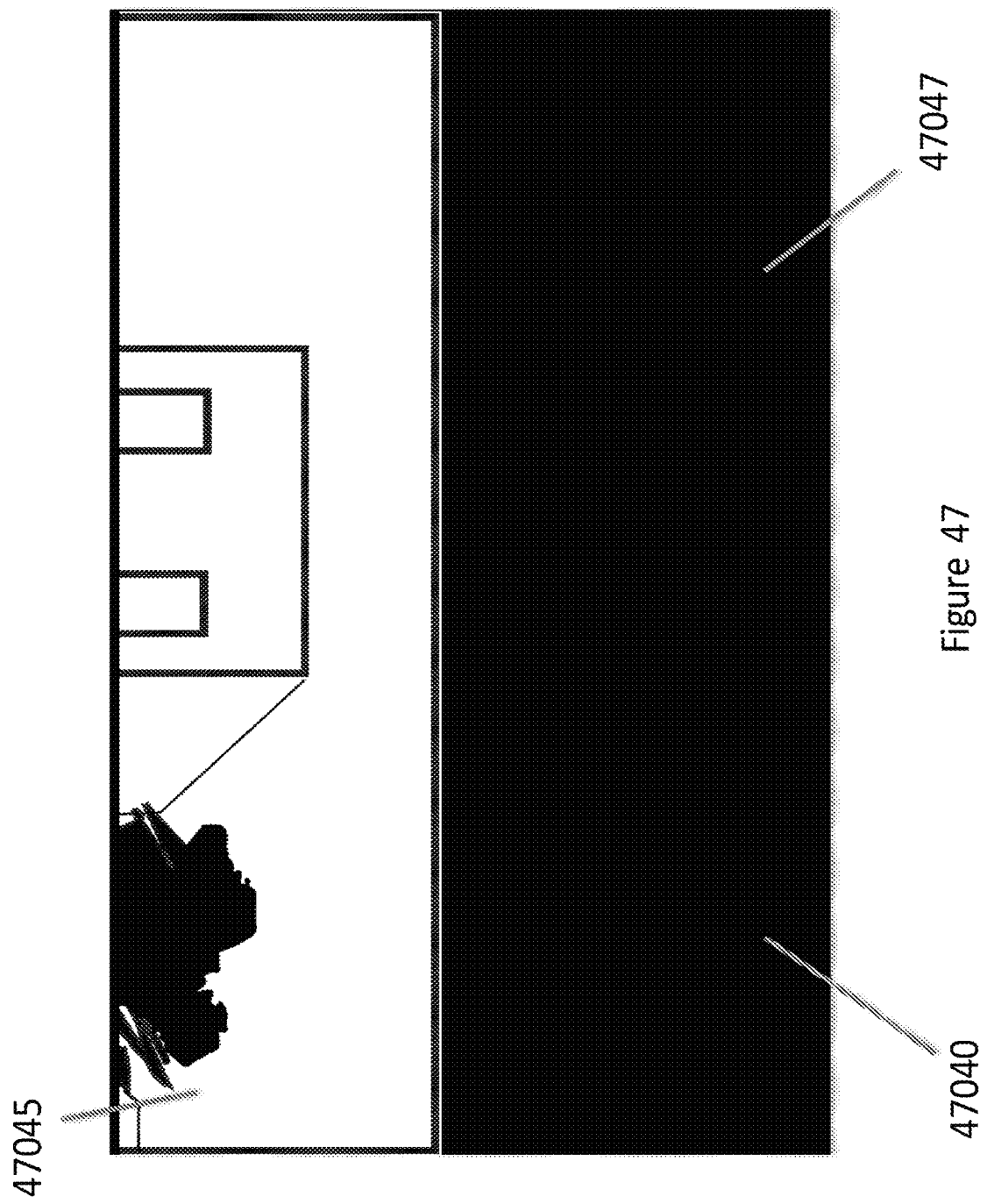
FIG. 47 illustrates a see-through head-worn display with displayed content.

In contrast, FIG. 46 shows an example in which the user is looking downward at approximately 30 degrees. In this case, the disclosure provides a modified virtual image 47040 comprised of less than half of the image content included in virtual image 44040 and the half of the image content is presented in the upper portion of the modified virtual image 47040 as shown in FIG. 47. In this way the user is encouraged to view images with his head held at an ergonomic angle where the user can view virtual image 44040 that includes all of the image content. Larger display fields of view may increase the difference between the angle of the line of sight to the top of the virtual image and the angle of the line of sight to the center of the virtual image.

In a more general case, a portion of the image content 47045 included in the virtual image 44040 is presented in the modified virtual image 47040 in correspondence to the deviation between a target ergonomic angle for the line of sight to the center of the image 44037 and the actual angle for the line of sight to the center of the image. The larger the deviation, the smaller the portion of the image content 47045 that is presented within the modified virtual image 47040. By moving the portion of the image content 47045 upwards in the modified virtual image 47040 as the user moves his head downwards, the image content appears to be locked in place vertically relative to the environment. At the same time, in the method of the disclosure the image content does not move laterally within the modified virtual image 47040 if the user moves his head laterally, because this type of movement does not affect ergonomics when using an HWC 42010. As such the method provided by the disclosure differs from world locking of a virtual image to objects in the environment, because world locking typically includes locking of the virtual image both vertically and laterally relative to objects in the surrounding environment in response to movements of the user's head. Since the user of an HWC 42010 can choose the positioning of his head laterally, he will tend to choose a comfortable and ergonomic lateral position for his head, which is approximately looking straight ahead. This also allows the user of a HWC 42010 that provides a see-through view of the surrounding environment to freely move his head laterally in response to changes in the surrounding environment while being encouraged to hold his head in an ergonomic position vertically.

In embodiments the target angle for the line of sight 44037 to the center of the virtual image 44040 is in the range of 10 to 20 degrees below horizontal. In addition, the virtual image 44040 is presented by the HWC 43020 so that the line of sight 44037 is perpendicular to the line of sight 44037 so that the angle of the line of sight to the top and bottom of the virtual image 44040 is substantially the same thereby making it easier for the user 42010 to view the entire image. This is different from a computer workstation wherein the display is typically oriented vertically to reduce the space required by the workstation. Instead the HWC 43020 provides a virtual image 44040 that is presented more like a laptop wherein the display is tilted to orient the display perpendicular to the user's line of sight.

The angle of the line of sight 44037 to the center of the virtual image can be determined from the geometry of the optics of the HWC 42010 (how the virtual image is presented relative to the frame of the HWC 42010) and a measurement of the angle of the HWC 42010 provided by the tilt of the IMU. The modified virtual image 47040 can be constructed by cropping the image content and shifting the cropped digital image content 47045 vertically within the image content of the modified virtual image 47040, and then adding solid digital image content 47047 in the modified virtual image 47040 to form the modified virtual image 47040. The solid digital content 47045 is comprised of a solid color such as for example black or white as best matches the current use case of the HWC 42010. Typically, for an HWC 42010 that provides a see-through view of the surrounding environment, the solid digital image content 47047 would be black as shown in FIG. 47 to provide the user with a clear view of the surrounding environment through the portion of the modified virtual image 47040 that constitutes the solid digital content 47047. Where the black portions of the modified virtual image 47040 provide no light to the user's eye and as such, the user sees a clear see-through view of the surrounding environment.

In embodiments, if the HWC 42010 is determined to be at an extreme angle relative to horizontal (e.g greater than 30 degrees from horizontal) as measured by the IMU in either a vertical or sideways angle the user is determined to be lying down. If the user is lying down, the user's head is typically supported by a pillow or other padding so that head position doesn't change strain the neck muscles and neck pain is not an issue. Consequently, the virtual image 44040 are presented with full image content (no cropping or moving) to the user.

In embodiments, a camera is included in the HWC 43020 that can capture an image of a portion of the user's body, such as the user's chest, to determine the angle of the HWC 43020 relative to the user's body. The method of presenting the virtual image to encourage an ergonomic position of the user's head while viewing images for an extended period of time is then changed to be in correspondence to the measured angle of the HWC 43020 relative to the user's body. This embodiment can provide a more accurate measure of the angle of the user's head position relative to the user's body in cases when the user's body is angled such as when the user is sitting in a chair and leaning back or when the user is leaning forward or backward.

While many of the embodiments herein describe see-through computer displays, the scope of the disclosure is not limited to see-through computer displays. In embodiments, the head-worn computer may have a display that is not see-through. For example, the head-worn computer may have a sensor system (e.g. camera, ultrasonic system, radar, etc.) that images the environment proximate the head-worn computer and then presents the images to the user such that the user can understand the local environment through the images as opposed to seeing the environment directly. In embodiments, the local environment images may be augmented with additional information and content such that an augmented image of the environment is presented to the user. In general, in this disclosure, such see-through and non-see through systems may be referred to as head-worn augmented reality systems, augmented reality displays, augmented reality computer displays, etc.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method of presenting content to a user of a wearable head device, the method comprising:
   receiving initial content for presentation via a display of the wearable head device;
   determining, via one or more first sensors of the wearable head device, an activity of the user;
   in accordance with a determination that the activity comprises a first activity:
      determining, via one or more second sensors of the wearable head device, a viewing axis of the user;
      determining whether an angle between the viewing axis and a horizontal axis is between a first predetermined angle and a second predetermined angle;
      in accordance with a determination that the angle is not between the first predetermined angle and the second predetermined angle:
         cropping the initial content to produce cropped initial content, wherein the cropped initial content comprises a portion of the initial content between the viewing axis and the horizontal axis;
         shifting the cropped initial content toward a point between the viewing axis and the horizontal axis to generate an edited content; and
         presenting, via the display, the edited content; and
      in accordance with a determination that the angle between the viewing axis and the horizontal axis is between the first predetermined angle and the second predetermined angle, presenting, via the display, the initial content; and
   in accordance with a determination that the activity does not comprise the first activity, presenting, via the display, the initial content.

2. The method of claim 1, wherein the first activity comprises a movement at a speed not greater than a threshold speed.

3. The method of claim 2, wherein the first activity comprises the movement at the speed not greater than the threshold speed for at least a threshold amount of time.

4. The method of claim 1, wherein the determination that the activity does not comprise the first activity comprises determining that the activity comprises a movement at a speed greater than a threshold speed.

5. The method of claim 1, wherein the determination that the activity does not comprise the first activity comprises determining that the activity comprises traveling in a vehicle, walking, running, laying down, interacting with a mixed reality environment of the wearable head device, or any combination thereof.

6. The method of claim 1, wherein:
   the first predetermined angle is 10 degrees below the horizontal axis, and
   the second predetermined angle is 20 degrees below the horizontal axis.

7. The method of claim 1, wherein the generating the edited content comprises fixing the cropped initial content relative to a vertical axis.

8. The method of claim 1, wherein the first predetermined angle and the second predetermined angle are determined based on a plane of the initial content.

9. The method of claim 1, wherein the shifting the cropped initial content comprises aligning a top of the cropped initial content with the horizontal axis.

10. The method of claim 1, wherein the presenting the edited content to the user comprises presenting the edited content along a plane orthogonal to the viewing axis.

11. The method of claim 1, wherein the determining the viewing axis comprises:
    receiving, via the one or more second sensors, an image of an eye of the user; and
    determining the viewing axis based on the image.

12. The method of claim 1, wherein the determining the viewing axis comprises determining an orientation of the wearable head device relative to the user, and wherein the viewing axis is determined based on the orientation.

13. The method of claim 1, wherein the one or more first sensors comprise an inertial measurement unit (IMU), an accelerometer, a tilt sensor, a GPS unit, an altimeter, a magnetometer, or any combination thereof.

14. The method of claim 1, wherein the one or more second sensors comprise an IMU, an accelerometer, a tilt sensor, a GPS unit, an altimeter, a magnetometer, or any combination thereof.

15. A wearable device comprising:
a display;
one or more first sensors;
one or more second sensors;
one or more processors configured to perform:
   receiving initial content for presentation via the display;
   determining, via the one or more first sensors, an activity of a user of the wearable device;
   in accordance with a determination that the activity comprises a first activity:
      determining, via the one or more second sensors, a viewing axis of the user;
      determining whether an angle between the viewing axis and a horizontal axis is between a first predetermined angle and a second predetermined angle;
      in accordance with a determination that the angle is not between the first predetermined angle and the second predetermined angle:
         cropping the initial content to produce cropped initial content, wherein the cropped initial content comprises a portion of the initial content between the viewing axis and the horizontal axis;
         shifting the cropped initial content toward a point between the viewing axis and the horizontal axis to generate an edited content; and
         presenting, via the display, the edited content; and
      in accordance with a determination that the angle between the viewing axis and the horizontal axis is between the first predetermined angle and the second predetermined angle, presenting, via the display, the initial content; and
   in accordance with a determination that the activity does not comprise the first activity, presenting, via the display, the initial content.

16. The wearable device of claim 15, wherein the first activity comprises a movement at a speed not greater than a threshold speed.

17. The wearable device of claim 15, wherein the determination that the activity does not comprise the first activity comprises determining that the activity comprises a movement at a speed greater than a threshold speed.

18. The wearable device of claim 15, wherein the one or more first sensors comprise an IMU, an accelerometer, a tilt sensor, a GPS unit, an altimeter, a magnetometer, or any combination thereof.

19. The wearable device of claim 15, wherein the one or more second sensors comprise an IMU, an accelerometer, a tilt sensor, a GPS unit, an altimeter, a magnetometer, or any combination thereof.

20. A non-transitory computer readable storage medium storing instructions that, when executed, cause one or more processors to perform a method comprising:
   receiving initial content for presentation via a display of the wearable head device;
   determining, via one or more first sensors of the wearable head device, an activity of the user;
   in accordance with a determination that the activity comprises a first activity:
      determining, via one or more second sensors of the wearable head device, a viewing axis of the user;
      determining whether an angle between the viewing axis and a horizontal axis is between a first predetermined angle and a second predetermined angle;
      in accordance with a determination that the angle is not between the first predetermined angle and the second predetermined angle:
         cropping the initial content to produce cropped initial content, wherein the cropped initial content comprises a portion of the initial content between the viewing axis and the horizontal axis;
         shifting the cropped initial content toward a point between the viewing axis and the horizontal axis to generate an edited content; and
         presenting, via the display, the edited content; and
      in accordance with a determination that the angle between the viewing axis and the horizontal axis is between the first predetermined angle and the second predetermined angle, presenting, via the display, the initial content; and
   in accordance with a determination that the activity does not comprise the first activity, presenting, via the display, the initial content.

\* \* \* \* \*